(12) United States Patent
Agrawal et al.

(10) Patent No.: US 11,784,691 B2
(45) Date of Patent: Oct. 10, 2023

(54) METHOD AND SYSTEM FOR INTELLIGENT 3D AERIAL WIRELESS TRANSMISSION

(71) Applicants: SAMSUNG ELECTRONICS CO., LTD., Suwon-si (KR); DELHI TECHNOLOGICAL UNIVERSITY, New Delhi (IN)

(72) Inventors: Sachin Kumar Agrawal, Bangalore (IN); Kapil Sharma, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/749,903

(22) Filed: May 20, 2022

(65) Prior Publication Data
US 2022/0278724 A1 Sep. 1, 2022

Related U.S. Application Data

(63) Continuation of application No. PCT/KR2020/016508, filed on Nov. 20, 2020.

(30) Foreign Application Priority Data

Nov. 22, 2019 (IN) .............................. 201911047873

(51) Int. Cl.
*H04B 7/06* (2006.01)
*H04B 7/0413* (2017.01)
(Continued)

(52) U.S. Cl.
CPC ........... *H04B 7/0617* (2013.01); *G06V 10/82* (2022.01); *G06V 20/176* (2022.01); *G06V 10/764* (2022.01); *H04B 7/0413* (2013.01)

(58) Field of Classification Search
CPC .... H04B 7/0617; H04B 7/0413; G06V 10/82; G06V 20/176; G06V 10/764
See application file for complete search history.

(56) References Cited

U.S. PATENT DOCUMENTS

| 11,115,832 B2 | 9/2021 | An et al. |
| 11,240,676 B2 | 2/2022 | Park et al. |

(Continued)

FOREIGN PATENT DOCUMENTS

| EP | 3494655 | 6/2019 |
| KR | 10-2018-0092741 A | 8/2018 |

(Continued)

OTHER PUBLICATIONS

Huawei, "Huawei 5G Wireless Network Planning Solution White Paper", Huawei Technologies, Ltd. 2018 (24 pages).

(Continued)

*Primary Examiner* — Janice N Tieu
(74) *Attorney, Agent, or Firm* — Nixon & Vanderhye, P.C.

(57) ABSTRACT

A method and system for beamforming in a wireless communication system for intelligent three-dimensional aerial wireless transmission are disclosed. In an embodiment, the method includes: identifying at least one obstruction in at least one three-dimensional aerial view image of a current location of the at least one transmitting antenna; forming at least one set of virtual layers comprising of one or more virtual layers corresponding to the at least one obstruction; determining a collective attenuation value for the at least one set of virtual layers based on an attenuation value of the one or more virtual layers; and forming at least one first beam based on the collective attenuation value.

15 Claims, 45 Drawing Sheets

(51) Int. Cl.
G06V 10/82 (2022.01)
G06V 20/10 (2022.01)
G06V 10/764 (2022.01)

(56) References Cited

U.S. PATENT DOCUMENTS

| | | |
|---|---|---|
| 2013/0346020 A1 | 12/2013 | Pershing |
| 2015/0195026 A1 | 7/2015 | Sagong et al. |
| 2015/0338522 A1 | 11/2015 | Miller et al. |
| 2016/0037431 A1 | 2/2016 | Kohli |
| 2018/0139623 A1 | 5/2018 | Park et al. |
| 2019/0181916 A1 | 6/2019 | Rofougaran et al. |
| 2019/0392256 A1* | 12/2019 | Cho ............... G06V 10/764 |
| 2020/0163040 A1* | 5/2020 | Trichopoulos ........ G01S 5/0273 |
| 2020/0304219 A1 | 9/2020 | Park et al. |
| 2021/0044988 A1* | 2/2021 | Park ............... H04B 17/3913 |
| 2021/0092703 A1* | 3/2021 | Min ............... H04W 56/001 |

FOREIGN PATENT DOCUMENTS

| | | |
|---|---|---|
| KR | 10-2019-0036171 A | 4/2019 |
| KR | 10-2019-0038117 A | 4/2019 |
| WO | 2019/066470 A1 | 4/2019 |

OTHER PUBLICATIONS

Qualcomm, "Breaking the wireless barriers to mobilize 5G NR mmWave", Jan. 2019 (39 pages).
Black, Eric, "5G Antenna Technology for Smart Products", Ansys Advantage, Issue 2, 2018, pp. 14-17.
3GPP TR 25.967, V11 .0.0 *Technical Report*, "3rd Generation Partnership Project; Technical Specification Group Radio Access Network; Home Node B (HNB) Radio Frequency (RF) requirements (FDD) (Release 11)", Sep. 2012, published Sep. 24, 2012 (55 pages).
3GPP TS 25.104, V16.0.0 *Technical Specification*, "3rd Generation Partnership Project; Technical Specification Group Radio Access Network; Base Station (BS) radio transmission and reception (FDD) (Release 16)", Dec. 2018, published Jan. 15, 2019 (119 pages).
3GPP TS 25.141, V16.0.0 *Technical Specification*, "3rd Generation Partnership Project; Technical Specification Group Radio Access Network; Base Station (BS) conformance testing (FDD) (Release 16)", Dec. 2018, published Jan. 15, 2019 (250 pages).
3GPP TR 25.820, V8.2.0 *Technical Report*, 3rd Generation Partnership Project; Technical Specification Group Radio Access Networks; 3G Home NodeB Study Item Technical Report (Release 8), Sep. 2008, published Sep. 23, 2008 (40 pages).
Rhode & Schwarz, "Antenna Array Testing—Conducted and Over the Air: The Way to 5G" White Paper; Nov. 2016 (30 pages).
Kim, Hong-Teuk, et al., "A 28-GHz CMOS Direct Conversion Transceiver With Packaged 2×4 Antenna Array for 5G Cellular System", IEEE Journal of Solid-State Circuits, vol. 53, No. 5, May 2018, pp. 1245-1258.
Khan, Rizwan, et al., "Recent Advancements in User Effects Mitigation for Mobile Terminal Antennas: A Review", Jan. 2018, pp. 1-10.
3GPP TS 38.133, V15.2.0 *Technical Specification*, "3rd Generation Partnership Project; Technical Specification Group Radio Access Network; NR; Requirements for support of radio resource management (Release 15)", Jul. 2018, published Jul. 8, 2018 (79 pages).
3GPP TS 38.101-2, V15.2.0 *Technical Specification*, "3rd Generation Partnership Project; Technical Specification Group Radio Access Network; NR; User Equipment (UE) radio transmission and reception; Part 2: Range 2 Standalone (Release 15)", Jun. 2018, published Jul. 9, 2018 (68 pages).
3GPP TS 36.101, V11.8.0 *Technical Specification*, "3rd Generation Partnership Project; Technical Specification Group Radio Access Network; Evolved Universal Terrestrial Radio Access (E-UTRA); User Equipment (UE) radio transmission and reception (Release 11)", Mar. 2014, published Mar. 27, 2014 (495 pages).

3GPP TSG RAN; S4.02A V1.0.1, *Technical Specification*, 3rd Generation Partnership Project (3GPP); Technical Specification Group (TSG) RAN WG4; UTRA (UE) TDD; Radio Transmission and Reception, Apr. 1999 (26 pages).
Rhode & Schwarz, "Measurements on 3GPP Base Station Transmitter Signals", date not available (26 pages).
Drago, Matteo, et al., "Reliable Video Streaming Over mmWave with Multi Connectivity and Network Coding", 2018 IEEE International Conference on Computing, Networking and Communications (ICNC), Mar. 2018 (6 pages).
Taff IV, William Malcolm, "Object Detection and Digitization from Aerial Imagery Using Neural Networks", A Thesis Presented to the Faculty of the USC Graduate School University of Southern California, Aug. 2018 (112 pages).
Wirges, Sascha, et al., "Object Detection and Classification in Occupancy Grid Maps Using Deep Convolutional Networks", published Dec. 5, 2018 (6 pages).
Castaño, Fernando, et al., "Obstacle Recognition Based on Machine Learning for On-Chip LiDAR Sensors in a Cyber-Physical System", Sensors 2017, 17, 2019, doi: 10.3390/s17092109, published Sep. 14, 2017 (14 pages).
Mancini, Michele, et al., "J-MOD$^2$: Joint Monocular Obstacle Detection and Depth Estimation", published Dec. 13, 2017 (8 pages).
Roddick, Thomas, et al., "Orthographic Feature Transform for Monocular 3D Object Detection", published Nov. 20, 2018 (10 pages).
Singla, Abhik, et al., "Memory-based Deep Reinforcement Learning for Obstacle Avoidance in UAV with Limited Environment Knowledge", published Nov. 8, 2018 (11 pages).
3GPP TR 36.873, V12.7.0 *Technical Report*, "3rd Generation Partnership Project; Technical Specification Group Radio Access Network; Study on 3D channel model for LTE (Release 12)", Dec. 2017, published Jan. 5, 2018 (47 pages).
Sun, Shu, et al., "Propagation Models and Performance Evaluation for 5G Millimeter-Wave Bands", IEEE Transactions on Vehicular Technology, vol. 67, No. 9, Sep. 2018, pp. 8422-8439.
Kheradpisheh, Saeed, "STDP-based spiking deep convolutional neural networks for object recognition", Neural Networks (2017), https://doi.org/10.1016/j.newnet.2017.12.005, published Dec. 25, 2017 (21 pages).
Xu, Haoyu, "Foreign object debris material recognition based on convolutional neural networks", EURASIP Journal on Image and Video Processing, https://doi.org/10.1186/s13640-018-0261-2, 2018 (10 pages).
Ferreira, David, et al., "Characterization of Wireless Propagation Through Traditional Iberian Brick Walls", 2017 11th European Conference on Antennas and Propagation (EUCAP), Mar. 2017 (6 pages).
Choroszucho, Agnieszka, et al., "Local attenuation of electromagnetic field generated by wireless communication system inside the building", Przeglad Elektrotechniczny, Jan. 2011 (5 pages).
Caglayan, Ali, "Volumetric Object Recognition Using 3-D CNNs on Depth Data", IEEE Access, published Mar. 30, 2018, current version dated Apr. 25, 2018 (9 pages).
Kurz, Franz, "Deep Learning Segmentation and 3D Reconstruction of Road Markings Using Multiview Aerial Imagery", ISPRS International Journal of Geo-Information 2019, 8, 47, doi: 10.3390/ijgi8010047 (16 pages).
Boulch, Alexandre, "SnapNet: 3D point cloud semantic labeling with 2D deep segmentation networks", Special Section on Eurographics Workshop on 3D Object Retrieval 2017, ONERA—The French Aerospace Lab, FR-91761, Palaiseau, France, Dec. 28, 2017 (10 pages).
Özdemir, E., et al., "Segmentation of 3D Photogrammetric Point Cloud for 3D Building Modeling", The International Archives of the Photogrammetry, Remote Sensing and Spatial Information Sciences, vol. XLII-4/W10, 2018, 13th 3D GeoInfo Conference, Oct. 1-2, 2018, Delft, The Netherlands (8 pages).
Pirotti, F., et al., "Detection of Building Roofs and Facades from Aerial Laser Scanning Data Using Deep Learning", The International Archives of the Photogrammetry, Remote Sensing and Spatial

(56) References Cited

OTHER PUBLICATIONS

Information Sciences, vol. XLII-2/W11, 2019, $2^{nd}$ International Conference of Geomatics and Restoration, May 8-10, 2019, Milan, Italy (6 pages).

Lippoldt, Franziska, et al., "Window detection in aerial texture images of the 3D CityGML Berlin Model", published Dec. 19, 2018 (5 pages).

Zhou, K., et al., "3D building change detection between current vhr images and past LiDAR data", Delft University of Technology, published 2018 (8 pages).

Nadeem, Qurrat-Ul-Ain, et al., "Elevation Beamforming with Full Dimension MIMO Architectures in 5G Systems: A Tutorial", published Jun. 5, 2019 (37 pages).

Indian Hearing Notice dated Apr. 24, 2023 in corresponding Indian Patent Application No. 201911047873.

\* cited by examiner

METHOD AND SYSTEM FOR INTELLIGENT 3D AERIAL WIRELESS TRANSMISSION

CROSS-REFERENCE TO RELATED APPLICATIONS

This application is a continuation of International Application No. PCT/KR2020/016508 designating the United States, filed on Nov. 20, 2020, in the Korean Intellectual Property Receiving Office and claiming priority to Indian Non-Provisional Patent Application No. 201911047873, filed on Nov. 22, 2019, the disclosures of which are incorporated by reference herein in their entireties.

BACKGROUND

Field

The disclosure relates to wireless communications and wireless communication systems, for example, to a method and system for controlling beamforming for intelligent three-dimensional (3D) aerial wireless transmission.

Description of Related Art

In a wireless cellular communication system that supports beamforming, a base station and a terminal may form a plurality of beams for signal transmission and reception. Particularly, each of the base station and the terminal may select an optimal beam from a plurality of beams according to a beamforming protocol, and transmit and receive a signal using the selected beam. In general, the beamforming protocol includes a beam tracking procedure that is performed continuously in a background. The beam tracking procedure involves scanning a wide spectrum of reflected signals to obtain relevant parameters for optimal beamforming, thereby increasing time, load, and power consumption.

Further, there has been growing interest in using millimeter wave (mmWV), in the spectrum between 30 GHz and 300 GHz, along with other high frequency waves in the range of 28 GHz to 39 GHz and sub 6 GHz waves in the range of 1 GHz to 6 GHz, as part of Fifth-Generation New Radio (5G-NR) implementation since these waves enable increased bandwidth and faster data transmission over shorter distances or small-cell coverage area. However, these waves have high frequency and narrow wavelengths. As such, these waves are prone to losses due to obstacles/blockages such as building, architecture materials of building, vegetation, atmospheric attenuation such air attenuation, gases attenuation, rain attenuation, oxygen attenuation, humidity absorption, channel attenuation, etc. This limits the propagation of signals/beams to few kilometers and also leads to degradation of signals/beams.

For example, referring to FIG. 1, a transmitting antenna 102 is located on a high-rise building B1 and is transmitting a signal/beam to a receiving antenna 104 located on a high-rise building B2. During a non-line of sight (NLOS) transmission 106, the beam is reflected by a high-rise building B3 towards the receiving antenna 104. During line of sight (LOS) transmission 108, the beam is obstructed due to presence of building B4. The link loss in high frequency bands in the LOS transmission 108 is in the range of 16 dB to 24 dB and is higher than the link loss in low frequency bands. The link loss in the NLOS transmission 106 is in the range of 10 dB to 18 dB, and is higher than the link loss in low frequency bands. In addition, the link loss in high frequency bands in NLOS transmission 106 is in the range of 15 dB to 30 dB, higher than the link loss in high frequency bands in LOS transmission 106.

Further, 5G-NR implementation requires massive multiple-input and multiple-output (MIMO) antennas planning and prediction of coverage, data rate and capacity. Therefore, in response to such requirements, it is necessary to perform three-dimensional 3D precise modelling of the massive MIMO antennas and beam modelling for channels such as single sideband modulation (SSB), Physical Downlink Shared Channel (PDSCH), etc., while also satisfying experience requirements of standby, latency, and reliability. However, MIMO requires a complex and costly baseband unit (BBU) to coordinate with receivers and radios behind every element, which results in high cost and power consumption.

Some solutions are being developed to overcome abovementioned deficiencies. In an example solution, and referring to FIG. 2, a transmitting antenna 202 sends mmWV signals towards a receiving antenna 204. An optimum open or obstruction-free window W1 is selected for transmission of mmWV beams by analyzing radio radar mode reflections from near and/or far objects/blockages, O1, O2, O3, and O4, in the environment and choosing lowest reflection zone based on reflections from near objects, e.g., between the obstruction O1 and obstruction O4, as the obstruction-free window. However, such solution is unable to provide a clear open window for transmission in case of several objects having different attenuation levels as the open window is of fixed size. This leads to loss of signals in such specific beam directions. In addition, such obstruction-free window W1 is selected in two-dimension mode and therefore cannot provide clear area for transmission in case of several obstructions with different attenuation levels.

In another solution, a network is designed for a wireless communication system supporting higher data transmission. To this end, at least one environmental element related to millimeter wave (mmWave) propagation is set on the basis of image information in a set map. Image information is obtained from 3D images, which includes depth information in addition to height and width information as obtained from 2D images. A design region is grouped in the map into at least one detailed region on the basis of the set at least one environmental element. The network is then designed according to the grouped at least one detailed region. However, such solution cannot provide clear area for transmission in case of several obstructions with different attenuation levels.

Thus, a solution is required to overcome the abovementioned deficiencies.

SUMMARY

Embodiments of the disclosure provide a method and system for controlling beamforming for intelligent three-dimensional (3D) aerial wireless transmission.

In various example embodiments of the present disclosure, a method of beamforming for at least one transmitting antenna is disclosed. Such beamforming is intelligently controlled for 3D aerial wireless transmission. The method includes: identifying at least one obstruction in at least one three-dimensional aerial view image of a current location of the at least one transmitting antenna; forming at least one set of virtual layers comprising of one or more virtual layers corresponding to the at least one obstruction; determining a collective attenuation value for the at least one set of virtual layers based on an attenuation value of the one or more virtual layers; and forming at least one first beam based on the collective attenuation value.

In various example embodiments of the present disclosure, a system for implementing a beamforming method for at least one transmitting antenna is disclosed. The system intelligently controls the beamforming for 3D aerial wireless transmission. The system includes: an image analyzing unit comprising image analyzing circuitry, a virtual layer-forming unit comprising virtual layer-forming circuitry, an attenuation determination unit comprising attenuation determining circuitry, and a beamforming unit comprising beamforming circuitry. The image analyzing unit is configured to identify at least one obstruction in at least one three-dimensional aerial view image of a current location of the at least one transmitting antenna. The virtual layer-forming unit is configured to form at least one set of virtual layers comprising of one or more virtual layers corresponding to the at least one obstruction. The attenuation determination unit is configured to determine a collective attenuation value for the at least one set of virtual layers based on an attenuation value of the one or more virtual layers. The beamforming unit is configured to form at least one first beam based on the collective attenuation value.

Various advantages of the disclosure include, but not limited to, forming an efficient and high direction beam based on the at least one set of virtual layers identified based on obstructions/blockages in a dynamic manner. This leads to minimal/reduced losses and efficient beamforming with controlled transmission in 3D aerial wireless transmission. Further, this enables considerable reduction in time, load, and power consumption for beamforming. Further, such efficient beam formation enables optimization of link budget parameters for better transmission power link. Further, efficient beam control transmission within maximum permissible standards in the presence of obstructions is enabled.

Further, such efficient and high direction beam forming enables efficient and dense network deployment for 3D aerial wireless transmission while delivering high quality line of sight connectivity. Such efficient and dense network supports seamless mobility while complementing effective cell power transmission coverage area.

Furthermore, network candidate sites and RF parameters can be planned efficiently based on requirements, and coverage simulation results can be generated to efficiently reduce the total cost of experimental network construction. After the network construction, the coverage simulation can be used in selecting the best test routes or test locations at the network site.

These aspects and advantages will be more clearly understood from the following detailed description taken in conjunction with the accompanying drawings and claims.

BRIEF DESCRIPTION OF THE DRAWINGS

These and other features, aspects, and/or advantages of certain embodiments of the present disclosure will more apparent from the following detailed description, taken in conjunction with the accompanying drawings in which like characters represent like parts throughout the drawings, an in which.

Figure 1:
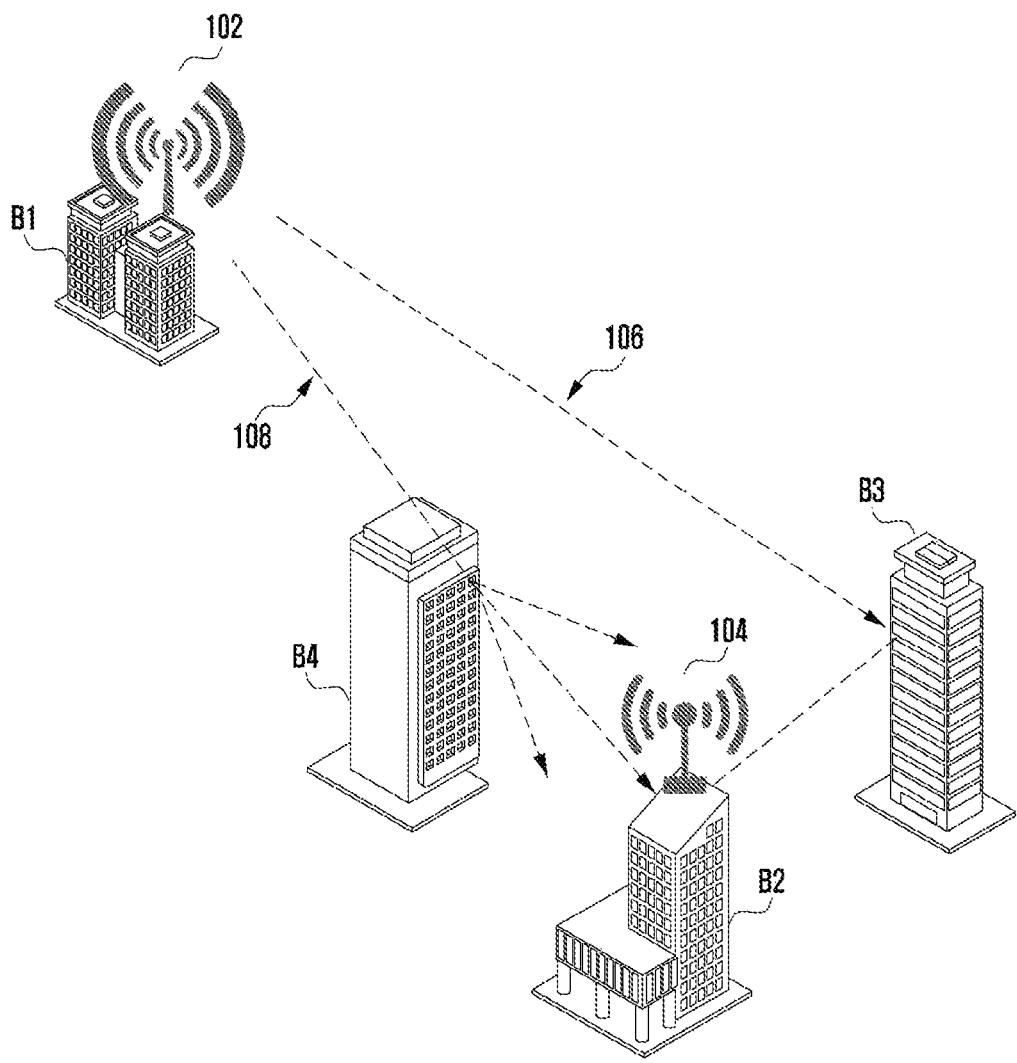
FIG. 1 is a diagram illustrating non-line of sight transmission and line of sight transmission as known in the art.
Figure 2:
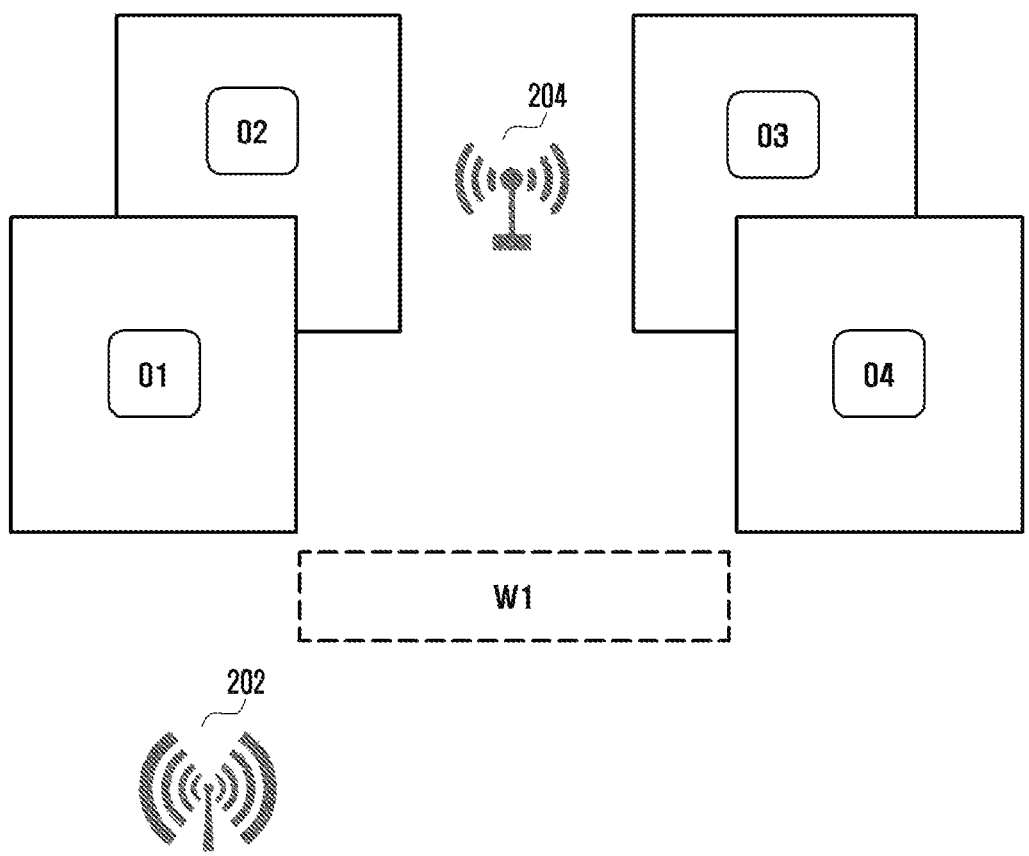
FIG. 2 is a diagram illustrating a wireless communication system for beamforming as known in the art.

Further, skilled artisans will appreciate that elements in the drawings are illustrated for simplicity and may not have been necessarily been drawn to scale. For example, the flowcharts illustrate the method in terms of some operations involved to help to improve understanding of aspects of the present disclosure. Furthermore, in terms of the construction of the device, one or more components of the device may have been represented in the drawings by conventional symbols, and the drawings may show some specific details that are pertinent to understanding various example embodiments of the disclosure so as not to obscure the drawings with details that will be readily apparent to those of ordinary skill in the art having benefit of the description herein.

DETAILED DESCRIPTION

Reference will now be made to various example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. Unless otherwise defined, all technical and scientific terms used herein have the same meaning as commonly understood by one of ordinary skilled in the art to which this disclosure belongs. The system, methods, and examples provided herein are illustrative only and not intended to be limiting. Embodiments of the present disclosure will be described below in detail with reference to the accompanying drawings.

Figure 3:
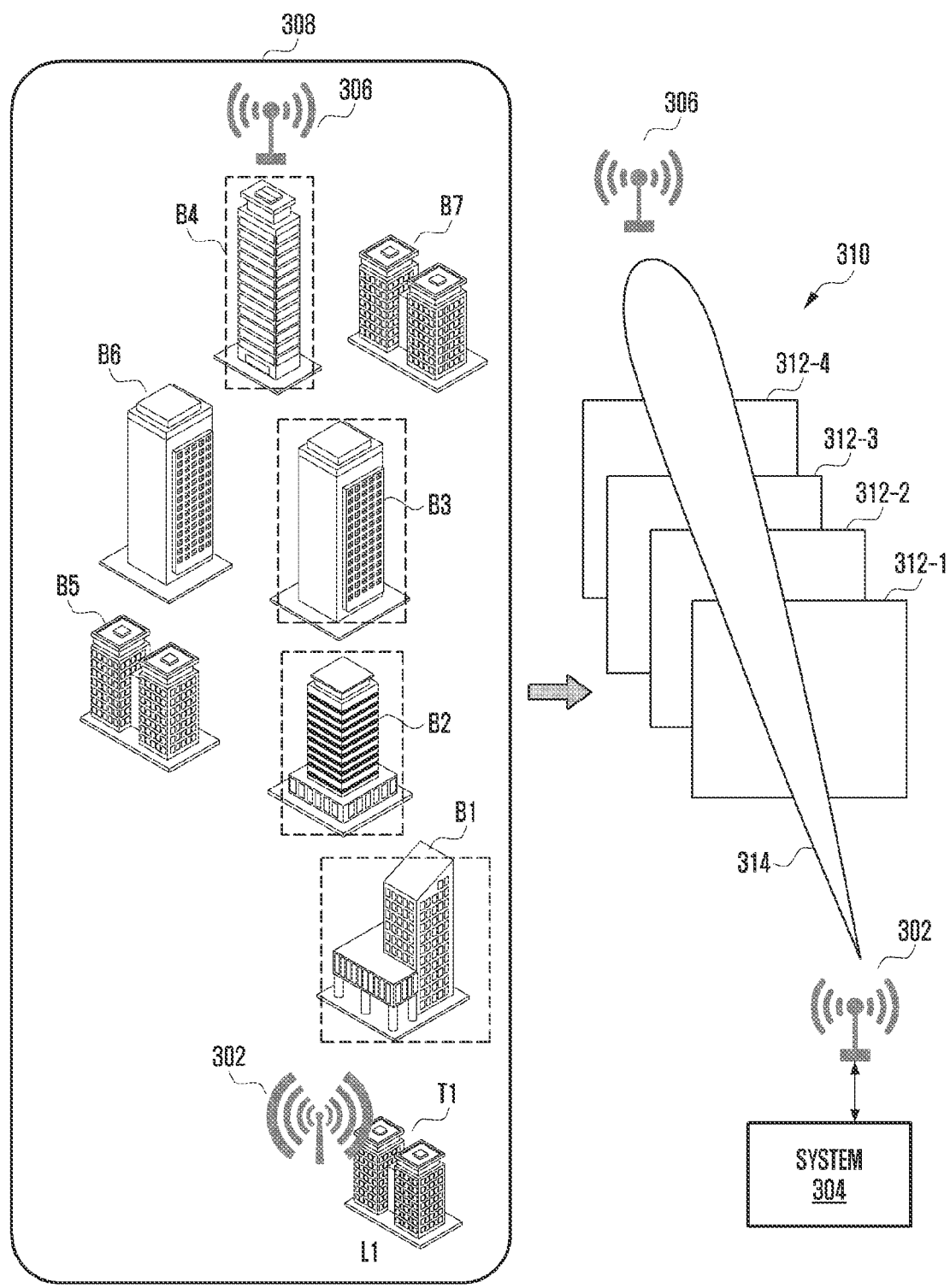
FIG. 3 is a diagram illustrating an example wireless communication system adapted according to various embodiments.

Referring to FIG. 3, a wireless communication system 300 adapted according various embodiments is illustrated. In the embodiment, the wireless communication system 300 includes at least one transmitting antenna 302 and a system 304 for implementing a beamforming method for the at least one transmitting antenna 302. The system 304 intelligently controls the beamforming for three-dimensional aerial wireless transmission. The at least one transmitting antenna 302 transmits signal or the beam in a direction of at least one receiving antenna 306. The wireless communication system 300 is communication system implementing various frequency bands. In an implementation, the wireless communication system 300 is a 5G communication system implementing very high frequency bands or millimeter waves (mmWV) or sub 6 GHz band or a combination thereof.

Examples of the at least one transmitting antenna 302 can include, but not limited to, an individual beam antenna and an array antenna that can form one or more beams using millimeter wave (mmWV) or other waves in high frequency bands or in sub 6 GHz band in a specific direction. The at least one transmitting antenna 302 may be integral part of user equipment and/or a base station. The user equipment may comprise, for example, as smart phone, a wearable device, a virtual reality (VR) device, a vehicle, an autonomous small size aerial robot, and an Internet of Things (IoT) device. The autonomous small size robot may comprise, for example, drone. The base station may comprise, for example, network access point, a network router, a network switch, a network gateway, etc. As such, the system 304 may also be integral to the user equipment and/or the base station. The at least one receiving antenna 306 may be, like the at least one transmitting antenna 302, integral part of other user equipment and/or other base station. In an example, the at least one transmitting antenna 302 may be placed on higher grounds such as on top of buildings. In an example, the at least one transmitting antenna 302 may be flying as part of unmanned aerial vehicle. In an example, the at least one receiving antenna 306 may be placed on higher grounds such as on top of buildings. In an example, the at least one receiving antenna 306 may be flying as part of unmanned aerial vehicle.

In accordance with the embodiment, the system 304 obtains at least one three-dimensional (3D) aerial view image 308 of a current location of the at least one transmitting antenna 302 and identifies at least one obstruction in the at least one 3D aerial view image 308. The system 304 identifies the at least one obstruction on a line of sight (LOS) transmission between the at least one transmitting antenna 302 and the at least one receiving antenna 306. The at least one obstruction can be manmade obstruction(s) or natural obstruction(s). Examples of the obstruction include, but not limited to, buildings/high-rise structures, trees, vegetation, materials such as concrete, asphalt, glass, stainless steel, etc., vehicles, and a human body. In the illustrated figure, the transmitting antenna 302 is mounted on a building T1 at location L1 and the receiving antenna system 304 is mounted on a building B4. It would be understood that the current location of the transmitting antenna can be longitude-latitude coordinates or can be a geographical area. As such, the receiving antenna can be located at different longitude-latitude coordinates or in same geographical area.

The system 304 obtains the 3D aerial view image 308 of the location L1. The system identifies various buildings B1 to B7 as obstructions. The system 304 identifies four obstructions, e.g., buildings B1, B2, B3, and B4, as the obstructions (indicated by dashed polygons on the buildings) on a line-of-sight (LOS) transmission between the transmitting antenna 302 and the receiving antenna 306. The identification of the at least one obstruction shall be explained in later paragraphs.

The system 304 then forms at least one set 310 of virtual layers comprising of one or more virtual layers 312 corresponding to the at least one obstruction. The shape of the virtual layer 312 can be any polygon. The one or more virtual layers 312 indicate an attenuation value of the at least one obstruction and plurality of obstructions parameters corresponding to the at least one obstruction. In the illustrated figure, the system 304 forms virtual layers 312-1 corresponding to the building B1 and is formed based on the attenuation value of the building B1 and plurality of obstructions parameters corresponding to B1. The system 304 forms virtual layers 312-2 corresponding to the building B2 and is formed based on the attenuation value of the building B2 and plurality of obstructions parameters corresponding to B2. The system 304 forms virtual layers 312-3 corresponding to the building B3 and is formed based on the attenuation value of the building B3 and plurality of obstructions parameters corresponding to B3. The system 304 forms virtual layers 312-4 corresponding to the building B4 and is formed based on the attenuation value of the building B4 and plurality of obstructions parameters corresponding to B4. Each of the virtual layers 312-1, 312-2, 312-3, and 312-4, indicate the attenuation value of the corresponding building. The system 304 then arranges the four virtual layers, 312-1, 312-2, 312-3, and 312-4 in a stack to form the set 310 of the virtual layers. The formation of the virtual layers and the set of virtual layers shall be explained in later paragraphs.

Thereafter, the system 304 determines a collective attenuation value for the at least one set 310 of virtual layers based on an attenuation value of the one or more virtual layers 312. In an implementation, the system 304 determines the collective attenuation value based on a summation of attenuation value of each of the virtual layers. The system 304 can implement any of summation techniques/mechanisms as known in the art such as linear summation, non-linear summation, weighted summation, weighted linear summation, etc. In the illustrated figure, the system 304 determines the attenuation value of each of the virtual layers 312-1, 312-2, 312-3, and 312-4, as A1, A2, A3, and A4, respectively, and obtains a collective attenuation value CA1 based on the summation of the attenuation values. The determination of the attenuation value of the virtual layers and the collective attenuation value of the set of the virtual layers shall be explained in detail in later paragraphs.

The system 304 then forms at least one first beam based on the collective attenuation value. Different beams can be formed based on the collective attenuation value. In the illustrated figure, the system 304 forms a beam 314 having high power based on the collective attenuation value for transmission of signals from the transmitting antenna 302 to the receiving antenna 306 to overcome the attenuations of the buildings identified on the LOS transmission. For the sake of brevity one beam is illustrated. It would be understood that the system 304 can form multiple beams of varying strength, gain, direction, etc., based on the collective attenuation value of the set 310 of virtual layers.

Thus, the present disclosure enables formation of efficient and high direction beam(s) based on the at least one set of virtual layers identified based on obstructions/blockages in a dynamic manner. This leads to minimal losses and efficient beamforming with controlled transmission in 3D aerial wireless transmission.

Constructional and operation examples of the system 304 shall now be explained by way of non-limiting example with reference to the remaining figures.

Figure 4:
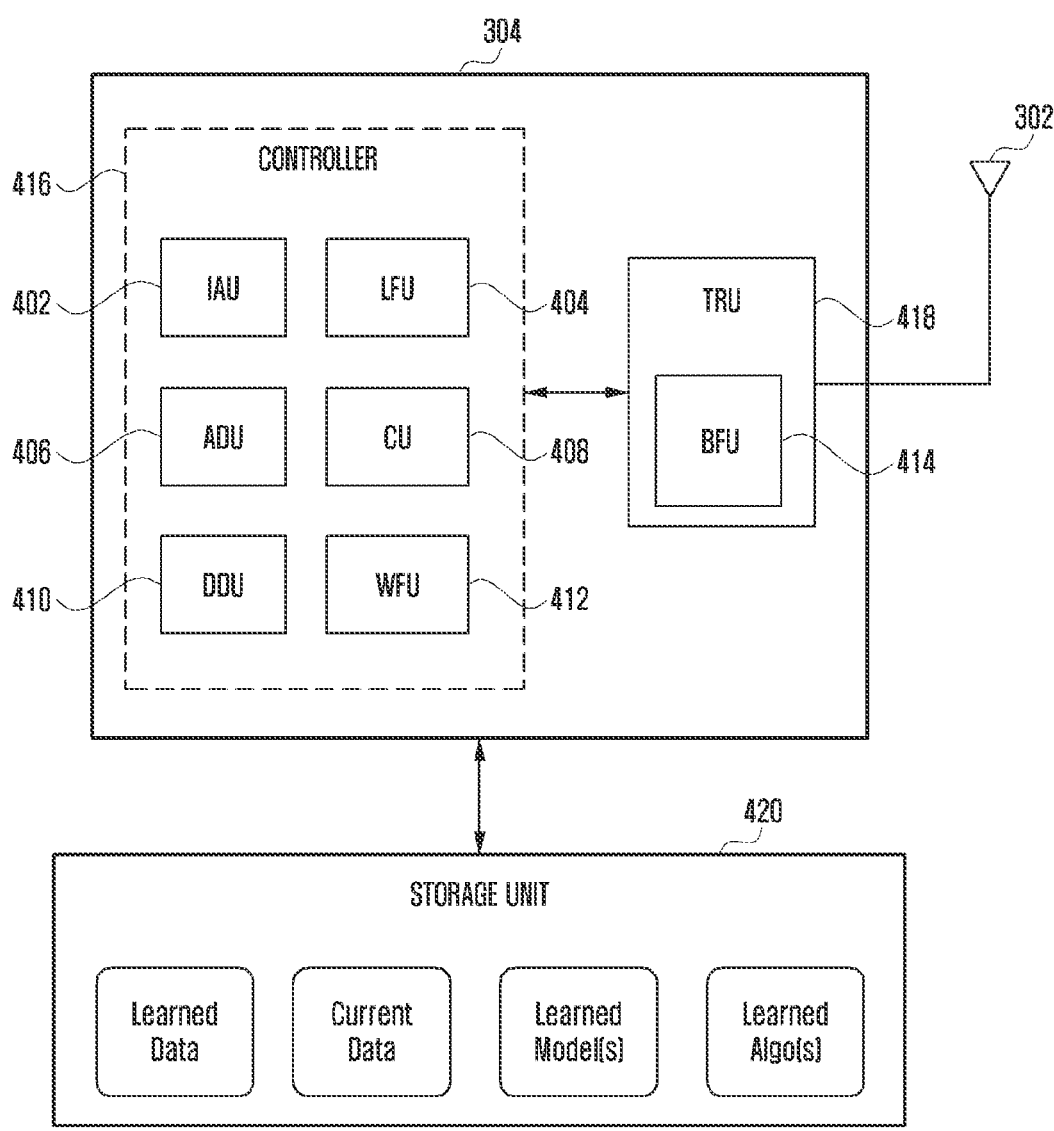
FIGS. 4, 5, 6A, 6B, 6C, 6D, 7A, 7B, 7C, 7D, 7E, 8, 9, 10A, 10B, 10C, 11, 12, 13A, 13B, 13C, 14A, 14B, 15A, 15B, 16, 17A, 17B, 17C, 18A and 18B are diagrams illustrating illustrate various example operations performed by the system for beamforming, according to various embodiments.

FIG. 4 is a diagram illustrates an example configuration of the system 304 according to various embodiments. The system 304 includes at least, an image analyzing unit (IAU) 402, a virtual layer-forming unit (LFU) 404, an attenuation determination unit (ADU) 406, a categorization unit (CU) 408, a density determining unit (DDU) 410, a window-forming unit (WFU) 412, and a beamforming unit (BFU) 414. Any or all of the IAU 402, the LFU 404, the ADU 406, the CU 408, the DDU 410, and the WFU 412 may be included in a single unit, such as a controller 416. Any and/or all of the units and/or the controller 416 may be implemented in hardware, software, instructions executed by at least one processing unit, or by a combination thereof (e.g., including various processing circuitry and/or executable program instructions). The processing unit may comprise a computer, a processor, a state machine, a logic array and/or any other suitable devices capable of processing instructions.

The BFU 414 can be included within a transmitting and receiving unit (TRU) 418. The TRU 418 controls and performs a function of transmitting signal(s) to the at least one receiving antenna 306 through one or more beams formed by the BFU 414. The system 304 may further be in communication with a storage unit 420. In an example implementation, the storage unit 420 may be, like the system 304, integral to the user equipment and/or the base station. In another implementation, the storage unit 420 may be external to the user equipment and/or the base station. The system 304 may store data such as learned models, training data, testing data, learning algorithms, learned data, and threshold values, including current values and historical values of various parameters in the storage unit 420. The system 304 may also store current values and historical values of characteristics of the transmitting antenna 302 and receiving antenna 306 in the storage unit 420. The characteristics of the antenna can include distance of the antenna from earth, facing or direction of the antenna with respect to obstruction(s), and facing or direction of the antenna with respect to other antennas. The system 304 may also store current values and historical values of parameters of the transmitting antenna 302 and receiving antenna 306 such as frequency, transmission power, beam rate, etc., in the storage unit 420

Referring to FIGS. 3 and 4, the IAU 402 identifies at least one obstruction on the 3D aerial view image 308 of the current location of the transmitting antenna 302. To this end, the IAU 402 obtains the at least one 3D aerial view image 308 of the current location of the at least one transmitting antenna 302. As would be understood, 3D aerial view image provides a bird-eye view of any location. Typically, 3D aerial view image is obtained set at an angle in the range of 45-degree to 60-degree from the ground level and at an altitude of 1000 feet or above. As such, the 3D aerial view image has distinct detailing which is not captured in front, side and rear elevations. In an example, architectural details of a building can be easily recognized in the 3D aerial view image as compared to flat, overhead views.

In an example implementation, a location detecting unit (not shown in the figure) may provide a current location of the transmitting antenna 302. Examples of the location detecting unit can include but not limited to GPS, sensors, etc. An image-capturing unit of the user equipment and/or the base station may capture the at least one 3D aerial view image 308 of the current location and transmit to the IAU 402. Examples of the image-capturing unit may include but not limited to 3D camera, depth camera, 360-degree camera, etc. For example, the antenna 302 can be integral to the base station mounted on top of a building and the IAU 402 obtains the image 308 from a 3D camera integrated with the base station. In an example, the antenna 302 can be integral to the drone flying at the altitude of 1500 feet and the IAU 402 obtains the image 308 from a 3D depth camera integrated with the drone. In an example implementation, IAU 402 may obtain the at least one 3D aerial view image 308 from an external server hosted image database. For example, the antenna 302 can be integral to the user equipment such as smart phone, and the IAU 402 obtains the image 308 from the external server hosted database. The IAU 402 may obtain the at least one 3D aerial view image 308 for beamforming.

Upon obtaining the 3D aerial view image 308, the IAU 402 identifies the at least one obstruction on the at least one 3D aerial view image 308. The at least one obstruction is identified on a line-of-sight (LOS) transmission between the at least one transmitting antenna 302 and at least one receiving antenna 306. It would be understood that the current location of the transmitting antenna can be longitude-latitude coordinates or can be a geographical area. As such, the receiving antenna can be located at different longitude-latitude coordinates or in same geographical area.

To this end, the IAU 402 analyses the at least on 3D aerial view image 308 (hereinafter interchangeably referred to as "3D aerial view image 308" or "3D image 308" for the sake of brevity and/or clarity) using one or more learned image classifiers to identify the at least one obstruction, as known in the art. The learned image classifiers include, but not limited to, convolutional neural network classifier, 3D-convolutional neural network classifier, fully convolutional neural network classifier, deep convolutional neural network classifier, etc.

In an example implementation, the IAU 402 determines one or more objects in the 3D aerial view image 308 using one or more neural networks, as known in the art. The IAU 402 determines the one or more objects by predicting bounding boxes for each of the one or more objects using the one or more neural networks. Examples of the neural network include, but not limited to, convolutional neural network (CNN), a deep-CNN, spike-timing dependent plasticity (STDP) based spiking neural networks (SNN), STDP based deep-CNN, etc. The IAU 402 then adds one or more further predefined shapes to the at least one aerial view image 208. The predefined shape can be any know geometrical shape and can be of any color and size. The IAU 402 then classifies at least one object and corresponding object parameters from the one or more objects as the at least one obstruction based on a plurality of predefined classes using the one or more learned image classifiers.

Figure 5:
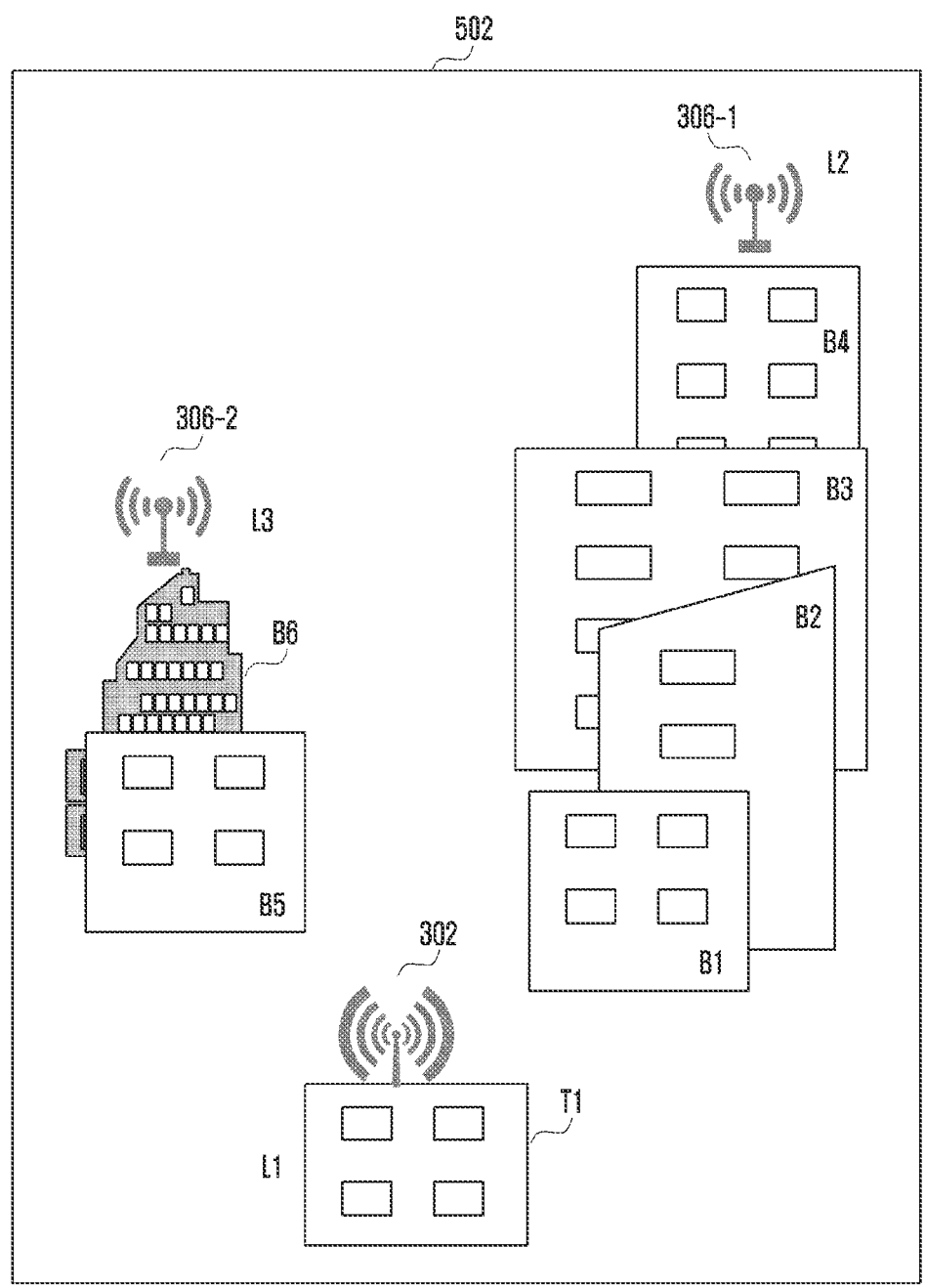

Referring to FIG. 5, an example 3D aerial view image 502 according to various embodiments is illustrated. The 3D aerial view image 502 depicts various buildings. In the example, the locations are the longitude-latitude coordinates of the antennas. The transmitting antenna 302 is mounted on a building T1 at location L1. A receiving antenna 306-1 is mounted on a building B4 at location L2 and a receiving antenna 306-2 is mounted on a building B6 at location L3. The IAU 402 identifies obstructions as buildings B1, B2, B3, and B4 on a LOS transmission between the transmitting antenna 302 and the receiving antenna 306-1. The IAU 402 identifies obstructions as buildings B5 and B6 on a LOS transmission between the transmitting antenna 302 and the receiving antenna 306-2.

Upon identifying the at least one obstruction, the LFU 404 forms the at least one set 310 of virtual layers comprising of the one or more virtual layers 312 corresponding to the at least one obstruction. To this end, the LFU 404 obtains a plurality of obstruction parameters corresponding to the at least one obstruction. The plurality of obstruction parameters include size of the obstruction as viewed from one or more viewing angles, shape of the obstruction as viewed from one or more viewing angles, area of the obstruction as viewed from one or more viewing angles, outer surface material of the obstruction as viewed from one or more viewing angles, inner material, particulates, thickness between outer surface of the obstruction and inner surface of the obstruction as viewed from one or more viewing angles, particulate size, particulate shape, composition, pattern of outer surface, penetration depth, permittivity, dielectric constant, reflectance, location, direction, distance from earth, and distance from the at least one transmitting antenna 302.

As would be understood, the viewing angles correspond to angles at which the image-capturing unit captures the 3D aerial view image 308.

The LFU 404 obtains or determines the plurality of obstruction parameters for the at least one obstruction based on at least one of predefined obstruction parameters and or more learned models. In an example implementation, the LFU 404 determines the plurality of obstruction parameters from an external database that stores predefined values of the obstruction parameters. In an example implementation, the LFU 404 determines the plurality of obstruction parameters using deep learning techniques/models such as using deep 3D CNNs. In an example implementation, the LFU 404 determines the plurality of obstruction parameters based on radio frequency (RF) propagation losses using analytical frequency dependent models. Thus, upon classifying the objects as obstructions, the LFU 404 determines the obstruction parameters.

The LFU 404 then determines a plurality of virtual layer parameters based on one or more of the plurality of obstruction parameters, characteristics of the at least one transmitting antenna 302, and characteristics of the at least one receiving antenna 306. As such, the virtual layer parameter is representative of the attenuation value as derived the obstruction parameters and the obstruction parameters.

The plurality of virtual layer parameters include a shape of the one or more virtual layers, a side length of the one or more virtual layers, density packing of the one or more virtual layers, and coverage area of the one or more virtual layers. The shape of virtual layer can be any polygon such as rectangle, square, hexagonal, trapezium, etc. The shape of the virtual layer can be any of two-dimensional (2D) shape and a three-dimensional (3D) shape. The characteristics of the at least one transmitting antenna 302 include distance of the at least one transmitting antenna 302 from earth, facing or direction of the at least one transmitting antenna 302 with respect to the at least one obstruction, and facing or direction of the at least one transmitting antenna 302 with respect to the at least one receiving antenna 306. The characteristics of the at least receiving antenna 306 include distance of the at least one receiving antenna 306 from earth, facing or direction of the at least one receiving antenna 306 with respect to the at least one obstruction, and facing or direction of the at least one receiving antenna 306 with respect to the at least one transmitting antenna 302.

In an implementation, the shape is determined as same as or similar to a visible shape of the identified obstruction as viewed from one or more viewing angles. In an implementation, the shape is determined as same as or similar to visible shape of the identified obstruction as viewed from one or more viewing angles and direction of the at least one transmitting antenna 302 with respect to the at least one obstruction. In an implementation, the shape is determined as same as or similar to a visible shape of the identified obstruction as viewed from one or more viewing angles and direction of the at least one receiving antenna 306 with respect to the at least one obstruction.

In an implementation, the shape is normalized to a standard (or best fit) polygon based on an area of the at least one obstruction. In an implementation, the shape of one virtual layer is normalized to a standard (or best fit or maximum neighborhood matching) polygon based on area and shape of the at least one obstruction as viewed from one or more viewing angles, shape of other virtual layers, and direction of the at least one receiving antenna 306 with respect to the at least one obstruction. In an implementation, the shape of one virtual layer is normalized to a standard polygon based on area and shape of the at least one obstruction as viewed from one or more viewing angles, shape of other virtual layers, and direction of the at least one transmitting antenna with respect to the at least one obstruction. In an example implementation, the shape is normalized to a standard polygon based on predefined priority set for direction of the transmitting antenna 302 with respect to the at least one obstruction. In an example implementation, the shape is normalized to obtain an optimum (or best fit or maximum neighborhood matching) shape as viewed for directions of the transmitting antenna 302 and the receiving antenna 306 with respect to the at least one obstruction.

In an implementation, the size is determined as minimal size with respect to minimal size corresponding to the identified obstruction. In an implementation, the shape of the virtual layer is 2D shape. In such implementation, the size is determined either same as or similar to a minimal or visible size of the identified obstruction. In an implementation, the shape of the virtual layer is 3D shape. In such implementation, the size is determined same as or similar to a size of the identified obstruction. It would be understood that a change in the shape of a virtual layer also changes the size and/or density packing and/or coverage area of the virtual layer; and vice-versa.

Accordingly, the LFU 404 determines the plurality of virtual layer parameters as a learned data obtained by processing one or more of the at least one obstruction, the plurality of obstruction parameters, the current location, the characteristics of the at least one transmitting antenna 302, the characteristics of the at least one transmitting antenna 302, and training data using a learned model. As such, the LFU 404 obtains input data comprising of training data and testing data from one or more databases, prior to initiating operations in accordance with the present disclosure. The training data includes known types of obstructions, corresponding known values of plurality of obstruction parameters, known values of various locations, known values of directions and distances of the transmitting antenna 302, known values of the directions and distances of the receiving antenna 306, and known representation of the obstruction as one virtual layer or combination of virtual layers. The LFU 404 applies one or more learning algorithms such as supervised learning algorithm, un-supervised learning algorithm, and semi-supervised algorithm to the input data to generate learned model(s). The LFU 404 also determines learned data from the learned model(s). The learned model(s) and the learned data indicate virtual layer parameters as derived from known values.

During operation, the LFU 404 obtains the current values of directions and distances of the transmitting antenna 302 and the current values of the directions and distances of the receiving antenna 306 using techniques as known in the art. Thereafter, the LFU 404 applies current data of the at least one identified obstructions comprising of determined values of corresponding plurality of obstruction parameters, the current location, the current values of directions and distances of the transmitting antenna 302, the current values of the directions and distances of the receiving antenna 306, and current instance of time (T); and the learned data, to the learned model(s). The learned model(s) generate an output as the plurality of virtual layer parameters.

In an example, the output indicates shape of virtual layer is two-dimensional square with length L based on a shape of the obstruction such as tree or building. In an example, the output indicates shape of virtual layer is two-dimensional rectangle with breadth B and length L based on a shape of the obstruction such as high-rise structure. In an example, the output indicates one virtual layer should be formed for each of the obstructions. In an example, the output indicates multiple virtual layers should be formed for each of the obstructions such as high-rise structures. In an example, the output indicates one virtual layer should be formed for some obstructions and multiple virtual layers should be formed for other obstructions.

In an example, the output indicates multiple virtual layers of same shape should be formed for one or more of the obstructions. In an example, the output indicates multiple virtual layers of different shapes should be formed for one or more of the obstructions. In an example, the output indicates shape of one virtual layer is a square upon normalizing a trapezium shape of the obstruction based on area of the trapezium, attenuation value, and shape of other virtual layers. In an example, the output indicates shape of one virtual layer is a rectangular upon normalizing a trapezium shape of the obstruction from a front viewing angle based on area of the trapezium, attenuation value, shape of other virtual layers, and direction of the transmitting antenna. The LFU 404 then forms the one or more virtual layers 312 based on the plurality of virtual layer parameters on the at least one 3D aerial view image 308 comprising the identified obstructions.

Figure 6A:
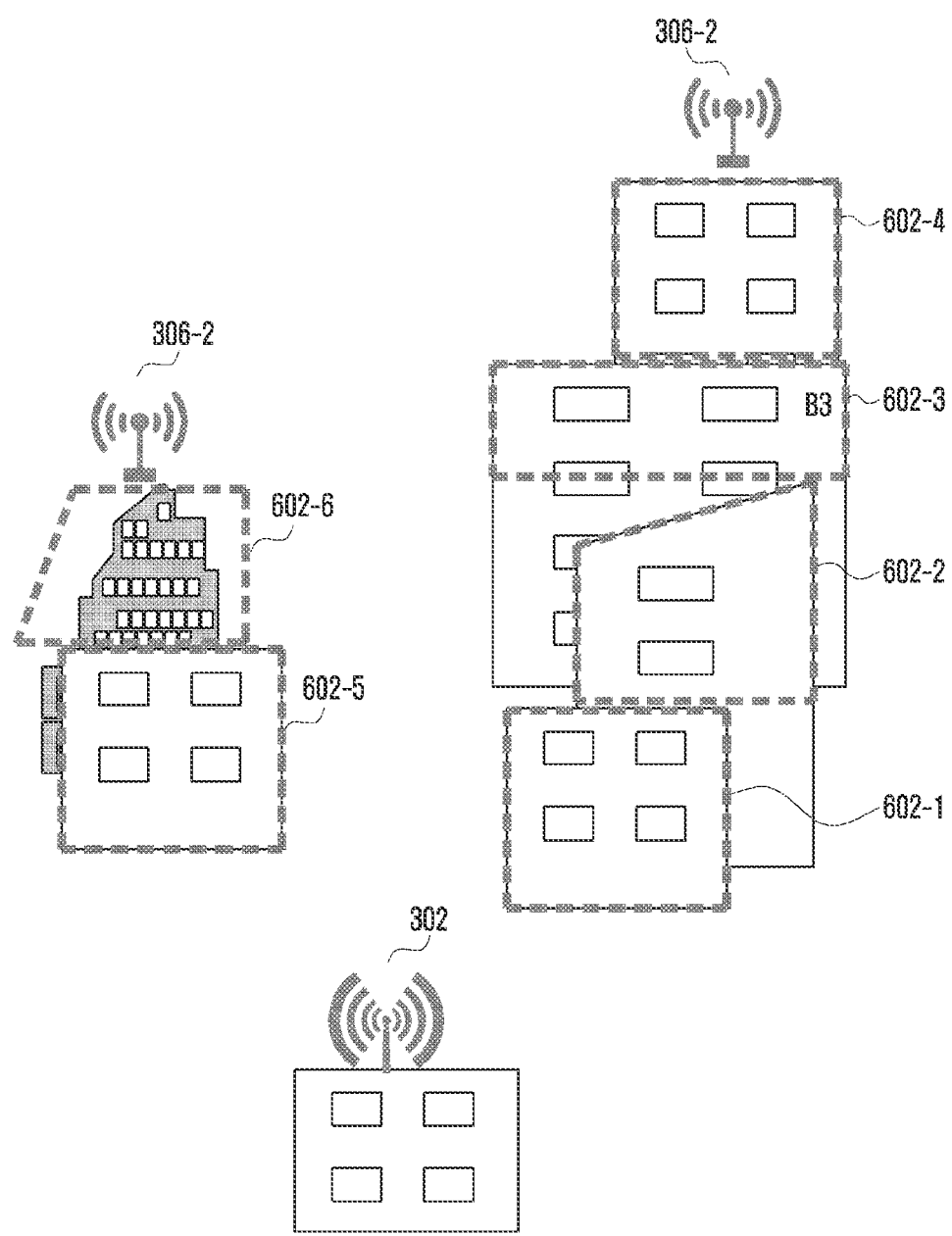

Referring to FIGS. 5 and 6A, virtual layers 602-1, 602-2, 602-3, and 602-4 are formed corresponding to the obstructions or buildings B1, B2, B3, and B4, respectively. Similarly, virtual layers 602-5 and 602-6 are formed corresponding to the obstructions or buildings B5 and B6, respectively. For the sake of brevity, one virtual layer has been depicted per obstruction/building. It is to be understood, multiple virtual layers can be formed per obstruction/building.

As described earlier, the LFU 404 may perform various actions to form the one or more virtual layers 312. In an example implementation, the LFU 404 determines a shape of the one or more virtual layers 312 is one of 2D shape and a 3D shape based on the plurality of virtual layer parameters. In an example implementation, the LFU 404 determines a shape of the one or more virtual layers 312 is one of an identical shape, a substantially similar shape, and a distinct shape based on the plurality of virtual layer parameters. In an example implementation, the LFU 404 determines a dimension of the one or more virtual layers 312 is one of an equal value and a distinct value based on the plurality of virtual layer parameters. In an example implementation, the virtual layers can be overlaid on the 3D aerial view image. In an example implementation, an updated 3D aerial view image can be formed by overlaying the virtual layers on the 3D aerial view image.

Figure 6B:
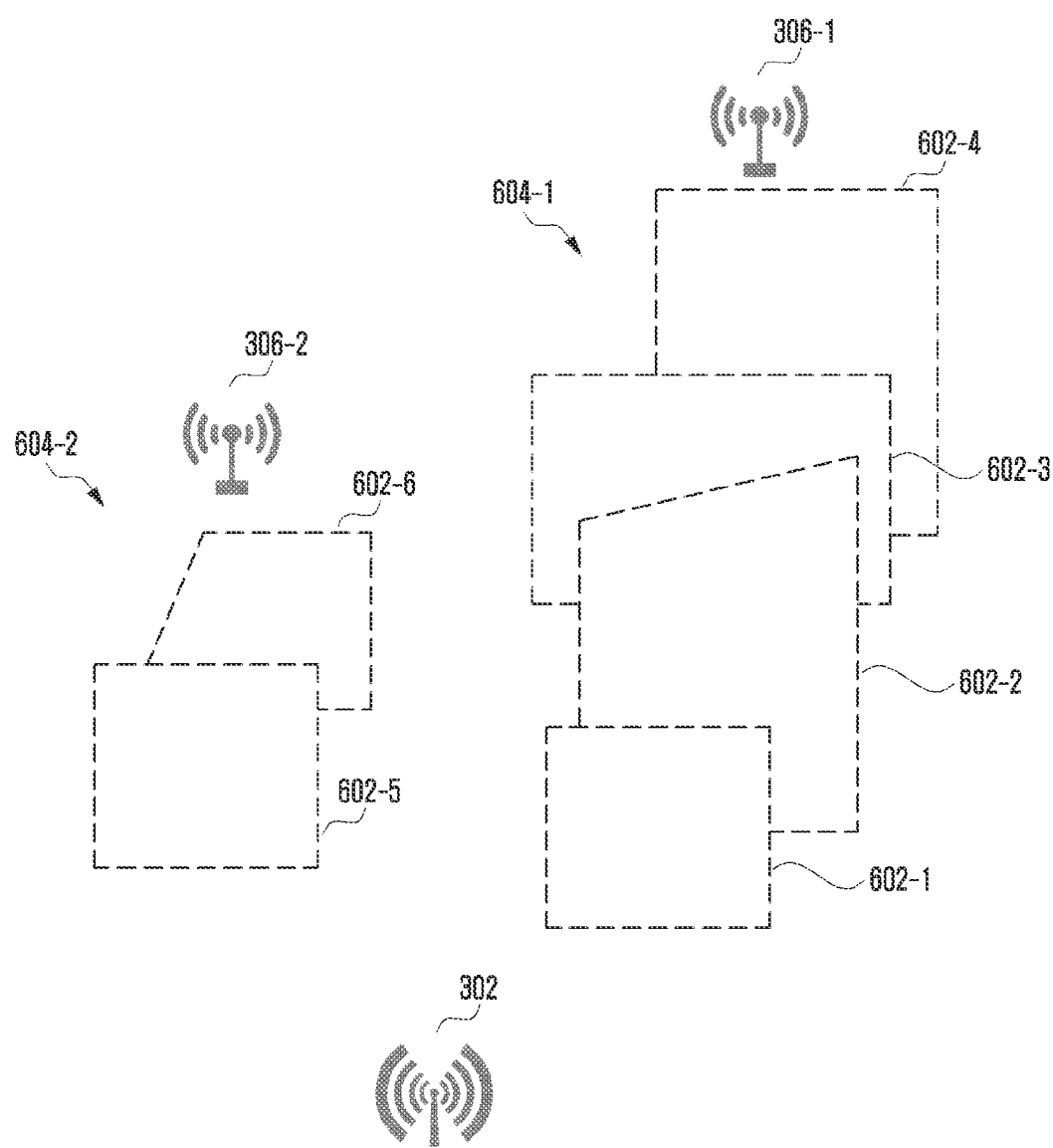

Referring to FIGS. 5, 6A and 6B, the virtual layers 602-1 and 602-5 are formed based on entire square shape of the buildings B1 and B5 as viewed or identified on the 3D aerial view image 502. The virtual layers 602-2, 602-3, 602-4, and 602-6 are formed based on a partial shape of the buildings B2 (e.g., trapezium shape), B3 (e.g., rectangular shape), B4 (e.g., square shape), and B6 (e.g., trapezium shape) as viewed or identified on the 3D aerial view image 502.

Figure 6C:
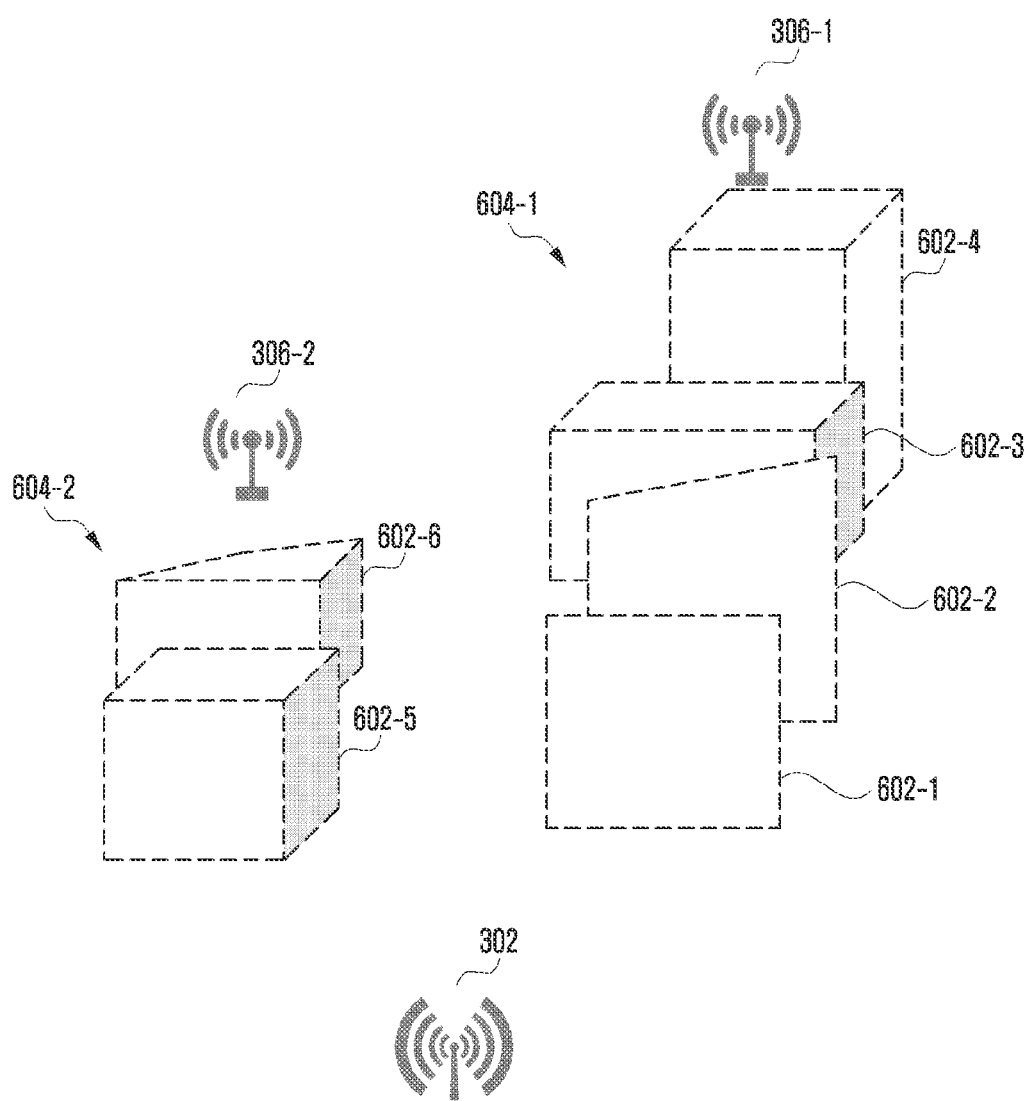

Upon forming the one or more virtual layers 312, the LFU 404 arranges the one or more virtual layers 312 corresponding to the at least one obstruction in a stack to form the at least one set 310 of virtual layers. Referring to FIGS. 6B and 6C, the virtual layers 602-1, 602-4, and 602-5 are determined to have same square shape based on a shape of the corresponding buildings B1, B4, and B5. Virtual layers 602-2 and 602-6 are determined to have different trapezium shape based on a shape of the corresponding buildings B2 and B6. The virtual layer 602-3 is determined to have rectangle shape based on a visible shape of the corresponding building B3. The virtual layers 602-1, 602-2, 602-3, and 602-4 are arranged in a stack to form a set 604-1 of virtual layers. Virtual layers 602-5 and 602-6 are arranged in a stack to form a set 604-2 of virtual layers.

Referring to FIG. 6B, the virtual layers 602-1, 602-2, 602-3, 602-4, 602-5, and 602-6 are determined to have a 2D shape. Referring to FIG. 6C, the virtual layers 602-3, 602-4, 602-5, and 602-6 are determined to have a 3D shape, while the virtual layers 602-1 and 602-2 are determined to have a 2D shape.

Figure 6D:
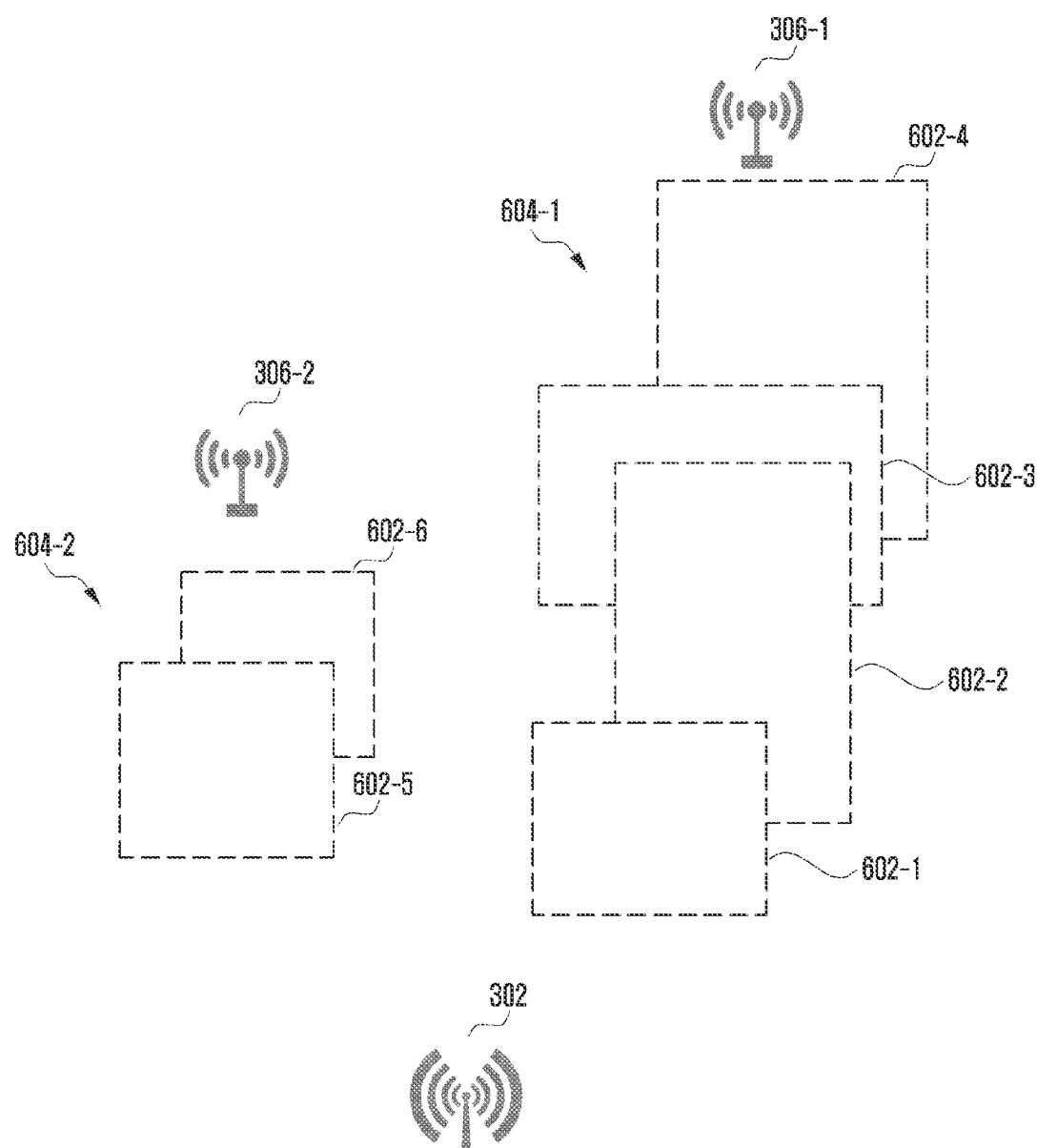

Referring to FIGS. 6B and 6D, the virtual layers 602-1, 602-4, and 602-5 are determined to have same square shape based on a shape of the corresponding buildings B1, B4, and B5. Virtual layers 602-2 and 602-6 are determined to have different trapezium shape based on a shape of the corresponding buildings B2 and B6. The virtual layer 602-3 is determined to have rectangle shape based on a visible shape of the corresponding building B3. As such, the shape of the virtual layer 602-2 is normalized to a rectangular shape based on the shapes of the virtual layers 602-1, 602-3, and 602-4, and attenuation value and/or the obstruction parameters of the building B2. Similarly, the shape of the virtual layer 602-6 is normalized to a square shape based on the shapes of the virtual layer 602-5, and attenuation value and/or the obstruction parameters of the building B6.

In an example, virtual layers V1 and V3 can be determined to have different shapes based on a partial shape of two buildings, BL1 and BL2, such as trapezium shape and rectangle shape, respectively, as viewed from a front viewing angle, e.g., from a direction of the transmitting antenna w.r.t the buildings. The virtual layers V2 and V4 can be determined to have a square shape based on entire square shape of the two buildings, BL1 and BL2, as viewed from rear viewing angle, e.g., from a direction of the receiving antenna w.r.t the buildings. As such, normalized virtual layers VN1 and VN2 are determined to have trapezium shape and rectangle shape, respectively, as viewed from the direction of the transmitting antenna based on a priority of the direction of the transmitting antenna.

In an example, virtual layers V1 and V3 can be determined to have different shapes based on a partial shape of two buildings, BL1 and BL2, such as trapezium shape and rectangle shape, respectively, as viewed from a front viewing angle, e.g., from a direction of the transmitting antenna w.r.t the buildings. The virtual layers V2 and V4 can be determined to have a square shape based on entire square shape of the two buildings, BL1 and BL2, as viewed from rear viewing angle, e.g., from a direction of the receiving antenna w.r.t the buildings. As such, normalized virtual layer VN1 is determined to have a square shape based on shape and size of the building BL1 and attenuation of the building BL1 such that the shape of the normalized virtual layer VN1 is optimum as viewed from the direction of the transmitting antenna and the receiving antenna. Similarly, normalized virtual layer VN2 is determined to have a rectangle shape based on shape and size of the building BL2 and attenuation of the building BL2 such that the shape of the normalized virtual layer VN2 is optimum as viewed from the direction of the transmitting antenna and the receiving antenna.

Upon formation of the set 310 of virtual layers, the ADU 406 determines the collective attenuation value of the at least one set 310 of virtual layers. Accordingly, the ADU 406 determines the attenuation value of the one or more virtual layers 312 or the obstruction(s) based on the plurality of obstruction parameters corresponding to the at least one obstruction and one or more predefined attenuation models.

In an example implementation, the one or more predefined attenuation models include, but not limited to, analytical frequency models, deep 3D-convolution neural network models, FITU-R model, RF propagation and prediction models from ITU-R P-Series recommended, multiple edge diffraction attenuation models for interference predictions using uniform geometrical theory of diraction (UTD) diffraction coefficients, RF Propagation models for outdoor attenuation, RF Propagation models for indoor attenuation etc. Examples of the RF Propagation models for outdoor attenuation include, but not limited to, Okumura model, Hata model for urban areas, Hata model for suburban areas, Hata model for open areas, and COST Hata model. Examples of RF Propagation models for indoor attenuation include, but not limited to, ITU indoor propagation model and log-distance path loss model. The attenuation models comprise various parameters frequency, path-elevation angle, height above mean sea level, water vapor density, etc., for determination of the attenuation value.

In various example implementations, the predefined attenuation models are based on neural network models that determine and predict a mapping between losses in transmission path and atmospheric objects that lay on the transmission path and their characteristics. The neural network models are trained and validated using known data obtained by simulating various transmission paths through various objects under different conditions.

In various example implementations, the predefined attenuation models are based on feed forward neural network (FFNN) models that determine and predict a mapping between losses in transmission path and objects that lay on the transmission path and their characteristics. Examples of the FFNN models include single virtual layered FFNN model, multi-virtual layered FFNN models, etc. The FFNN modes are trained and validated using known data. The hidden virtual layer is then analyzed and artificial neural network (ANN) models are generated for predicting the attenuation values. In various example implementations, the predefined attenuation models are based on other deep learning techniques as known in the art.

The ADU 406 applies input data comprising of values of the plurality of obstruction parameters to a predefined attenuation model(s) using one or more learning algorithms such as supervised learning algorithm, un-supervised learning algorithm, and semi-supervised algorithm and/or one or more prediction algorithms such as KNearest Neighbors, Decision Tree, and Random Forest, with regression models. The predefined attenuation model(s) generate an output as the attenuation value for the virtual layer(s) corresponding to the obstructions. In an example, the obstruction is a tree and a single virtual layer is formed corresponding to the tree. In such example, the attenuation value is determined for the single virtual layer. In an example, the obstruction is a building and a single virtual layer is formed corresponding to the building based on the plurality of obstruction parameters such as size, shape, area, outer surface material, inner material, particulates, thickness, particulate size, particulate shape, composition, pattern of outer surface, penetration depth, permittivity, dielectric constant, etc. of the building. In such example, the attenuation value is determined for the single virtual layer based on the plurality of the obstruction parameters. In an example, the obstruction is a building and multiple virtual layers are formed corresponding to various levels of the building based on the plurality of obstruction parameters such as size, shape, area, outer surface material, inner material, particulates, thickness, particulate size, particulate shape, composition, pattern of outer surface, penetration depth, permittivity, dielectric constant, etc. of the building. In such example, the attenuation value is determined for the each virtual layer based on the plurality of the obstruction parameters for each level.

In an example implementation, the transmitting antenna 302 is movable. In such implementation, the ADU 406 determines or predicts the attenuation values in real time or in current time. In an example implementation, the transmitting antenna 302 is fixed. In such implementation, the ADU 406 determines or predicts the attenuation values offline at time prior to current time and stores the attenuation values in the storage unit 420. In an example implementation, the ADU 406 is implemented as software defined radio.

Upon determining the attenuation value of the one or more virtual layers 312, the ADU 406 determines the collective attenuation value of the set 310 of the virtual layers based on a summation of the attenuation value of each of the one or more virtual layers 312. To this end, the ADU 406 may implement a summation module to perform the summation of the attenuation value. The summation module can implement any of summation techniques/mechanisms as known in the art such as linear summation, non-linear summation, weighted summation, weighted linear summation, etc. In an example, collective attenuation value of all sets of virtual layers can be determined based on one type of summation technique. In an example, collective attenuation value of different sets of virtual layers can be determined based on one different type of summation techniques. As such, the collective attenuation value of the set 310 of the virtual layers indicates the total transmission loss due to the presence of the various obstructions in the LOS transmission between the transmitting antenna 302 and the receiving antenna 306.

Figure 7A:
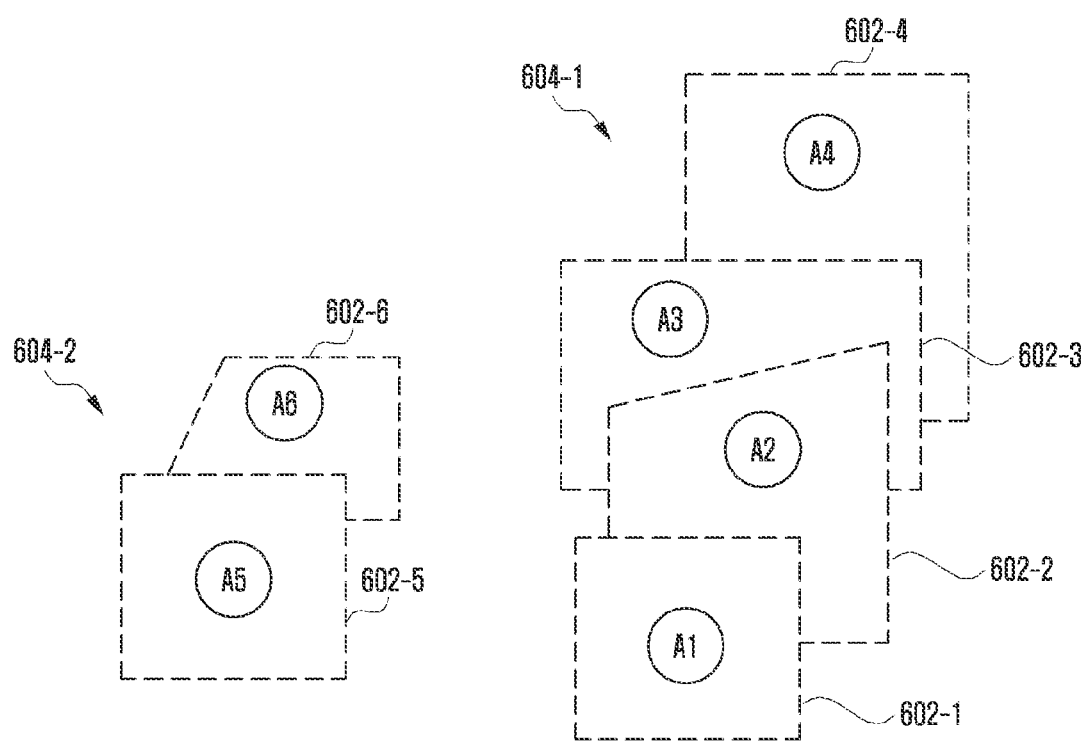
Figure 7B:
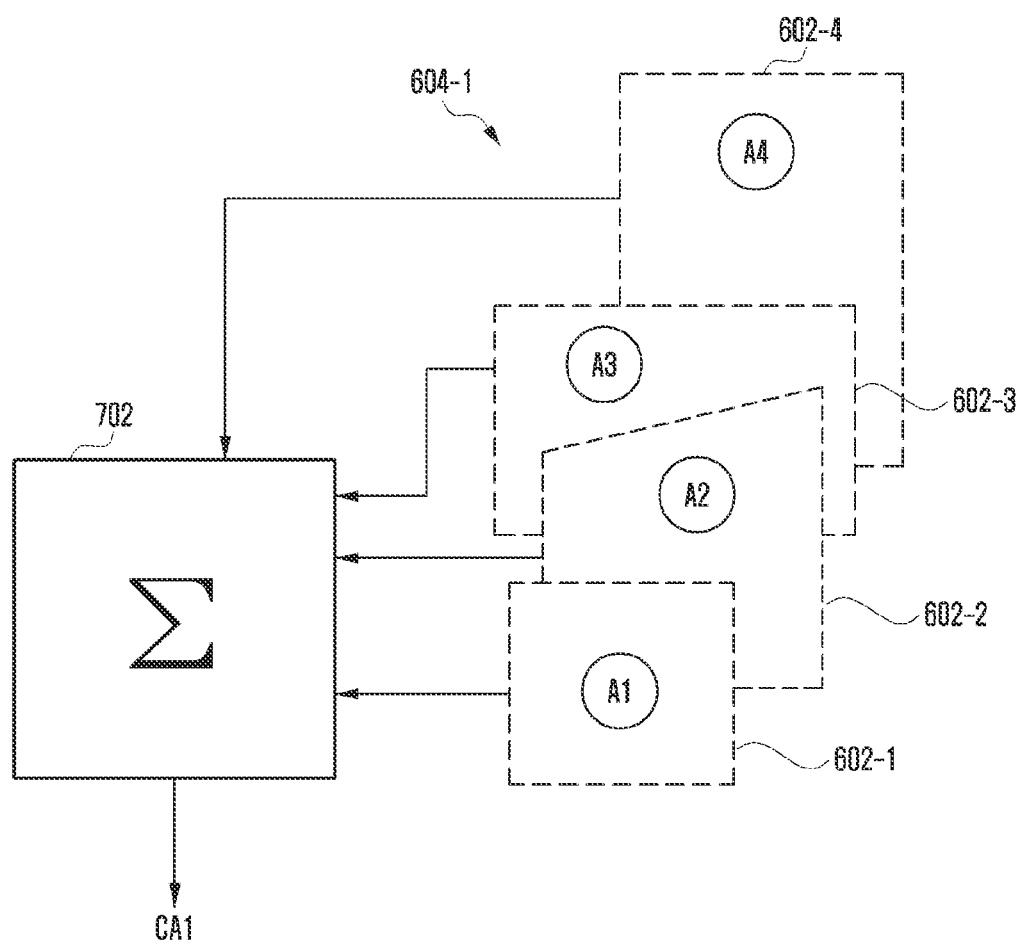
Figure 7C:
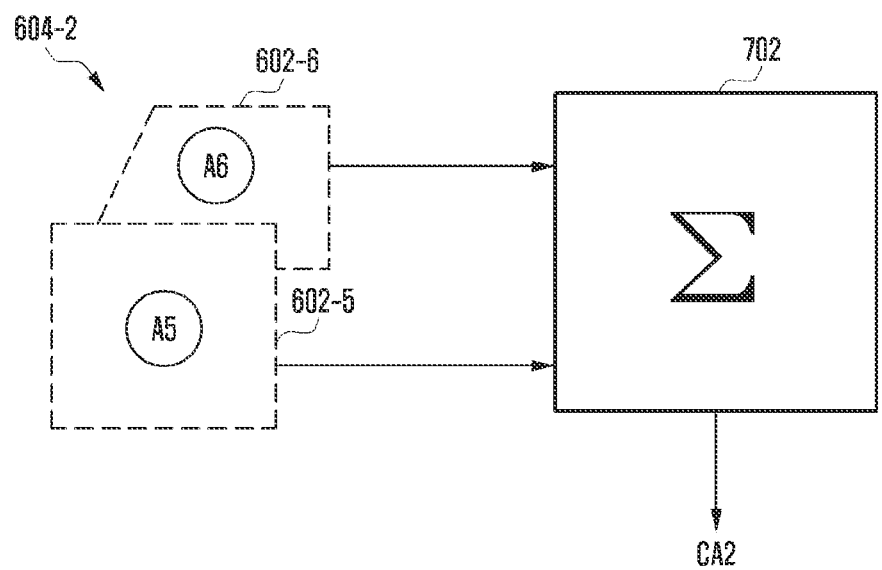

Referring to FIG. 7A, attenuation values A1, A2, A3, A4, A5, and A6 are determined for the virtual layers 602-1, 602-2, 602-3, 602-4, 602-5, and 602-6, respectively. Referring to FIG. 7B, a summation module 702 determines collective attenuation value CA1 for the set 604-1 of the virtual layers based on the summation of the attenuation values A1, A2, A3, and A4. Referring to FIG. 7C, a summation module 702 determines a collective attenuation value CA2 is determined for the set 604-2 of the virtual layers based on the summation of the attenuation values A5 and A6.

Further, in various example embodiments, upon determining the attenuation values, the ADU 406 assigns a dynamically determined weight to each of the one or more virtual layers 312 based on one or more of predefined weighted attenuation models, dynamic parameters, and one or more of the plurality of virtual layer parameters to obtain a weighted attenuation value. The dynamic parameters include channel conditions and ambient environmental conditions. The weight is dynamically determined as a learned data obtained by processing attenuation value of the one or more virtual layers, the dynamic parameters, one or more of the plurality of virtual layer parameters, and training data using one or more predefined weighted attenuation models. The training data includes known values of the attenuation, layers, and channel conditions. In an example implementation, dynamic parameters, shape of the virtual layers, and attenuation value of the virtual layers are processed for determining the weight. In an example implementation, dynamic parameters, shape of the virtual layers, area of the virtual layers, and attenuation value of the virtual layers are processed for determining the weight.

In an example implementation, the dynamically determined weight assigned to each of the one or more virtual layers is an equal value. In an example implementation, the dynamically determined weight is assigned to each of the one or more virtual layers at same time instant. In an example implementation, the dynamically determined weight is assigned to each of the one or more virtual layers at different time instants. The ADU 406 derives the collective attenuation value based on summation of the weighted attenuation value of each of the one or more virtual layers 312.

Further, the predefined weighted attenuation models are based on spiking neural networks (SNN) model based on feed forward neural network (FFNN) and employing spike-timing-dependent-plasticity (STDP) that determine and predict a mapping between losses in transmission path and objects that lay on the transmission path and their characteristics. As would be understood, in SNN, each neuron in one layer is connected to all the neurons in next layer by a weighted connection. This leads to an output signal of a neuron having a different weighted potential contribution. Input neurons require spike trains. Therefore, input signals are encoded into spikes (above-threshold signals) to further feed the SNN. When STDP learning is applied to the SNN, weights of the connections between the neurons are modified or adapted based on spikes and current value of the weights. As such, a weight that induces a sub-threshold signal on a neuron is weakened or strengthened based on its relative timing to adjacent spikes generated by the same neuron. However, the weights that induce above-threshold signals, e.g. spikes, do not undergo adaptation. This results in multiple outputs with same value for synchronous input or different outputs at different times for asynchronous input.

As such, the ADU 406 applies input data comprising of the attenuation value of the one or more virtual layers, one or more of the plurality of virtual layer parameters, the dynamic parameters, and training data to the predefined weighted attenuation model(s), e.g., SNN model using one or more learning algorithms, e.g., STDP LA, to form the spikes. Based on the input data, the predefined weighted attenuation model(s) dynamically adapts the weights of the neurons and generates weighted attenuation value.

Figure 7D:
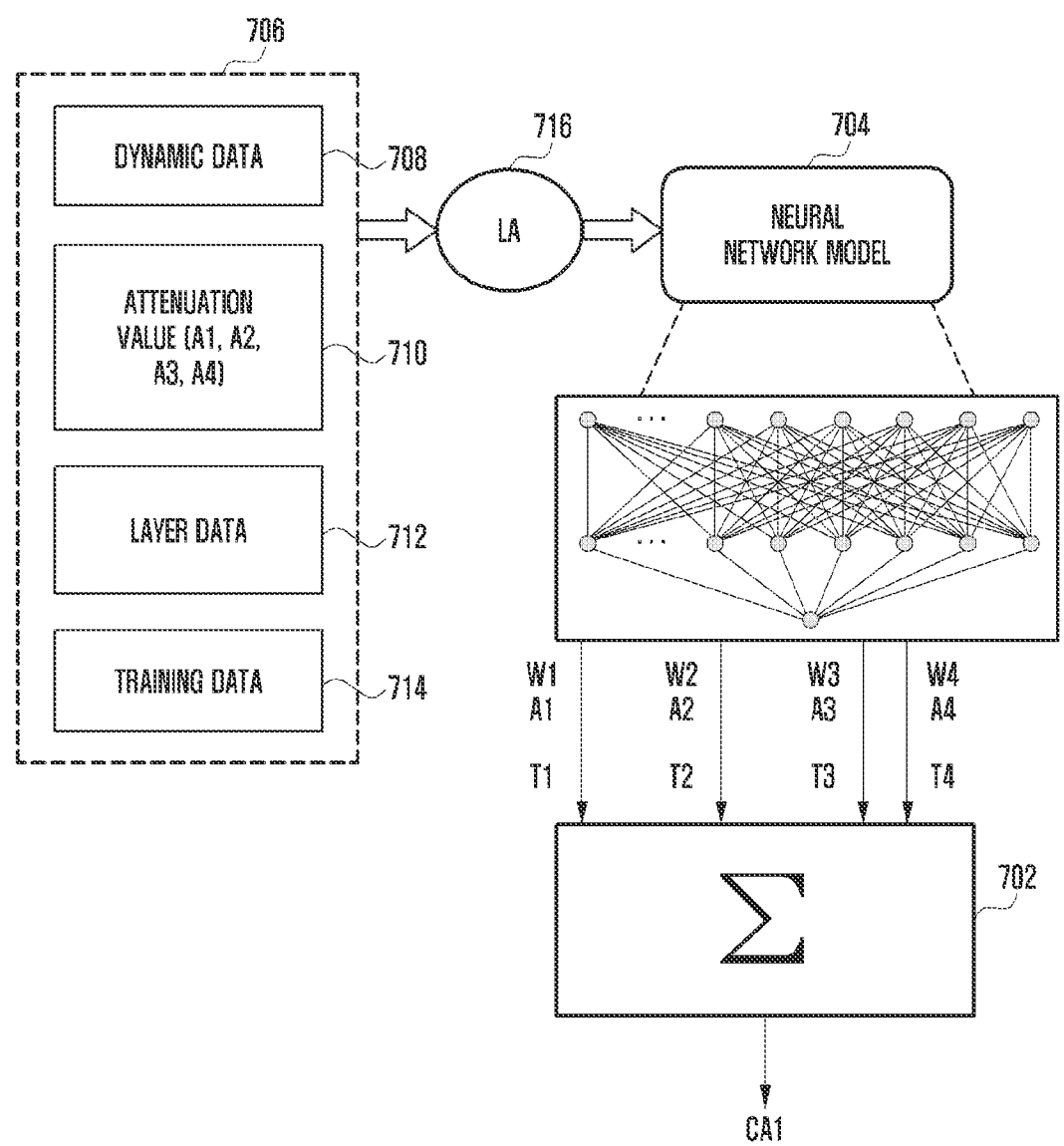

Referring to FIG. 7D, a neural network model 704 includes an input layer with N input units, a hidden layer with N hidden units, and an output unit capable of generating one or more outputs. The neural network model 704 is SNN based weighted attenuation model. The input layer units are asynchronously stimulated, e.g., all the input units of the neural network model 704 are stimulated at different time instants and all delays are randomly chosen. As such, input data 706 comprising of values of the dynamic parameters or dynamic data 708 such as channel gain, signal-to-ratio (SNR), channel quality indicator, etc., attenuation values 710, e.g., A1, A2, A3, and A4 corresponding to virtual layers 602-1, 602-2, 602-3, and 602-4, respectively, virtual layer data 712 corresponding to shape and area of the virtual layers 602-1, 602-2, 602-3, and 602-4, respectively, and training data 714 are applied to the neural network model 704 using the learning algorithms 716. This results in generating different outputs at different times. In other words, weighted attenuation values for each virtual layer are generated at different time instances. Each of the weighted attenuation value is then applied to the summation module 702 at the time instance such that summation is performed one after another to obtain the collective attenuation value for the set 604-1 of virtual layers.

As such, at time T1, weighted attenuation value W1A1 is generated as output for the virtual layer 602-1 and is provided to the summation module 702. At time T2, weighted attenuation value W2A2 is generated as output for the virtual layer 602-2 and is provided to the summation module 702. The summation module 702 performs a summation of W1A1 and W2A2. At time T3, weighted attenuation value W3A3 is generated as output for the virtual layer 602-3 and is provided to the summation module 702. The summation module 702 performs a summation of W1A1, W2A2, and W3A3. At time T4, weighted attenuation value W4A4 is generated as output for the virtual layer 602-4 and is provided to the summation module 702. The summation module 702 performs a summation of W1A1, W2A2, W3A3, and W4A4, to obtain the collective attenuation value CA1.

Figure 7E:
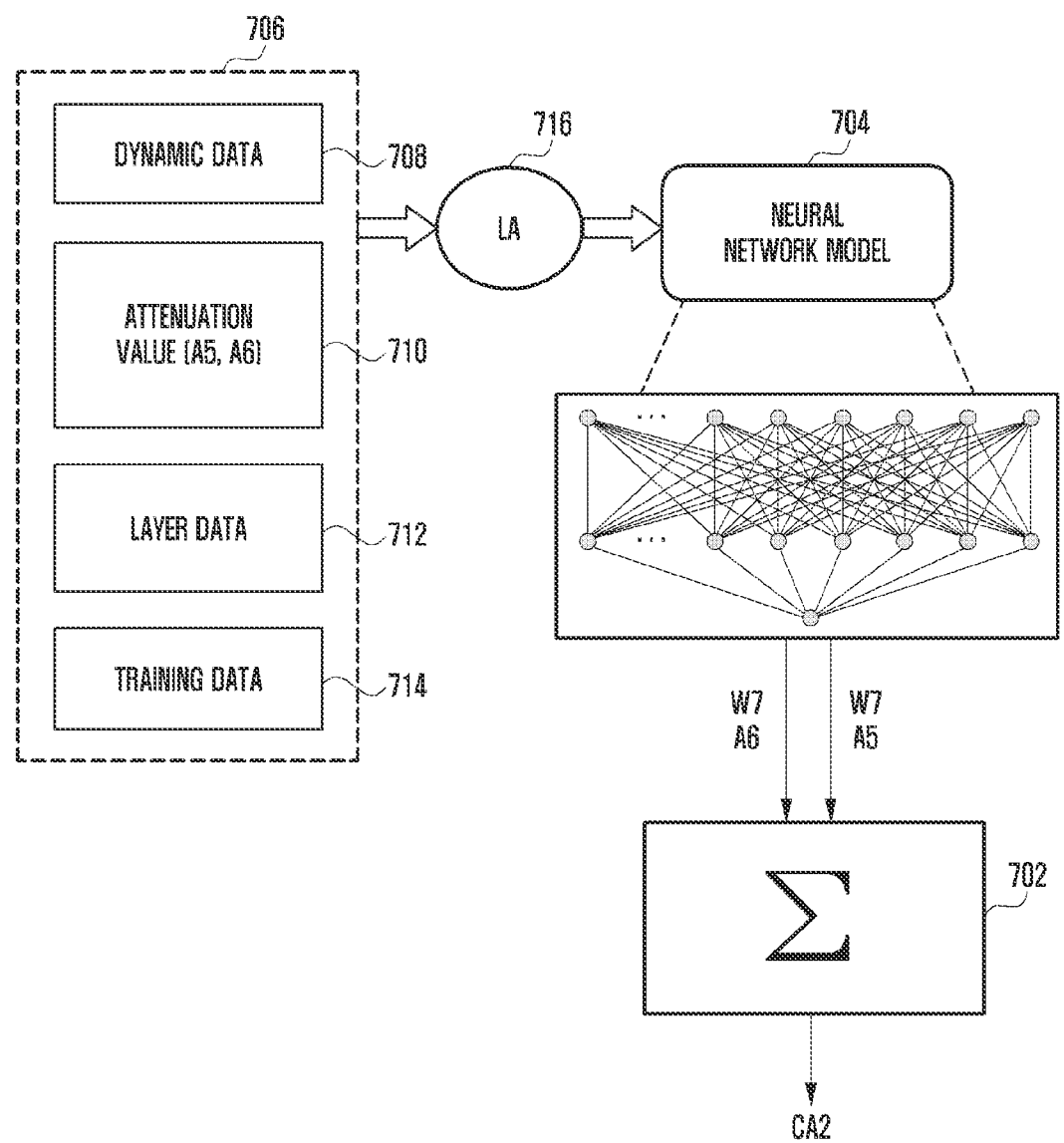

Referring to FIG. 7E, the input layer units of the neural network model 704 are synchronously stimulated, e.g., all the input units of the neural network model 704 are stimulated at simultaneously and all delays are equal. As such, input data 706 comprising of values of the dynamic parameters or dynamic data 708, attenuation values 710, e.g., A5 and A6 corresponding to virtual layers 602-5 and 602-6, respectively, virtual layer data 712 corresponding to shape of the virtual layers 602-5 and 602-6, respectively, and the training data 714 are applied to the neural network model 704 using the learning algorithms 716. This results in generating multiple outputs at same time. In other words, weighted attenuation values for each virtual layer are generated at same time instances. Each of the weighted attenuation value is then applied to the summation module 702 at the same time instance to obtain the collective attenuation value for the set 604-2 of virtual layers. At time T1, weighted attenuation value W7A5 is generated as output for the virtual layer 602-5 and weighted attenuation value W7A6 is generated as output for the virtual layer 602-6. The weighted attenuation value W7A5 and the weighted attenuation value W7A6 are provided to the summation module 702 at time T1. The summation module 702 performs a summation of W7A5 and W7A6 to obtain the collective attenuation value CA2.

Further, in some example embodiments, upon determining the attenuation values, the LFU 404 modifies or updates one or more of the plurality of virtual layer parameters. This results in formation of the virtual layers that are accurately indicative of the determined attenuation value. In an example implementation, shape of one or more virtual layers is modified. In an example implementation, shape and area of one or more virtual layers is modified. It would be understood that a change in the shape of a virtual layer also changes the size and/or density packing and/or coverage area of the virtual layer; and vice-versa.

In an example implementation, the shape is normalized to a standard (or best fit) polygon based on an area of the at least one obstruction and attenuation value of the at least one obstruction. In an example implementation, the shape one virtual layer is normalized to a standard (or best fit or maximum neighborhood matching) polygon based on area and shape of the at least one obstruction as viewed from one or more viewing angles, attenuation value of the at least one obstruction, shape of other virtual layers, and direction of the at least one receiving antenna 306 with respect to the at least one obstruction. In an example implementation, the shape of one virtual layer is normalized to a standard polygon based on area and shape of the at least one obstruction as viewed from one or more viewing angles, attenuation value of the at least one obstruction, shape of other virtual layers, and direction of the at least one transmitting antenna 302 with respect to the at least one obstruction.

Now, upon determination of the collective attenuation value, the BFU 414 forms at least one first beam based on the collective attenuation value. As would be understood, beamforming is used to direct and steer an antenna's directivity beam in a particular direction. The collective attenuation value of at least one set 310 of the virtual layers allow formation of beam(s) that provides higher sensitivity in specific, desired directions, thereby allowing control over shape and steering of antenna's directivity pattern.

The BFU 414 can employ various techniques as known in the art to form the beam(s). Examples of such techniques include analogue beamforming technique using a phase shifter, digital beamforming technique, hybrid beamforming technique, and physically moving the transmitting antenna to a previously defined direction. Examples of the digital beamforming technique include fixed beamforming technique, adaptive beamforming technique, azimuth beamforming technique, and elevation beamforming technique. Fixed beamforming technique is typically used when signal source location and noise source location is fixed with respect to the transmitting antenna 302. Examples of fixed beamforming technique include, but not limited to, Delay-and-Sum, Filter-and-Sum, and Weighted-Sum based technique. Adaptive beamforming technique is typically used when signal source location and noise source location are moving with respect to the transmitting antenna 302. Examples adaptive beamforming technique includes, but not limited to, Generalised Sidelobe Canceller (GSC), Linearly Constrained Minimum Variance (LCMV, Frost), In situ Calibrated Microphone Array (ICMA), and Minimum Mean Squared Error (MMSE).

In an example, the communication system 300 is a single input single output (SISO) system with one transmitting antenna and one receiving antenna. As such, the BFU 414 forms one or more beams for the receiving antenna.

In an example, the communication system 300 is a multiple input single output (MISO) system with multiple transmitting antennas and one receiving antenna. As such, the BFU 414 forms multiple beams of varying signal strengths for the receiving antenna.

In an example, the communication system 300 is a single input multiple output (SIMO) system with one transmitting antenna and multiple receiving antennas. As such, the BFU 414 forms multiple beams of varying signal strengths for the receiving antennas.

In an example, the communication system 300 is a multiple input multiple output (MIMO) system with multiple transmitting antennas and multiple receiving antennas. As such, the BFU 414 forms multiple beams of varying signal strengths for the receiving antennas.

To this end, the BFU 414 controls at least one beam parameter of the at least one beam based on the collective attenuation value. The at least one beam parameter includes weight gain, frequency, phase, amplitude, direction, width, intensity, power, signal to noise ratio, signal to interference plus noise ratio, interference, output energy, variance, correlation, elevation angle, azimuth angle, modulation, error correction, and error detection. In an example implementation, the BFU 414 controls power of the beam such that transmission power is higher based on the collective attenuation value. In an example implementation, the BFU 414 controls power and gain of the beam such that transmission power is lower while the gain is high based on the collective attenuation value.

Figure 8:
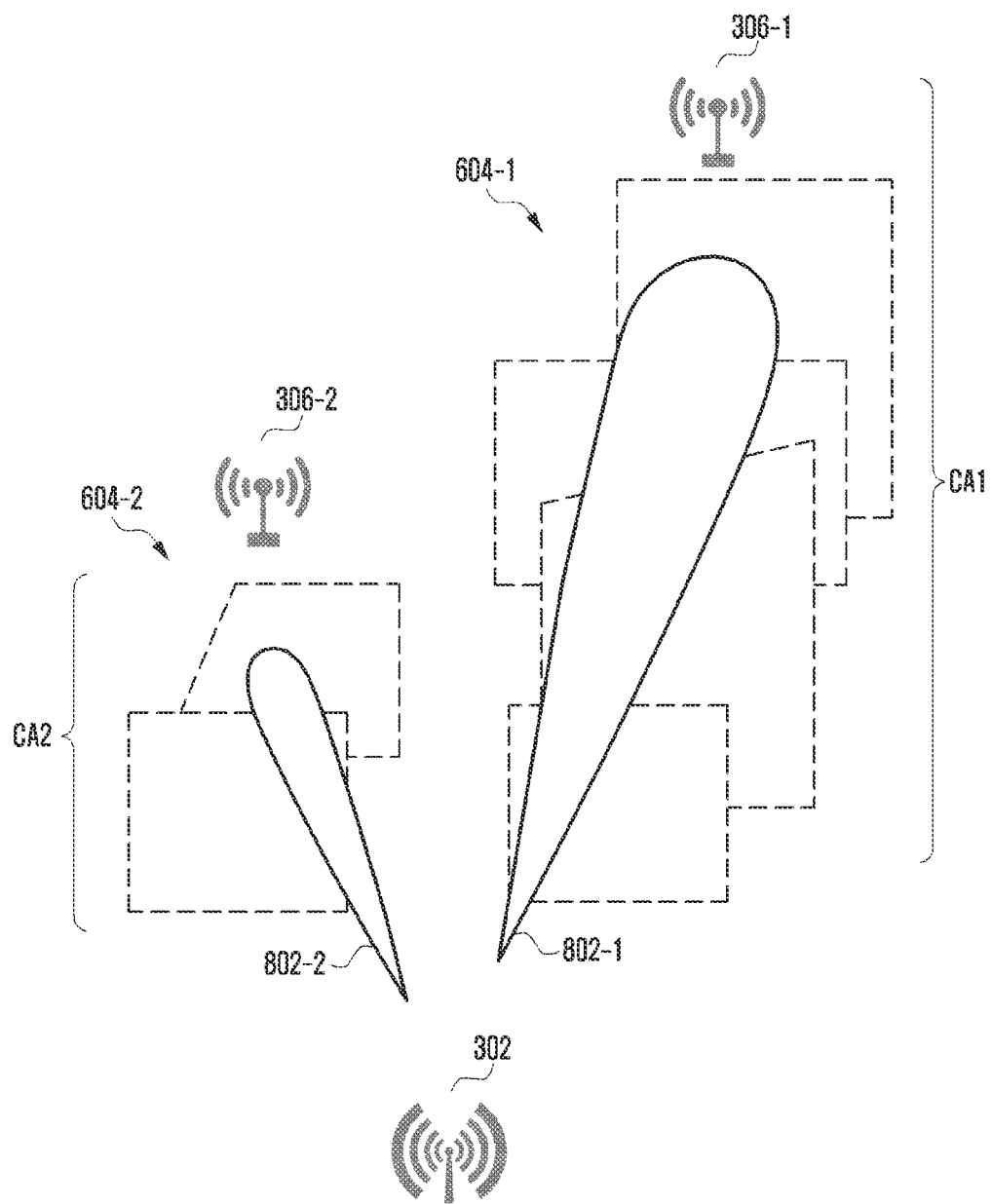

Referring to FIG. 8, the transmitting antenna 302 and the receiving antennas 306-1 and 306-2 are multiple beamforming antennas. As such, the transmitting antenna 302 forms multiple beams at varied signal strengths for transmission based on the collective attenuation value of the set(s) of virtual layers. A collective attenuation value, CA1, of the set 604-1 is determined as having a high value. Beam 802-1 is transmitted with a higher power based on the collective attenuation value CA1 towards the receiving antenna 306-1. A collective attenuation value, CA2, of the set 604-2 is determined as having a lower value. Beam 802-2 is transmitted with a lower power based on the collective attenuation value CA2 towards the receiving antenna 306-2.

Further, the BFU 414 forms the at least one beam such that at least one signal transmission parameter of the corresponding beam is within maximum permissible standards as set by standard organization(s). The at least one signal transmission parameter includes weight gain, frequency, phase, amplitude, direction, width, intensity, power, signal to noise ratio, signal to interference plus noise ratio, interference, output energy, variance, correlation, elevation angle, and azimuth angle. This leads to transmission of the at least one beam at varied signal strengths within maximum permissible standards, thereby leading to saving of power. To this end, the BFU 414 receives information pertaining to value allocated to at least one signal transmission parameters corresponding to the at least one obstruction. Such information is indicative of value allocated to the at least one signal transmission parameters for beam transmission without interference through the at least one obstruction. In an example implementation, the BFU 414 may receive the information from neighboring transmitting antenna(s) in same coverage cell. In an example implementation, the BFU 414 may receive the information from a network server communicatively coupled with the system 304 in the wireless communication system 300.

Upon receiving the information, the BFU 414 controls at least one beam parameter of the at least one beam based on the collective attenuation value, the received information and at least one standard value allocated to the at least one signal transmission parameters. Such standard value is a maximum permissible value allocated to the at least one signal transmission parameters by the standard organization. This leads to transmission of one or more beams at varied signal strengths within maximum permissible standards, thereby leading to saving of power. The following tables illustrate maximum permissible values of various parameters for user equipment and base station at lower frequencies as an example. It would be understood that other such maximum permissible values of various parameters for user equipment and base station at higher frequencies can be obtained and processed to form one or more beams at varied signal strengths within maximum permissible standards.

Table 1 illustrates minimum peak EIRP, maximum peak EIRP, and maximum transmission power (TRP) for power class 1 type of user equipment for transmission that are permitted by the standard organization.

TABLE 1

| Operating Band | Min peak EIRO (dBm) | Max EIRP (dBm) | Max TRP (dBm) |
|---|---|---|---|
| n257 | 40.0 | 35 | 55 |
| n258 | 40.0 | 35 | 55 |
| n260 | 38.0 | 35 | 55 |
| n261 | 40.0 | 35 | 55 |

Table 2 illustrates channel bandwidth, minimum output power, and measurement bandwidth for power class 1 type of user equipment for transmission that are permitted by the standard organization.

TABLE 2

| Operating Band | Channel Bandwidth (MHz) | Min Output Power (dBm) | Measurement Bandwidth (MHz) |
|---|---|---|---|
| n257 | 50 | 4 | 47.52 |
| n258 | 100 | 4 | 95.04 |
| n260 | 200 | 4 | 190.08 |
| n261 | 400 | 4 | 380.16 |

Table 3 illustrates frequency offset and maximum power limit for normal base stations and multicarrier base stations that are permitted by the standard organization.

TABLE 3

| Operating Band | Frequency offset (MHz) | Normal BS Maximum Power limit (dBm) | Multicarrier BS | |
|---|---|---|---|---|
| | | | Maximum Power limit Class 1 (dBm) | Maximum Power limit Class 1 (dBm) |
| 9 kHz to 1 GHz | >=2 | −36 | −35 | −25 |
| | >=5 | −36 | −30 | −20 |
| | >=10 | −36 | −36 | −36 |
| 1 GHz to 12.75 GHz | >=2 | −30 | −30 | −25 |
| | >=5 | −30 | −25 | −20 |
| | >=10 | −30 | −30 | −30 |

Figure 9:
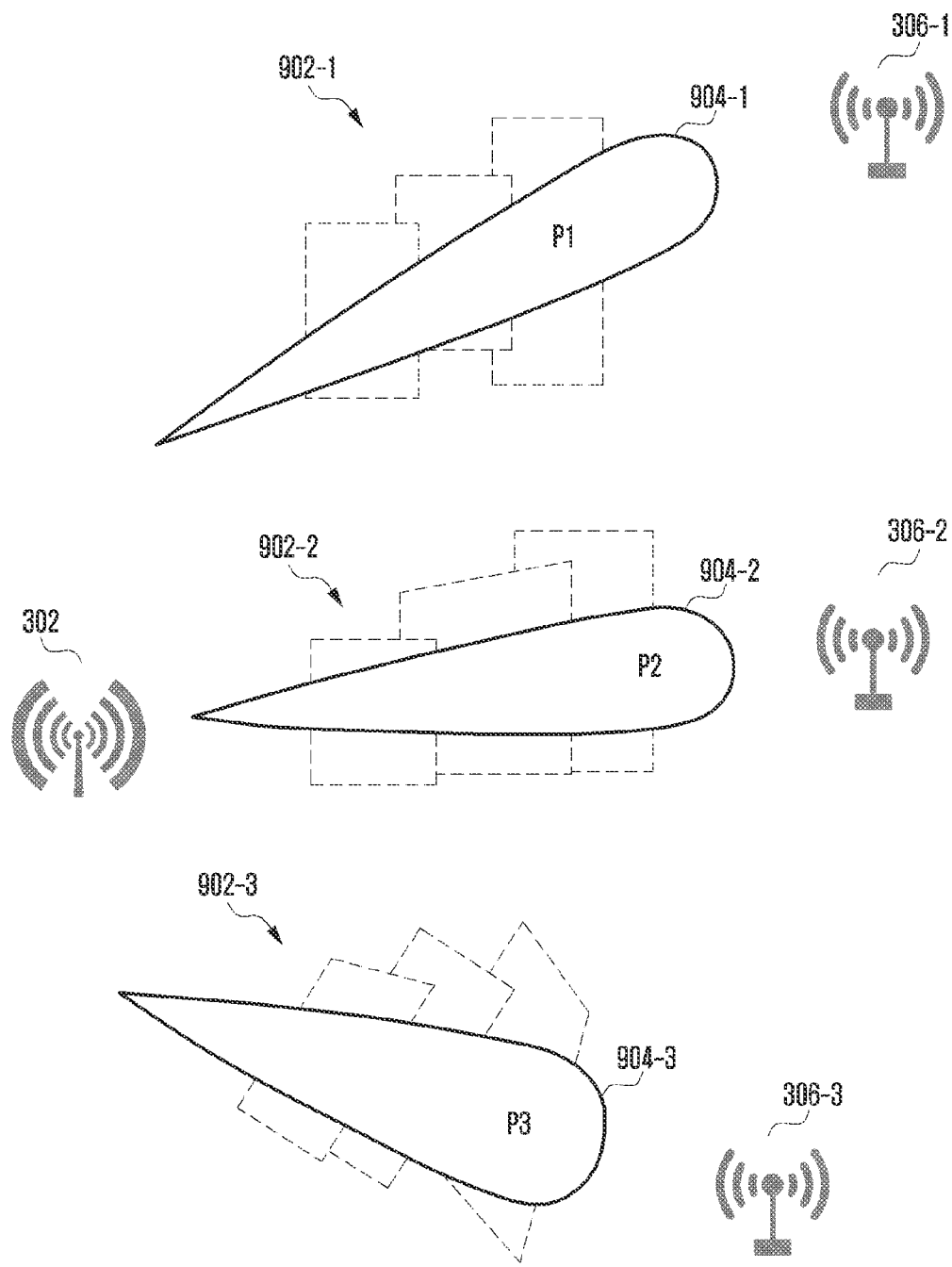

Thus, in an example, referring to FIG. 9, the transmitting antenna 302 and receiving antennas 306-1, 306-2, and 306-3 are multiple beamforming antennas. As such, the transmitting antenna 302 forms multiple beams at varied signal strengths for transmission based on the received information, collective attenuation value of set(s) of virtual layers, and standard value(s). As described earlier, the beams can be formed and transmitted using various techniques such as elevation beamforming technique, azimuth beamforming techniques, 3D beamforming technique, 2D beamforming technique, etc., along with various beamforming modes such as TDMA beamforming mode, CDMA beamforming mode, FDMA beamforming mode, etc.

A set 902-1 of virtual layers is formed upon identifying obstructions on LOS transmission between the transmitting antenna 302 and the receiving antenna 306-1. Beam 904-1 is transmitted with a lower power P1 at, for example, P decibel-milliwatts (dBm), based on the collective attenuation value of the set 904-1 of virtual layers, the received information, and the standard value.

A set 902-2 of virtual layers is formed upon identifying obstructions on LOS transmission between the transmitting antenna 302 and the receiving antenna 306-2. Beam 904-2 is transmitted with a higher power P2 at, for example, P −2 dBm, based on the collective attenuation value of the set 904-2 of virtual layers, the received information, and the standard value.

A set 902-3 of virtual layers is formed upon identifying obstructions on LOS transmission between the transmitting antenna 302 and the receiving antenna 306-3. Beam 904-3 is transmitted with a higher power P3 at, for example, P −4 dBm, based on the collective attenuation value of the set 904-2 of virtual layers, the received information, and the standard value.

Further, in an example implementation, the at least one transmitting antenna is part of an array antenna. In such implementation, the BFU 414 may form beam(s) that are not in conformance with the maximum permissible standards. In such implementation, the BFU 414 changes a transmission mode based on the maximum permissible standards such that beam(s) may be formed within allowable standards. As would be understood, the transmission mode can be defined as antenna configuration for beam transmission in such array antenna. For example, transmission mode TM1 indicates one transmitting antenna is used. Transmission mode TM2 indicates diversity configuration whereby each antenna uses different coding and different frequency. For the sake of brevity, other transmission modes are not described. In an implementation, the BFU 414 may request an external server communicatively coupled with the user equipment and/or the base station to change the transmission mode. In another implementation, the BFU 414 may locally determine the transmission mode using techniques as known in the art.

In an example, the BFU 414 may form a beam with transmission power higher than the maximum permissible standard value at the current location. As such, the BFU 414 may change the transmission mode, for example, from TM1 to TM2, to form the beam at the maximum permissible standard value.

In various example embodiments of the present disclosure, the CU 408 categorizes the at least one set 310 of virtual layers based on the collective attenuation value. To this end, in one embodiment, the CU 408 categorizes the at least one set 310 of virtual layers into one of an effective obstruction path and nominal obstruction path based on a learned data and one or more threshold values. The effective obstruction path indicates the at least one set of virtual layer is having a collective attenuation value higher than the threshold value. The nominal obstruction path indicates the at least one set of virtual layer is having a collective attenuation value lower than the threshold value. In other embodiments, the set of virtual layers can be classified or categorized as high attenuation obstruction path, lower attenuation obstruction path, medium attenuation obstruction path, etc.

Further, the threshold value is determined from one or more learned model(s). The one or more learned model(s) include but not limited to a Gaussian Mixture Models (GMMs) with trainable decision thresholds or classification thresholds, Probabilistic Decision-Based Neural Networks (PDBNNs), neural networks, logistic regression, decision tree (DT), random forest (RF), k-nearest neighbors (KNN), gradient-boosted tree, multilayer perceptron, one-vs-rest, Naive Bayes, etc. In an implementation, the CU 408 visually categorizes the set(s) of virtual layers as effective obstruction path or nominal obstruction path on the 3D aerial view image 308 or the updated 3D aerial view image. In an example implementation, the CU 408 may generate an updated 3D aerial view image with visually categorized set(s) of virtual layers.

Figure 10A:
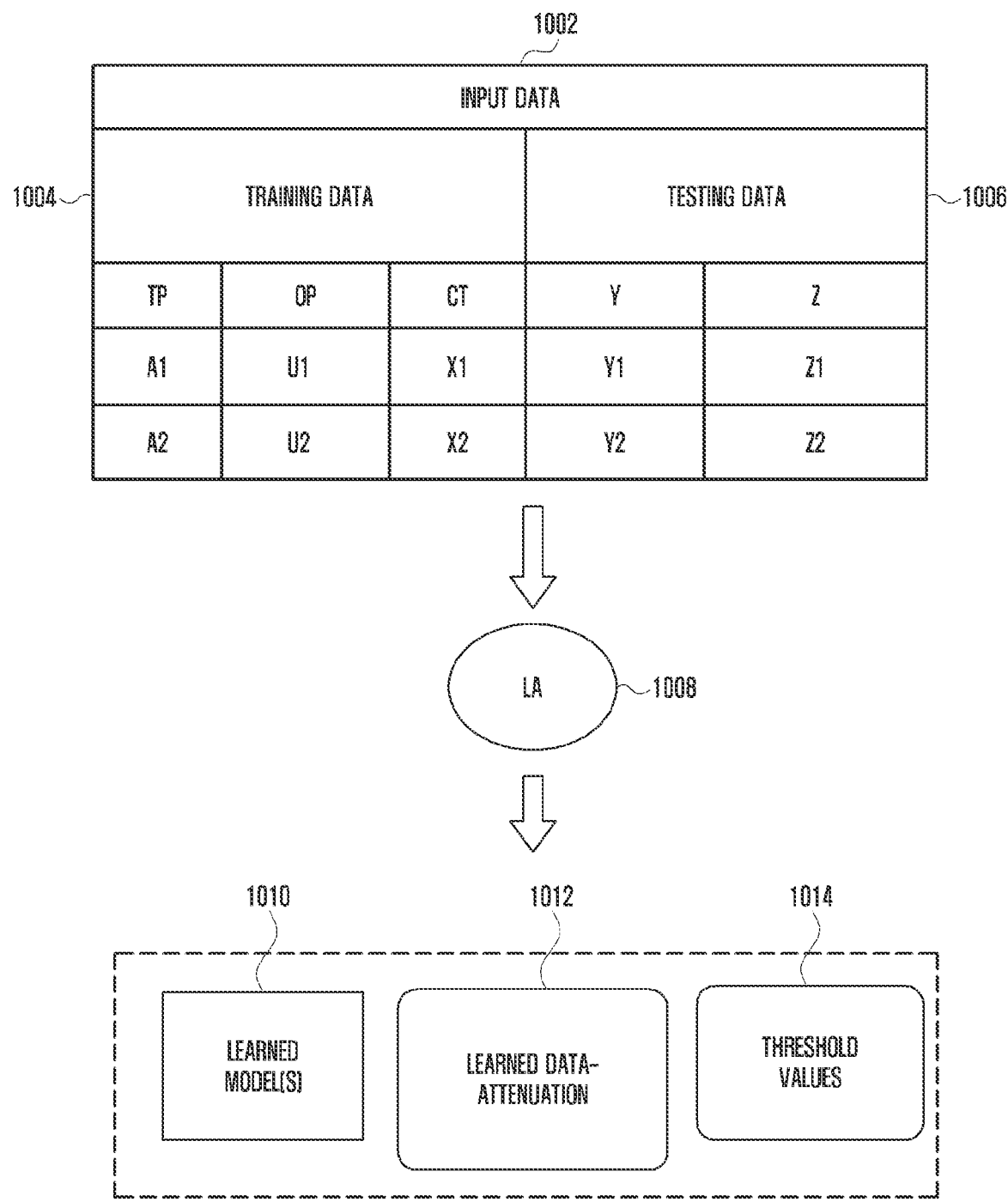

Referring to FIG. 10A, the CU 408 obtains input data 1002 comprising of training data 1004 and testing data 1006 from one or more databases, prior to initiating operations in accordance with the present disclosure. The training data 1004 includes known types of obstructions (TO) such as high-rise structures/buildings, trees, etc., corresponding known values of plurality of obstruction parameters (OP) such as materials of high-rise structures/buildings like glass, metals, concrete, paints, etc., corresponding known values of categorization (CT) such as trees are categorized as lower attenuation obstruction, building is categorized as medium attenuation obstruction. The testing data 1006 includes known types of obstructions such as high-rise structures/ buildings, trees, etc., and corresponding known values of plurality of obstruction parameters (OP) such as materials of high-rise structures/buildings like glass, metals, concrete, paints, etc. The testing data 1006 is typically used for verifying the learned model(s) trained using the training data 1004.

The CU 408 applies one or more learning algorithms 1008 such as supervised learning algorithm, un-supervised learning algorithm, and semi-supervised algorithm to the input data 1002 to generate learned model(s) 1010. The CU 408 also determines learned data 1012 and threshold values 1014 from the learned model(s) 1010. In an example, learned data can indicate a building with glass walls is having medium attenuation. In an example, learned data can indicate a building with reinforced walls is having higher attenuation. The threshold values 1014 can indicate range of values based on which attenuation is classified as lower, medium, and higher.

In an example, CU 408 applies supervised algorithms to generate the learned models. As such, the training data 1004 is labelled as per known techniques and the CU 408 processes the labelled data, and determines the learned models and learned data. In an example, CU 408 applies unsupervised algorithms to generate the learned models. As such, the CU 408 processes the training data 1004, and determines patterns and structures from the training data and group values of the known types of obstructions, corresponding known values of plurality of obstruction parameters, and corresponding known values of categorization into clusters. The CU 408 then determines the learned models and the learned data from the clusters.

Figure 10B:
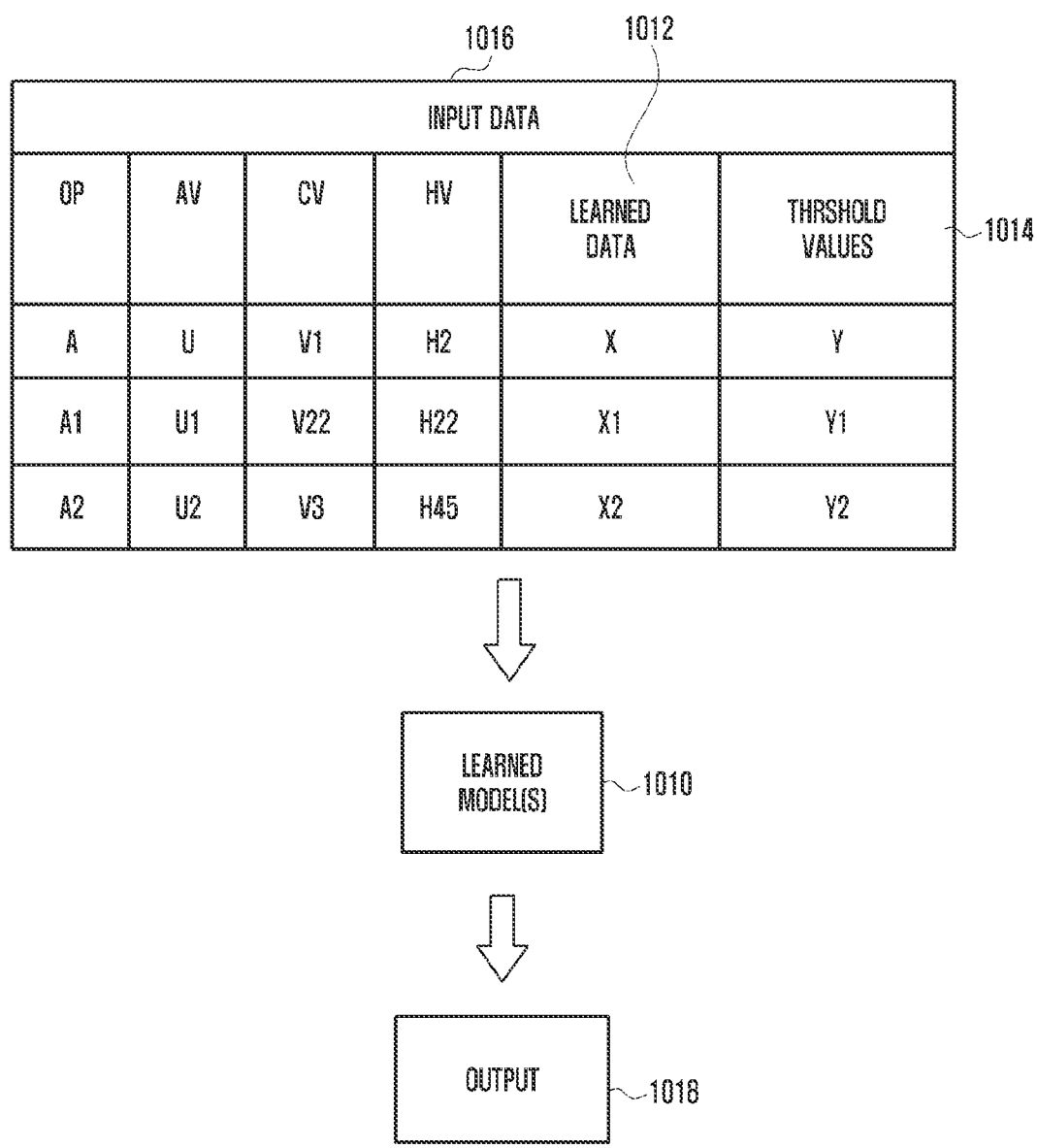

During operation, referring to FIG. 10B, the CU 408 applies current data 1016 of the at least one identified obstructions comprising of determined values of corresponding plurality of obstruction parameters (OP) and corresponding determined attenuation value (AV); current values of characteristics of the transmitting antenna 302 and receiving antenna 306; current values of parameters of the transmitting antenna 302 and receiving antenna 306 such as frequency, transmission power, beam rate, etc.; historical values of characteristics of the transmitting antenna 302 and receiving antenna 306 as stored in the storage unit 420; historical values of parameters of the transmitting antenna 302 and receiving antenna 306 such as frequency, transmission power, beam rate, etc., as stored in the storage unit 420; the learned data 1012, and the threshold values 1014, to the learned model(s) 1010. For the sake of brevity, the current values are represented as CV and historical values are represented as HV in the figure.

The learned model(s) 1010 generate an output 1018 as categorizing or classifying the identified virtual layer into binary classification or multi-classification. In an example, the output 1018 categorizes the identified virtual layer as any one of the active virtual layer and the inactive virtual layer. In an example, the output 1018 categorizes the identified virtual layer as any one of low attenuation virtual layer and high attenuation virtual layer. In an example, the output 1018 categorizes the identified virtual layer as any one of low attenuation virtual layer, medium attenuation virtual layer, and high attenuation virtual layer. The output 1018 either predicts categorical class labels or classifies the virtual layers based on the training set and current values.

In an example, a virtual layer corresponding to an obstruction with outer surface area lower than the threshold value is categorized as inactive virtual layer. In an example, a virtual layer corresponding to an obstruction with penetration depth value higher than the threshold value is categorized as inactive virtual layer when the threshold value is lower than transmission power of the transmitting antenna.

In an example, a virtual layer corresponding to an obstruction with penetration depth value lower than the threshold value is categorized as inactive virtual layer. In an example, a virtual layer corresponding to an obstruction with dielectric value lesser than the threshold value is categorized as inactive virtual layer. In an example, a virtual layer corresponding to an obstruction with dielectric value higher than the threshold value is categorized as active virtual layer when the threshold value is lower than beam rate and frequency of the transmitting antenna. In an example, a virtual layer corresponding to an obstruction with penetration depth value and dielectric value lower than the threshold value is categorized as lower attenuation virtual layer.

In an example, a virtual layer corresponding to an obstruction with outer surface area higher than the threshold value is categorized as active virtual layer. In an example, a virtual layer corresponding to an obstruction with penetration depth value higher than the threshold value is categorized as active virtual layer. In an example, a virtual layer corresponding to an obstruction with penetration depth value lower than the threshold value is categorized as active virtual layer when the threshold value is higher than transmission power of the transmitting antenna. In an example, a virtual layer corresponding to an obstruction with outer surface area and dielectric value higher than the threshold value while penetration depth value lower than the threshold value is categorized as medium attenuation virtual layer. In an example, a virtual layer corresponding to an obstruction with dielectric value lower than the threshold value is categorized as active virtual layer when the threshold value is higher than beam rate and frequency of the transmitting antenna. In an example, a virtual layer corresponding to an obstruction with dielectric value higher than the threshold value is categorized as active virtual layer. In an example, a virtual layer corresponding to an obstruction with outer surface area, dielectric value, and penetration depth value higher than the threshold value is categorized as high attenuation virtual layer.

Figure 10C:
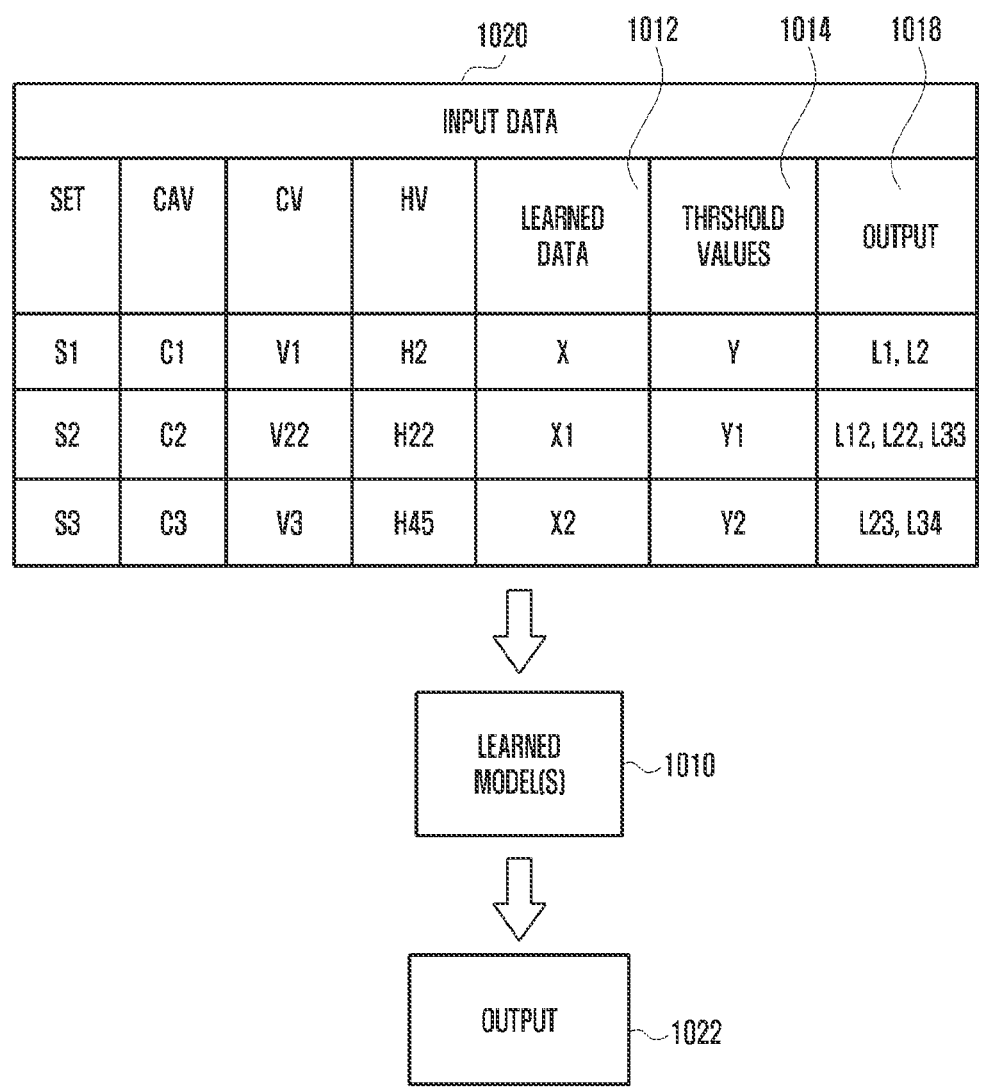

During operation, referring to FIG. 10C, the CU 408 applies current data 1020 of the set(s) of virtual layers (SET), corresponding determined collective attenuation value (CAV), current values of characteristics of the transmitting antenna 302 and receiving antenna 306; current values of parameters of the transmitting antenna 302 and receiving antenna 306 such as frequency, transmission power, beam rate, etc.; historical values of characteristics of the transmitting antenna 302 and receiving antenna 306 as stored in the storage unit 420; historical values of parameters of the transmitting antenna 302 and receiving antenna 306 such as frequency, transmission power, beam rate, etc., as stored in the storage unit 420; the learned data 1012, the threshold values 1014, and the output 1018 to the learned model(s) 1010. For the sake of brevity, the current values are represented as CV and historical values are represented as HV in the figure.

As such, the CU 408 applies one or more learning algorithms 1008 such as supervised learning algorithm, un-supervised learning algorithm, and semi-supervised algorithm to the current data 1020 and output 1018 to update learned model(s) 1010. In an example, CU 408 applies supervised algorithms to update the learned models. As such, the current data 1020 and output 1018 is labelled as per known techniques and the CU 408 processes the labelled data, and updates the learned models. In an example, CU 408 applies unsupervised algorithms to update the learned models. As such, the CU 408 processes the current data 1020 and output 1018, and determines patterns and structures from the training data and group values of the individual virtual layers into clusters. The CU 408 then updates the learned models from the clusters.

The learned model(s) 1010 then generates an output 1022 as categorizing or classifying the set(s) of virtual layers into binary classification or multi-classification. In an example implementation, the output 1018 categorizes the identified virtual layer as effective obstruction path or nominal obstruction path. In an example implementation, the output 1018 categorizes the identified virtual layer as any one of effective obstruction path, moderate obstruction path, and nominal obstruction path. The output 1018 either predicts categorical class labels or classifies the virtual layers based on the training set and current values.

In an example, a set of virtual layers with a collective attenuation value lower than the threshold value is categorized as nominal obstruction path. In an example, a set of virtual layers with a collective attenuation value higher than the threshold value is categorized as nominal obstruction path. In an example of the learned output can indicate obstruction path through virtual layers corresponding to buildings with glass walls categorized as medium attenuation virtual layers is a normal obstruction path. In an example of the learned output can indicate obstruction path through virtual layer corresponding to building with glass walls categorized as medium attenuation virtual layer and virtual layer corresponding to building reinforced concrete walls categorized as medium attenuation virtual layer is an effective obstruction path. In an example of the learned output can indicate obstruction path through virtual layer corresponding to building with glass walls categorized as medium attenuation virtual layer and virtual layer corresponding to building reinforced concrete walls categorized as medium attenuation virtual layer is an nominal obstruction path if the threshold values of the attenuation are lesser than transmission power of the transmitting antenna. In an example of the learned output can indicate obstruction path through virtual layers corresponding to buildings with glass walls categorized as medium attenuation virtual layers is an effective obstruction path if the threshold values of the attenuation are higher than frequency and/or beam rate of the transmitting antenna.

Thereafter, the BFU 414 forms at least one of (a) the at least one first beam and (b) at least one second beam based on the collective attenuation value and the categorization. To this end, the BFU 414 controls at least one beam parameter of (a) the at least one first beam and (b) at least one second beam based on the collective attenuation value and the categorization. In an example implementation, the BFU 414 forms a first beam based the collective attenuation value and a second beam based on the categorization. In an example implementation, the BFU 414 forms one or more beams based on the categorization. In an example implementation, the BFU 414 forms one or more beams based on the collective attenuation and the categorization.

Figure 11:
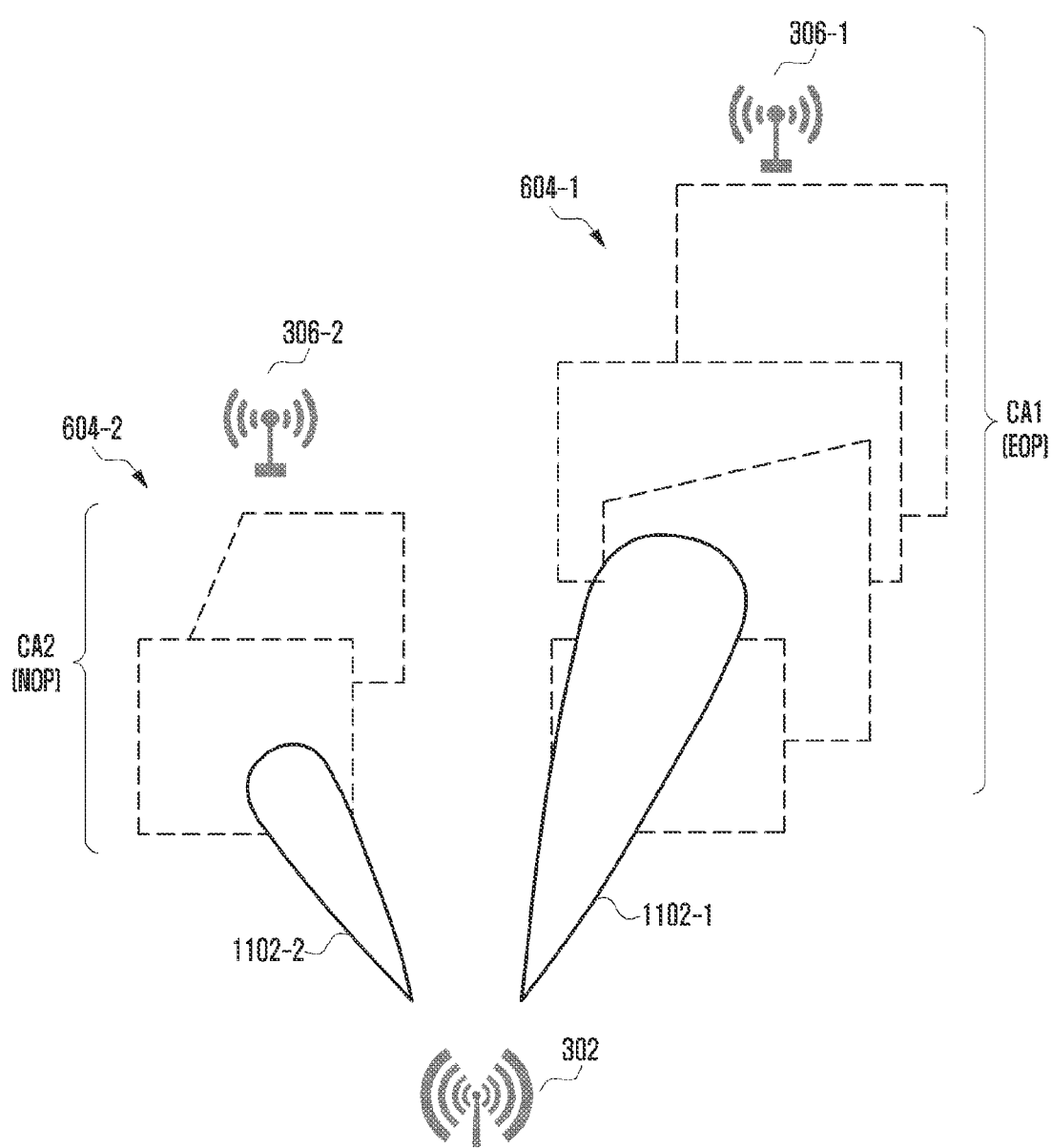

Referring to FIG. 11, the transmitting antenna 302 and the receiving antennas 306-1 and 306-2 are multi beamforming antennas. As such, the transmitting antenna 302 forms multiple beams at varied signal strengths for transmission based on the collective attenuation value of the set(s) of virtual layers. The set 604-1 of virtual layers is formed upon identifying obstructions on LOS transmission between the transmitting antenna 302 and the receiving antenna 306-1. The collective attenuation value, CA1, of the set 604-1 is determined as having a higher value than the threshold value. As such, the set 604-1 of virtual layers is categorized as effective obstruction path, represented by letter 'EOP' in the figure. Therefore, beam 1102-1 is transmitted with a higher power based on the collective attenuation value CA1.

The set 604-2 of virtual layers is formed upon identifying obstructions on LOS transmission between the transmitting antenna 302 and the receiving antenna 306-2. The collective attenuation value, CA2, of the set 604-2 is determined as having a lower value than the threshold value. As such, the set 604-2 of virtual layers is categorized as nominal obstruction path, represented by letter 'NOP' in the figure. Therefore, beam 1102-2 is transmitted with a lower power based on the collective attenuation value.

In some example embodiments of the present disclosure, upon categorization of the at least one set of virtual layers, the DDU 410 identifies a density percentage area of the at least one set of virtual layer based on the categorization of the at least one set of virtual layers and a categorization of the one or more virtual layers in the at least one set of virtual layers. To this end, in one embodiment, the CU 408 categorizes each of the virtual layers into one of an active virtual layer and an inactive virtual layer based on a learned data and one or more threshold values, as described earlier. The active virtual layer indicates the virtual layer is having an attenuation value higher than or equal to the threshold value and the inactive virtual layer indicates the virtual layer is having an attenuation value lower than the threshold value. In other embodiments, the virtual layers can be classified or categorized as high attenuation virtual layer, lower attenuation virtual layer, medium attenuation virtual layer, etc., as described earlier.

Further, the one or more threshold values are determined from one or more learned model(s). The one or more learned model(s) include but not limited to a Gaussian Mixture Models (GMMs) with trainable decision thresholds or classification thresholds, Probabilistic Decision-Based Neural Networks (PDBNNs), neural networks, etc. In an example implementation, the CU 408 visually categorizes the virtual layer as active virtual layer or inactive virtual layer on the aerial view image 308. In an example implementation, the CU 408 may generate an updated aerial view image with visually categorized layers.

Figure 12:
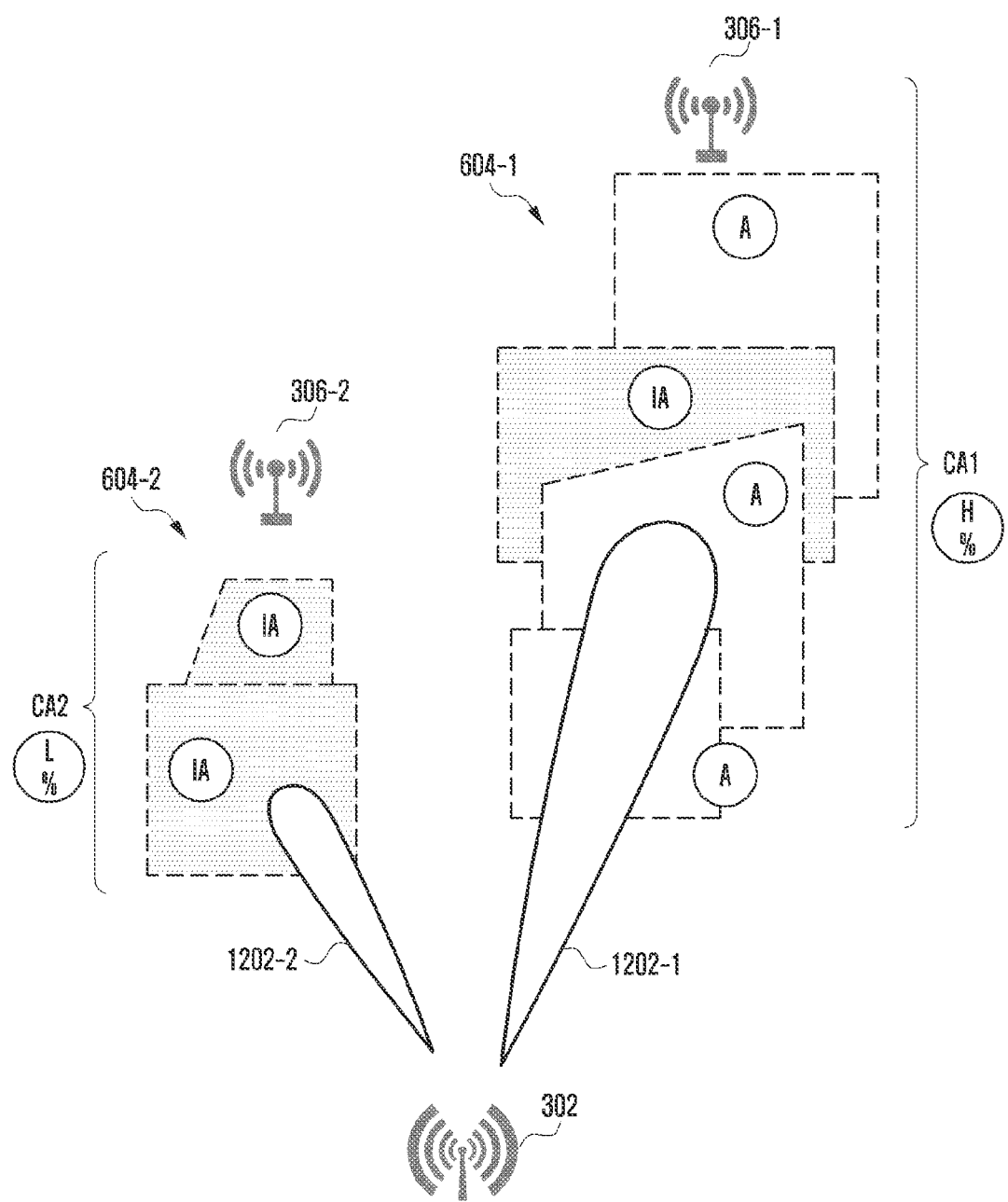

Referring to FIG. 12, the virtual layers are categorized as active virtual layer, represented by letter 'A' and no pattern in the figure, and inactive virtual layer, represented by letters 'IA' and with dense dotted pattern in the figure. It would be understood that any type of categorization can be made such as visual, non-visual.

Thereafter, the DDU 410 determines density percentage area of the set of virtual layers based on the plurality of virtual layer parameters, the categorization of the virtual layers, the categorization of the at least one set of virtual layers.

In an example, DDU 410 determines the density percentage area, D %, based on an area covered by active virtual layer(s) within the set of virtual layers, Aa; and an area covered by an inactive virtual layer(s) within the set of virtual layers, Ai, using equation (1).

$$D\% = Ai/Aa \qquad \text{[Equation 1]}$$

The DDU 410 identifies the density percentage area of the set of virtual layers as high, represented as H %, based on the determined density percentage area, D %, and the current predefined threshold value T if equation (2) is satisfied.

$$D\% > T \qquad \text{[Equation 2]}$$

Similarly, the DDU 410 identifies the density percentage area of the set of virtual layers as low, represented as L %, based on the determined density percentage area, D %, and the current predefined threshold value T if equation (3) is satisfied.

$$D\% < T \quad \text{[Equation 3]}$$

Thereafter, the BFU 414 forms at least one of (a) the at least one first beam and (b) at least one second beam based on the collective attenuation value, the categorization, and the density percentage area. To this end, the BFU 414 controls at least one beam parameter of (a) the at least one first beam and (b) the at least one second beam based on the collective attenuation value, the categorization, and the density percentage area. In an example implementation, the BFU 414 forms a first beam based the collective attenuation value, a second beam based on the categorization and the density percentage area. In an example implementation, the BFU 414 forms one or more beams based on the categorization and the density percentage are. In an example implementation, the BFU 414 forms one or more beams based on the collective attenuation, the categorization, and the density percentage are.

Referring to FIG. 12 again, the density percentage area of the set 604-1 of virtual layers is determined as high, represented by H %. Therefore, beam 1202-1 is transmitted with a higher power. The density percentage area of the set 604-2 of virtual layers is determined as low, represented by L %. Therefore, beam 1202-2 is transmitted with a lower power.

In various example embodiments of the present disclosure, the LFU 404 dynamically performs one or more actions related to the one or more virtual layers and/or the at least one set of virtual layers based on at least one of reflected signals obtained by emitting the at least one beam, a density percentage area of the one or more virtual layers, the at least one set of virtual layers, the one or more virtual layers, the collective attenuation value, and learned data.

Figure 13A:
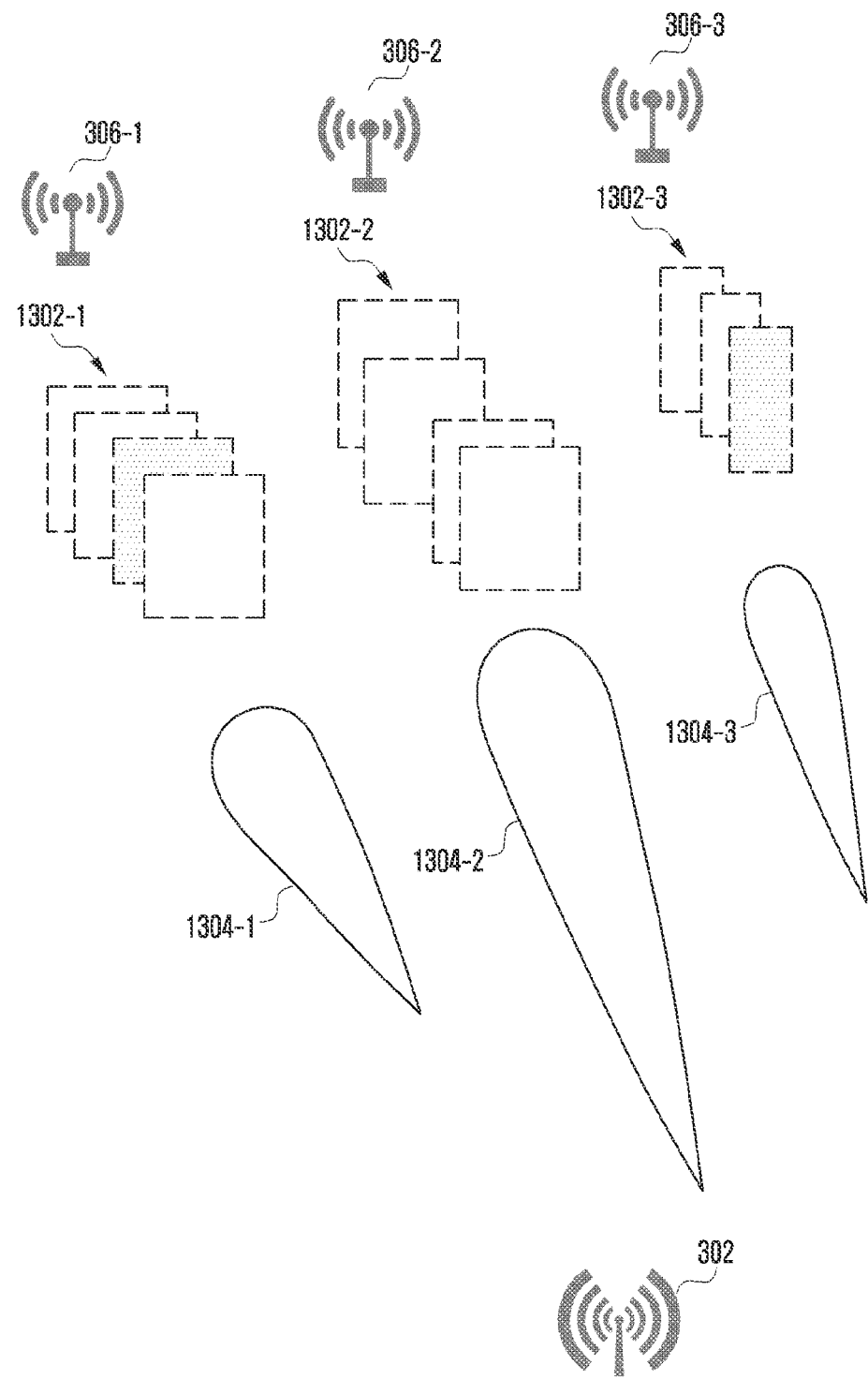

In an example implementation, the LFU 404 dynamically adjusts at least one of the plurality of virtual layer parameters of at least one virtual layer in the at least one set of virtual layers. Referring to FIG. 13A, a set 1302-1 of virtual layers is formed between the transmitting antenna 302 and the receiving antenna 306-1. A beam 1304-1 is formed based on a collective attenuation value of the set 1302-1 of virtual layers. A set 1302-2 of virtual layers is formed between the transmitting antenna 302 and the receiving antenna 306-2. A beam 1304-1 is formed based on a collective attenuation value of the set 1302-2 of virtual layers. A set 1302-3 of virtual layers is formed between the transmitting antenna 302 and the receiving antenna 306-3. A beam 1304-3 is formed based on a collective attenuation value of the set 1302-3 of virtual layers. Virtual layers having low attenuation value or categorized as inactive virtual layer are represented by dotted pattern.

Figure 13B:
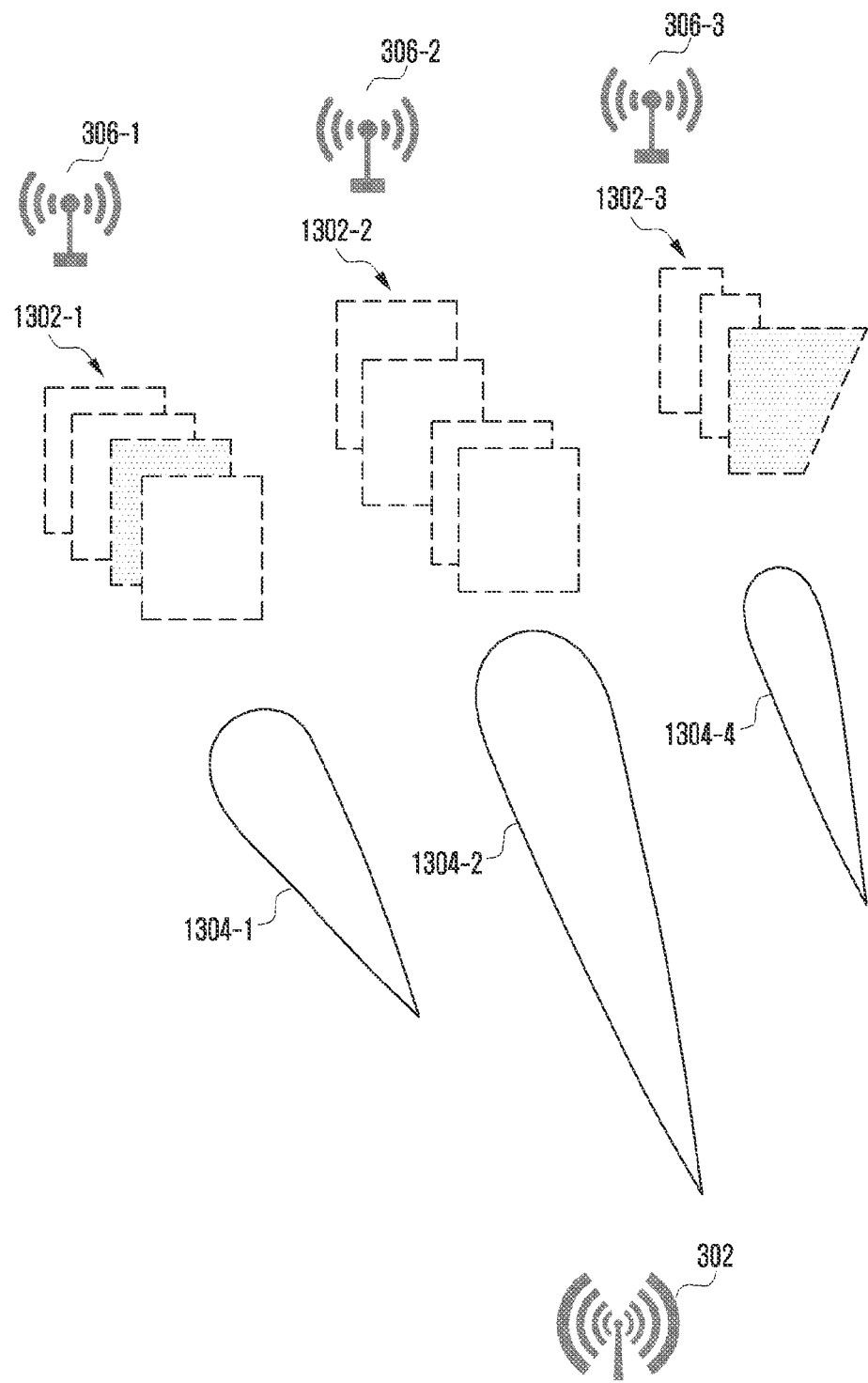

Referring to FIG. 13B, based on the reflected signals obtained from the beams 1304-1, 1304-2, and 1304-3, a shape of one virtual layer (represented by dotted pattern) in the set 1302-3 of virtual layers is adjusted from a rectangle shape to a trapezium shape based on the reflected signals and attenuation value of the virtual layer. A collective attenuation value of the set 1302-3 of virtual layers is then determined in a manner as described above. A beam 1304-4 is formed based on a collective attenuation value of the set 1302-3 of virtual layers.

Figure 13C:
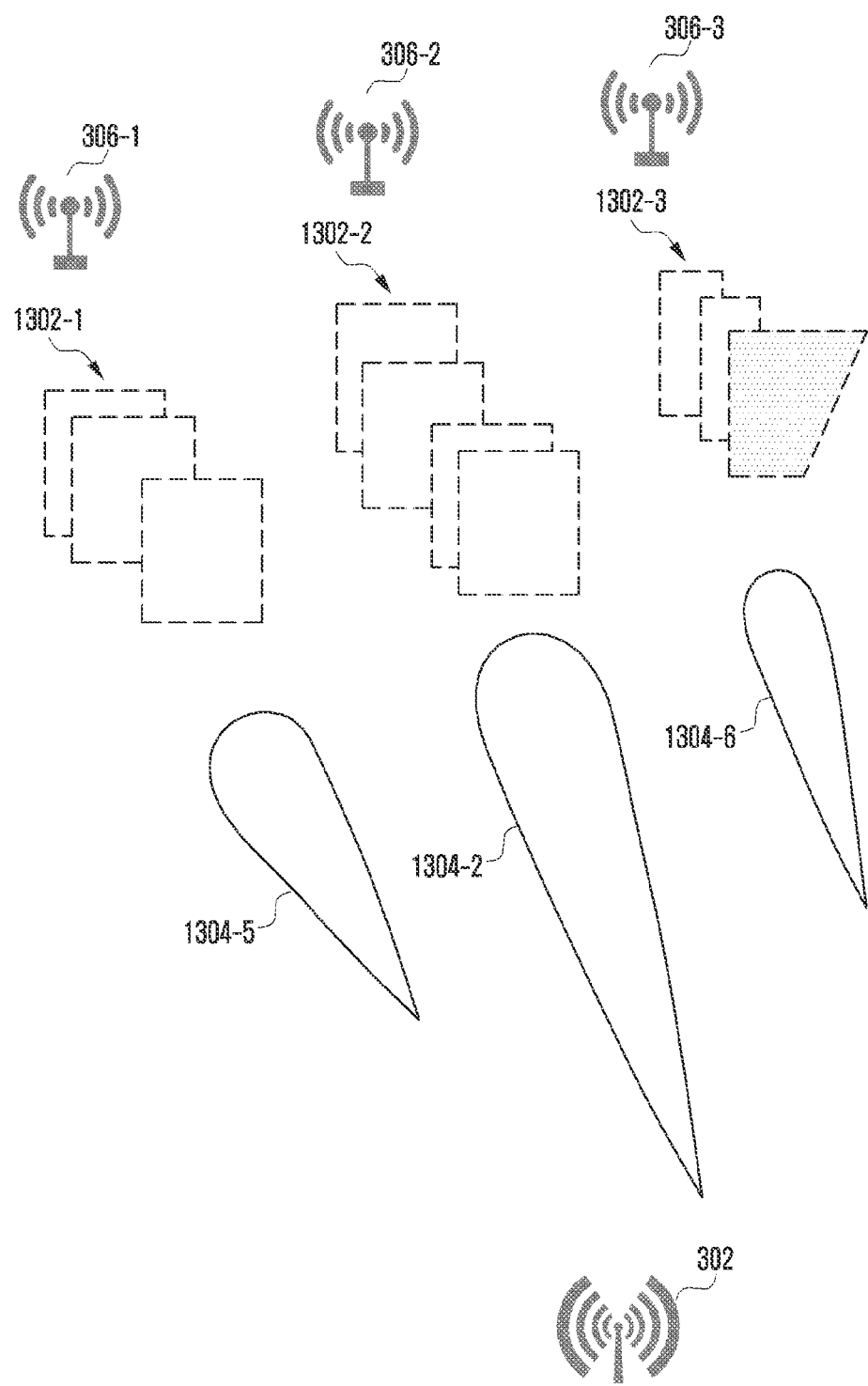

Referring to FIG. 13C, based on the reflected signals obtained from the beams 1304-1, 1304-2, and 1304-4, a virtual layer (represented by dotted pattern) in the set 1302-1 of virtual layers is dropped or removed. A collective attenuation value of the set 1302-1 of virtual layers is then determined in a manner as described above. A beam 1304-5 is formed based on a collective attenuation value of the set 1302-1 of virtual layers. Also, based on the reflected signals obtained from the beams 1304-1, 1304-2, and 1304-4, a beam 1304-6 is formed with high gain is formed.

Figure 14A:
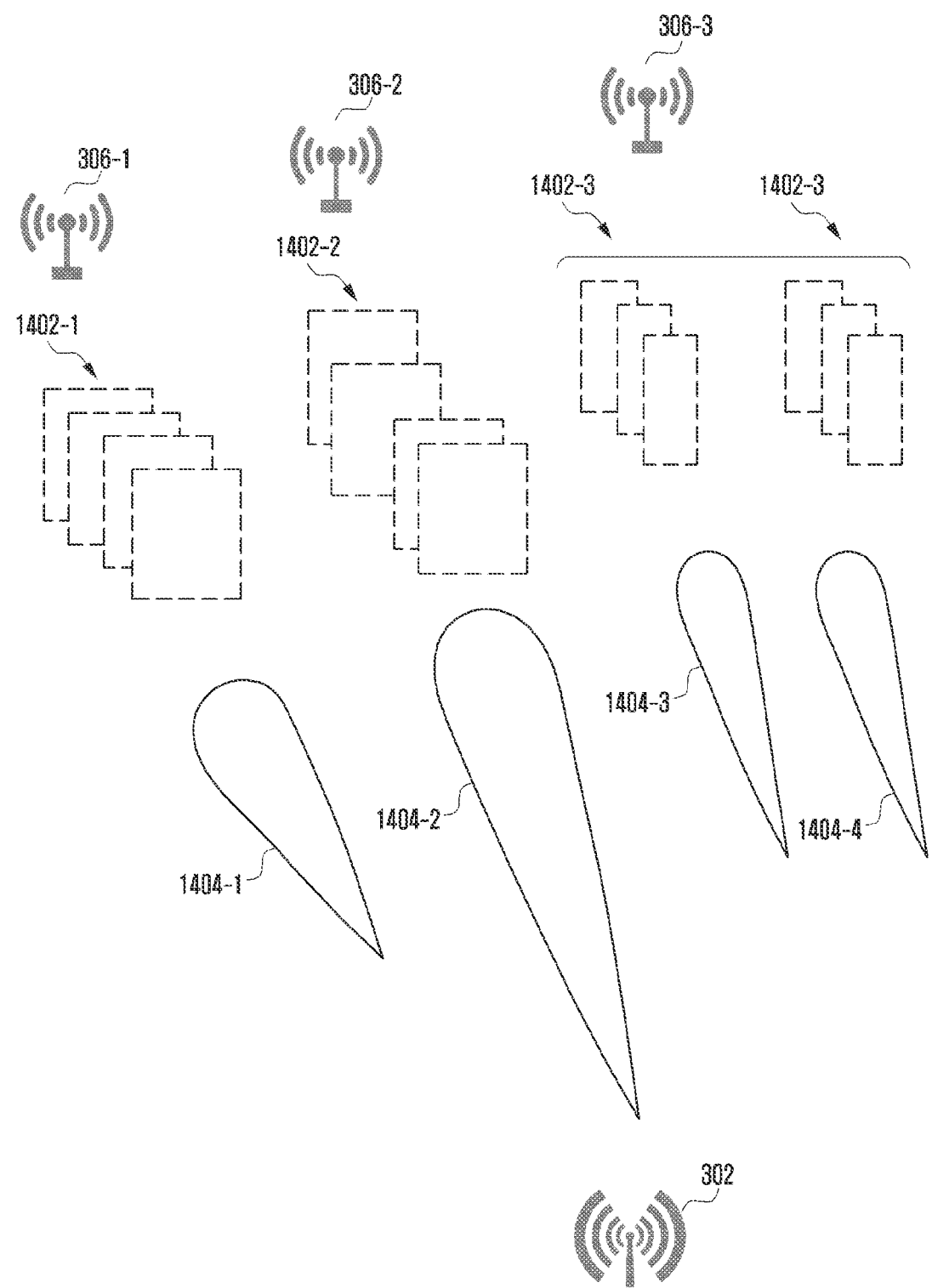

In an example implementation, the LFU 404 dynamically merges the at least one set of virtual layers with at least one further set of virtual layers. Referring to FIG. 14A, a set 1402-1 of virtual layers is formed between the transmitting antenna 302 and the receiving antenna 306-1. A beam 1404-1 is formed based on a collective attenuation value of the set 1402-1 of virtual layers. A set 1402-2 of virtual layers is formed between the transmitting antenna 302 and the receiving antenna 306-2. A beam 1404-2 is formed based on a collective attenuation value of the set 1402-2 of virtual layers. A set 1402-3 of virtual layers and set 1402-4 of virtual layers are formed between the transmitting antenna 302 and the receiving antenna 306-3. A beam 1404-3 and a beam 1404-4 are formed based on a collective attenuation value of the set 1402-3 of virtual layers and the set 1402-4 of virtual layers.

Figure 14B:
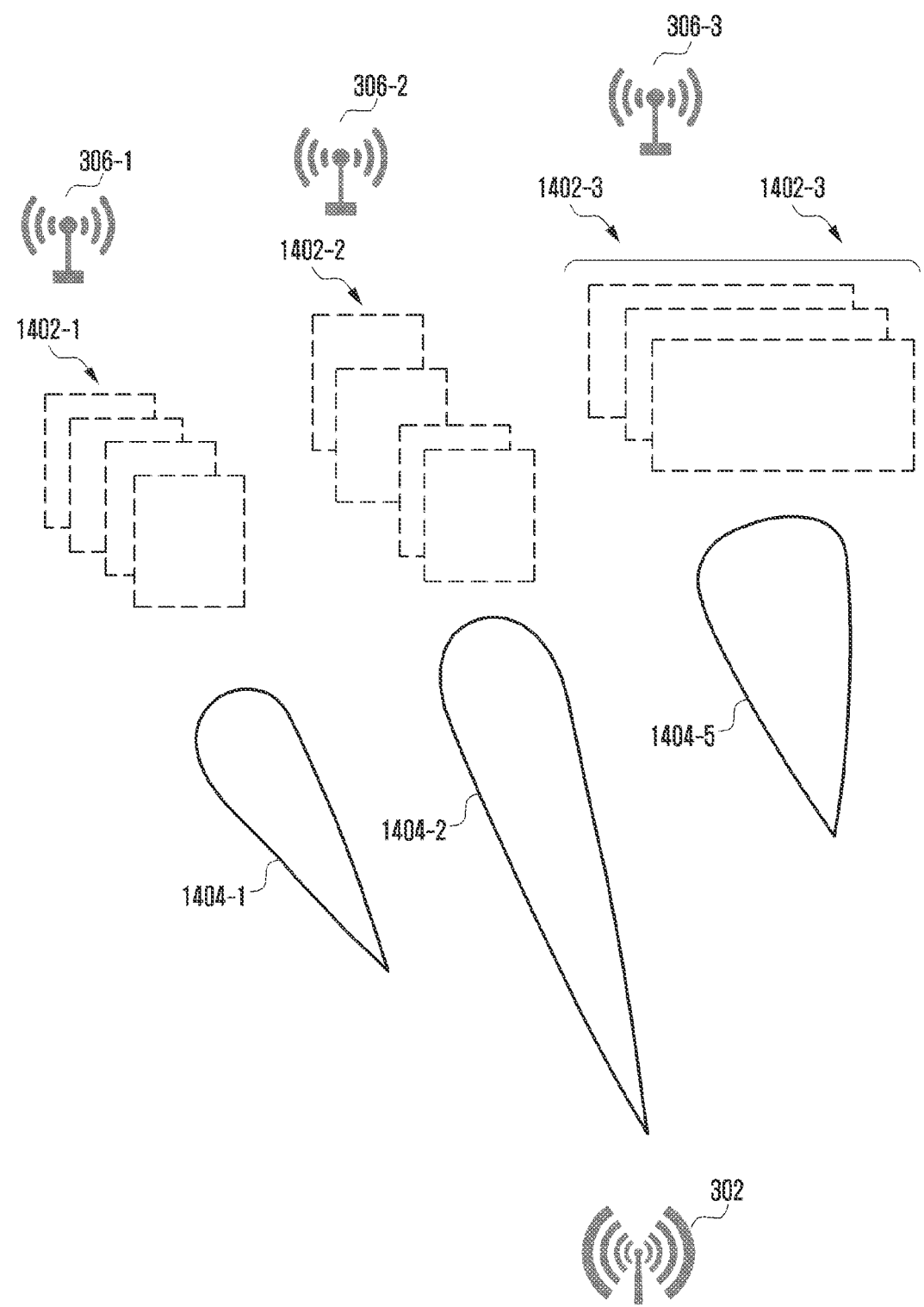

Referring to FIG. 14B, based on the reflected signals obtained from the beams 1404-1, 1404-2, 1404-3, and 1404-4, the set 1402-3 of virtual layers and the set 1402-4 of virtual layers are merged to form single set 1402-5 of virtual layers. A collective attenuation value of the set 1402-5 of virtual layers is then determined in a manner as described above. A beam 1404-5 is formed based on the collective attenuation value of the set 1404-5 of virtual layers.

In some example embodiments of the present disclosure, the WFU 412 determines at least one virtual hollow three-dimensional shape between the at least one set 310 of virtual layers and at least one further virtual set of virtual layers. In an example implementation, the at least one 3D aerial view image 308 is overlaid with the at least one set of virtual layers and the at least one further virtual set of virtual layers. To this end, the WFU 412 detects an open space distance between the at least one set of virtual layers and the at least one further virtual set of virtual layers. The WFU 412 determines the at least one virtual hollow three-dimensional shape based on the open space distance and dimensions of the at least one set of virtual layers and at least one further virtual set of virtual layers. The WFU 412 then select at least one three-dimensional obstruction free beam window within at least one virtual hollow three-dimensional shape. The obstruction free beam window can be defined as an area free of obstructions such that beam can be transmitted with no or minimal losses. The three-dimensional obstruction free beam window can be selected based on attenuation values of the at least one set of virtual layers and at least one further virtual set of virtual layers.

The BFU 414 then forms at least one of (a) the at least one first beam and (b) at least one second beam based on the least one three-dimensional obstruction free beam window. To this end, the BFU 414 controls at least one beam parameter of (a) the at least one first beam and (b) the at least one second beam based on the collective attenuation value and the three-dimensional obstruction free beam window. In an example implementation, the BFU 414 forms a first beam based the collective attenuation value and a second beam based on the three-dimensional obstruction free beam window. In an example implementation, the BFU 414 forms one or more beams based on the three-dimensional obstruction free beam window. In an example implementation, the BFU 414 forms one or more beams based on the collective attenuation and the three-dimensional obstruction free beam window.

Further, upon formation of the beam(s), the WFU 412 dynamically adjusts at least one parameter of the three-dimensional obstruction free beam window based on one or more of reflected signals and beam parameters such as beam size, data rate, and power. In an example, a size of the three-dimensional obstruction free beam window is changed or adjusted or modified. In an example, a shape of the three-dimensional obstruction free beam window is changed or adjusted or modified.

Figure 15A:
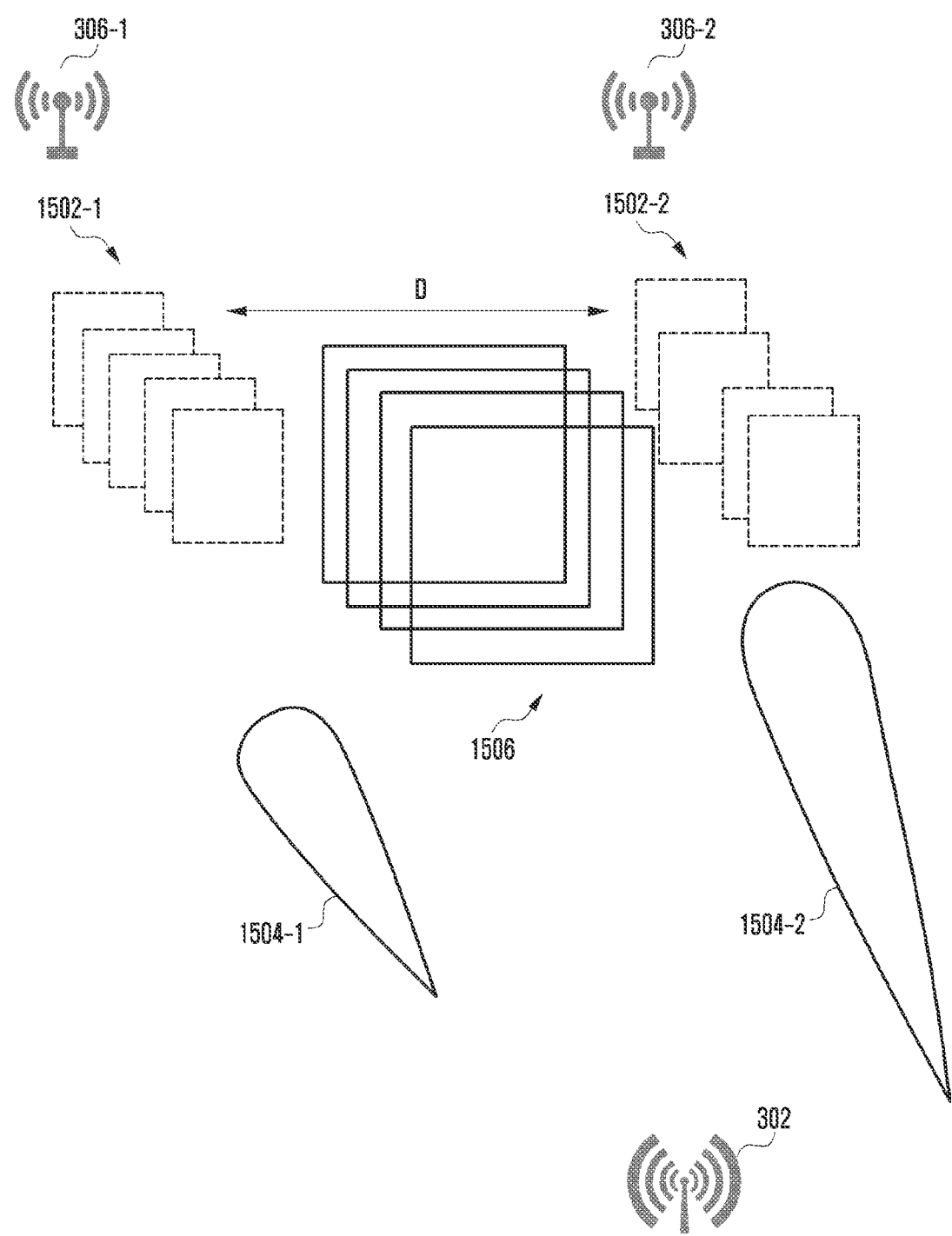

Referring to FIG. 15A, a set 1502-1 of virtual layers is formed between the transmitting antenna 302 and the receiving antenna 306-1. A beam 1504-1 is formed based on a collective attenuation value of the set 1502-1 of virtual layers. A set 1502-2 of virtual layers is formed between the transmitting antenna 302 and the receiving antenna 306-2. A beam 1504-1 is formed based on a collective attenuation value of the set 1502-2 of virtual layers.

An open space distance D is detected between the set 1502-1 of virtual layers and the set 1502-2 of virtual layers. Based on the open space distance D and dimensions of the set 1502-1 of virtual layers and the set 1502-2 of virtual layers, dimensions 1506 for hollow 3D shape are determined. The dimensions 1506 of the hollow 3D shape can be determined using techniques as known in the art. For the sake of brevity and clarity, the virtual layers are represented as squares and therefore the dimensions 1506 are also represented as squares. It would be understood that dimensions of any shape can be determined based on dimensions of the virtual layers and the open space distance.

Figure 15B:
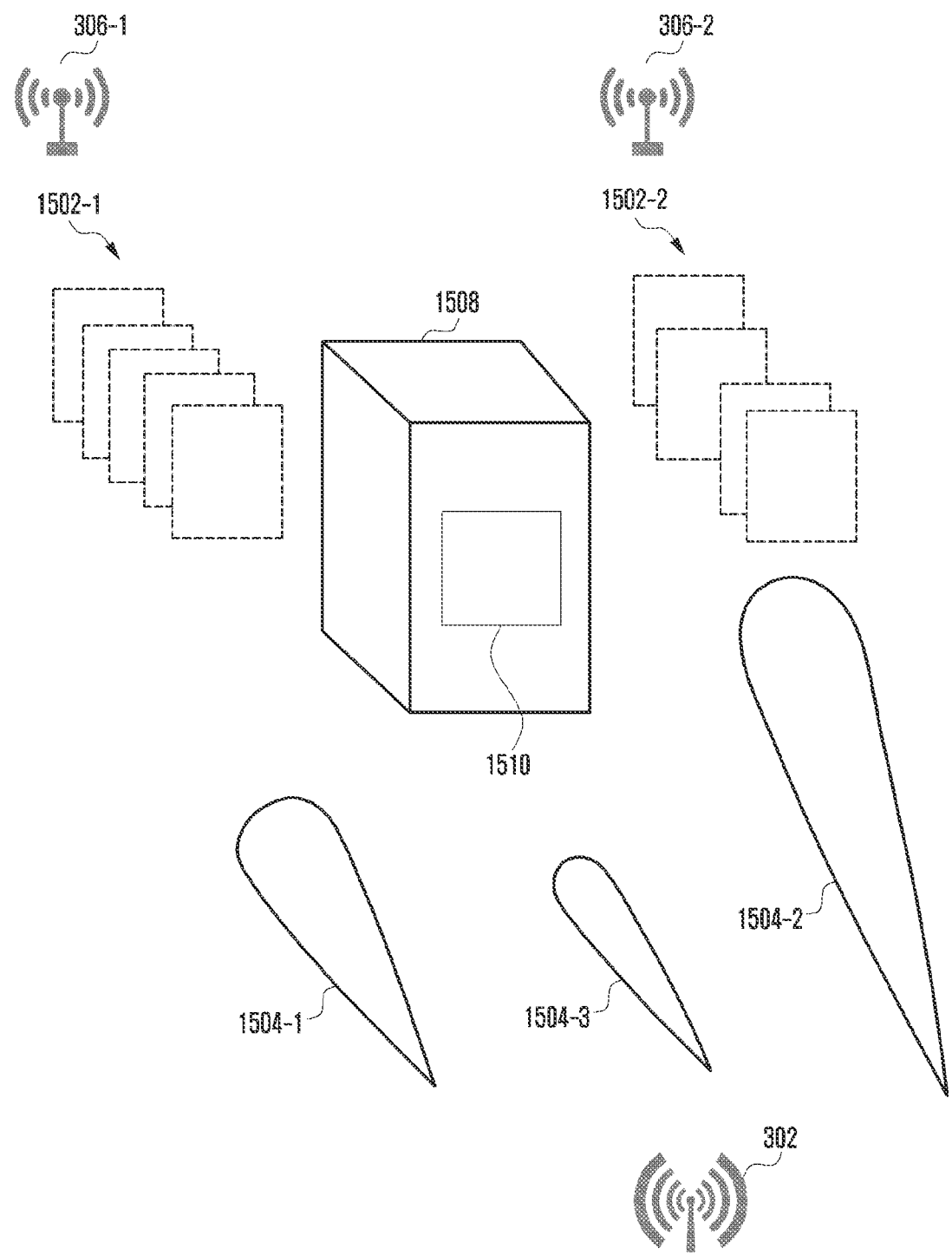

Referring to FIG. 15B, a hollow 3D shape 1508 is determined based on the determined dimensions 1506. The hollow 3D shape 1508 can be determined or formed using techniques as known in the art. Thereafter, an obstruction free beam window 1508 is selected within the hollow 3D shape 1506 based on collective attenuation value at least one set of virtual layers and at least one further virtual set of virtual layers. A beam 1504-3 is formed based on the obstruction free beam window 1508

Further, in various example embodiments, upon determining the hollow 3D shape, the LFU 404 modifies or updates one or more of the plurality of virtual layer parameters. This results in formation of the virtual layers that are accurately indicative of the determined attenuation value while retaining the optimum window within the hollow 3D shape. In an example implementation, shape of one or more virtual layers is modified. In an example implementation, shape and area of one or more virtual layers is modified. It would be understood that a change in the shape of a virtual layer also changes the size and/or density packing and/or coverage area of the virtual layer; and vice-versa. Upon updating the one or more of the plurality of virtual layer parameters, the set of virtual layers and the hollow 3D shape are again determined.

In an example implementation, the shape is normalized to a standard (or best fit) polygon based on an area of the at least one obstruction, attenuation value of the at least one obstruction, and the hollow 3D shape. In an example implementation, the shape one virtual layer is normalized to a standard (or best fit or maximum neighborhood matching) polygon based on area and shape of the at least one obstruction as viewed from one or more viewing angles, attenuation value of the at least one obstruction, shape of other virtual layers, hollow 3D shape, and direction of the at least one receiving antenna 306 with respect to the at least one obstruction. In an example implementation, the shape of one virtual layer is normalized to a standard polygon based on area and shape of the at least one obstruction as viewed from one or more viewing angles, attenuation value of the at least one obstruction, shape of other virtual layers, hollow 3D shape, and direction of the at least one transmitting antenna with respect to the at least one obstruction.

In various example embodiments of the present disclosure, the WFU 412 dynamically performs one or more actions related to the virtual hollow three-dimensional shape and/or the three-dimensional obstruction free beam window based on at least one of reflected signals obtained by emitting the at least one beam, the at least one set of virtual layers, the at least one further set of virtual layers, the collective attenuation value, and learned data.

In an example implementation, the WFU 412 dynamically adjusts one or more parameters of the at least one virtual hollow three-dimensional shape. In an example implementation, the WFU 412 dynamically adjusts one or more parameters of the at least one three-dimensional obstruction free beam window. In an example implementation, the WFU 412 dynamically merges the at least one virtual hollow three-dimensional shape with at least one further virtual hollow three-dimensional shape. In an example implementation, the WFU 412 dynamically merges the at least one three-dimensional obstruction free beam window with at least one further three-dimensional obstruction free beam window. In an example implementation, the WFU 412 dynamically ranks the at least one virtual hollow three-dimensional shape. The WFU 412 then dynamically merges the at least one virtual hollow three-dimensional shape with at least one further virtual hollow three-dimensional shape based on the ranking. In an example implementation, the WFU 412 dynamically ranks the at least one three-dimensional obstruction free beam window. The WFU 412 then dynamically merges the at least one three-dimensional obstruction free beam window with at least one further three-dimensional obstruction free beam window based on the ranking.

Figure 16:
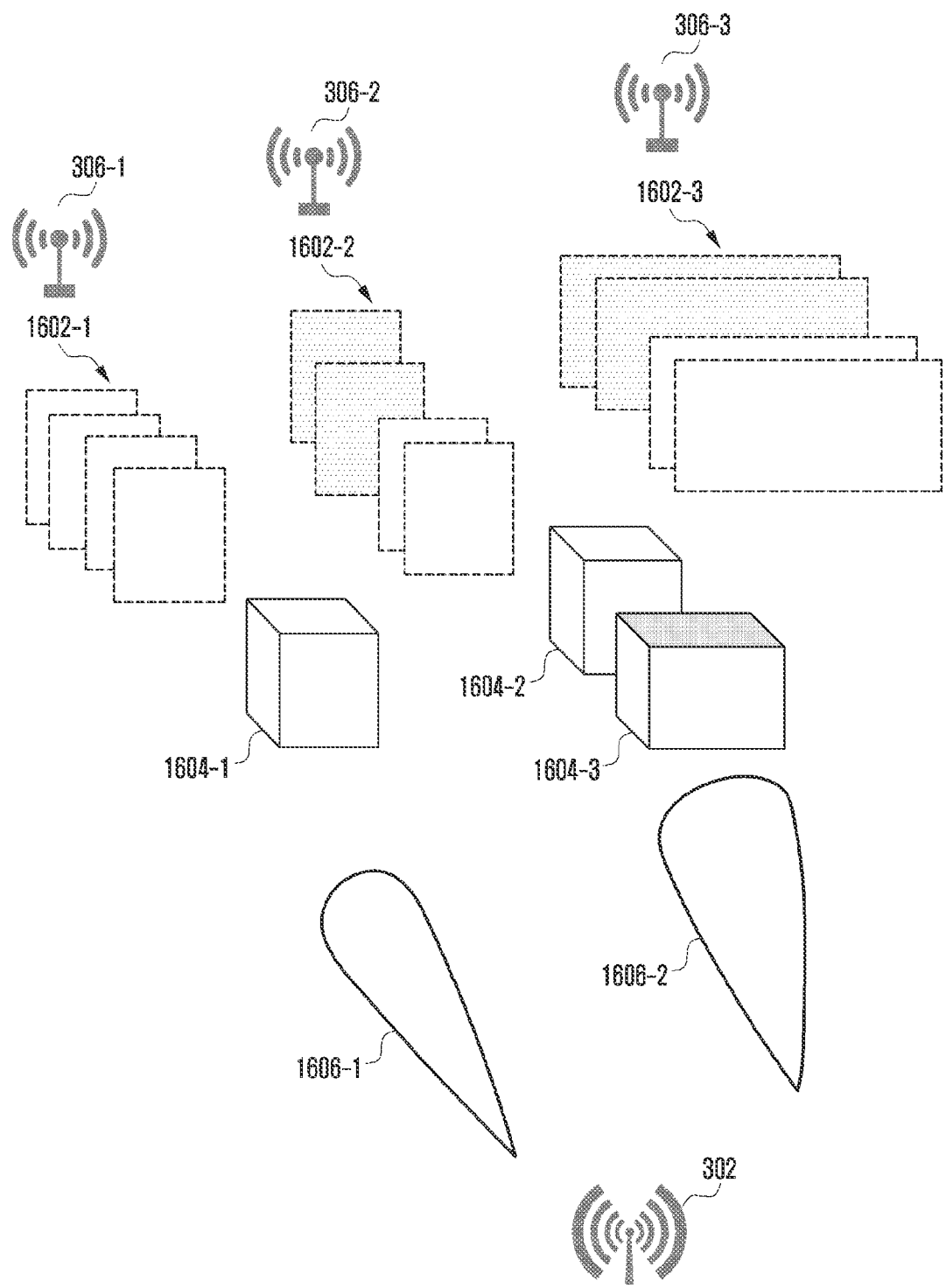

Referring to FIG. 16, a set 1602-1 of virtual layers is formed between the transmitting antenna 302 and the receiving antenna 306-1. A set 1602-2 of virtual layers is formed between the transmitting antenna 302 and the receiving antenna 306-2. A set 1602-3 of virtual layers is formed between the transmitting antenna 302 and the receiving antenna 306-3. A hollow 3D shape 1604-1 is formed between the set 1602-1 of virtual layers and the set 1602-1 of virtual layers. A beam 1606-1 is formed based on an obstruction free beam window selected within the hollow 3D shape 1604-1. A hollow 3D shape 1604-2 is formed between two virtual layers (represented by dotted patterns) of the set 1602-2 of virtual layers and the set 1602-3 of virtual layers based on one or more of virtual layer-to-virtual layer distance in the set 1602-2 of virtual layers and the set 1602-3 of virtual layers, reflected signals, and learned data. Similarly, a hollow 3D shape 1604-3 is formed between two virtual layers (represented by no pattern) of the set 1602-2 of virtual layers and the set 1602-3 of virtual layers based on one or more of virtual layer-to-virtual layer distance in the set 1602-2 of virtual layers and the set 1602-3 of virtual layers, reflected signals, and learned data. The hollow 3D shapes 1604-2 and 1604-3 are ranked. Based on the ranking, the hollow 3D shape 1604-3 is selected for beam formation. A beam 1606-2 is then formed based on an obstruction free beam window selected within the hollow 3D shape 1604-3.

Figure 17A:
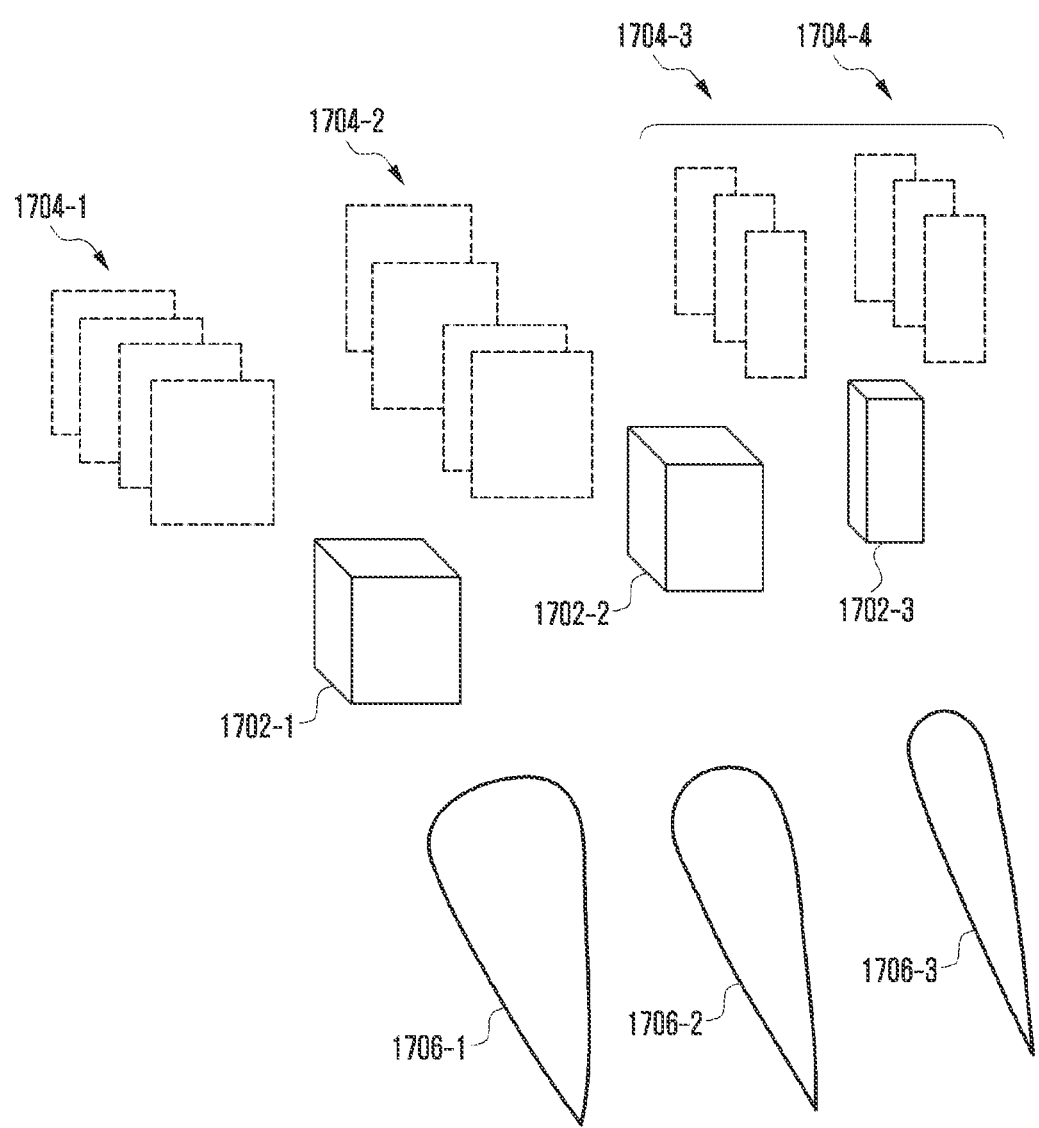

Referring to FIG. 17A, a hollow 3D shape 1702-1 is formed between a set 1704-1 of virtual layers and a set 1704-2 of virtual layers. A beam 1706-1 of high power is formed based on an obstruction free beam window selected within the hollow 3D shape 1702-1 and the attenuation value of the set 1704-1 of virtual layers and the set 1704-2 of virtual layers. A hollow 3D shape 1702-2 is formed between the set 1704-2 of virtual layers and a set 1704-3 of virtual layers. A beam 1706-2 of medium power is formed based on an obstruction free beam window selected within the hollow 3D shape 1702-2 and the attenuation value of the set 1704-2 of virtual layers and the set 1704-3 of virtual layers. A hollow 3D shape 1702-3 is formed between the set 1704-3 of virtual layers and a set 1704-4 of virtual layers. A beam 1706-3 of low power is formed based on an obstruction free beam window selected within the hollow 3D shape 1702-3 and the attenuation value of the set 1704-3 of virtual layers and the set 1704-4 of virtual layers.

Figure 17B:
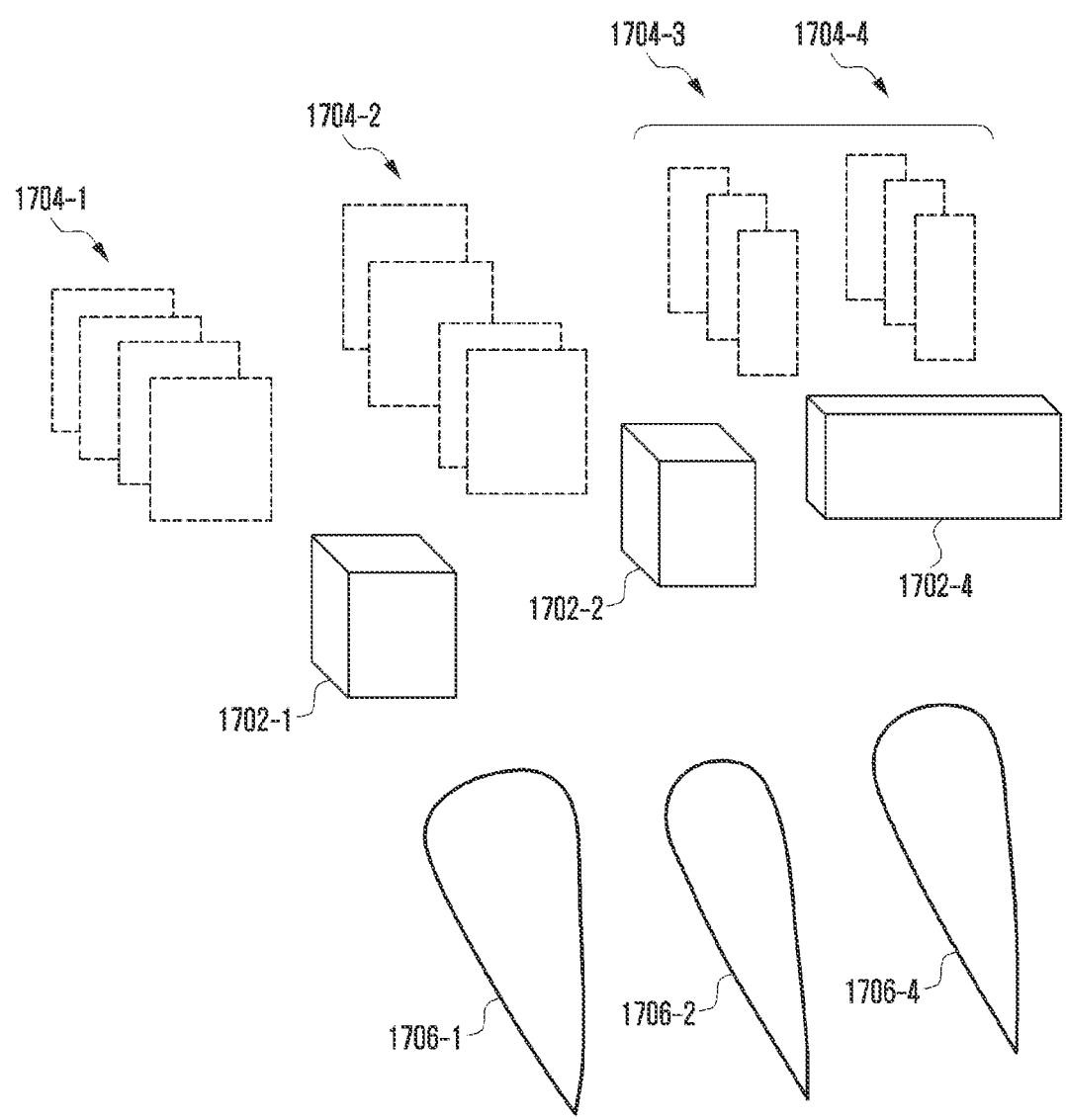

The collective attenuation values of the set 1704-3 of virtual layers and the set 1704-4 of virtual layers are lower than the collective attenuation values of the set 1704-1 of virtual layers and the set 1704-2 of virtual layers. As such, referring to FIG. 17B, based on the reflected signals, learned data, collective attenuation values of the set 1704-3 of virtual layers and the set 1704-4 of virtual layers, a shape of the hollow 3D shape 1702-3 is changed by merging the set 1704-3 of virtual layers and the set 1704-4 of virtual layers to create hollow 3D shape 1702-4. A beam 1706-4 of medium power is formed based on an obstruction free beam window selected within the hollow 3D shape 1702-4 and the summation collective attenuation value of the set 1704-3 of virtual layers and a collective attenuation value obtained by summation of the collective attenuation values of the set 1704-3 of virtual layers and the set 1704-4 of virtual layers.

Figure 17C:
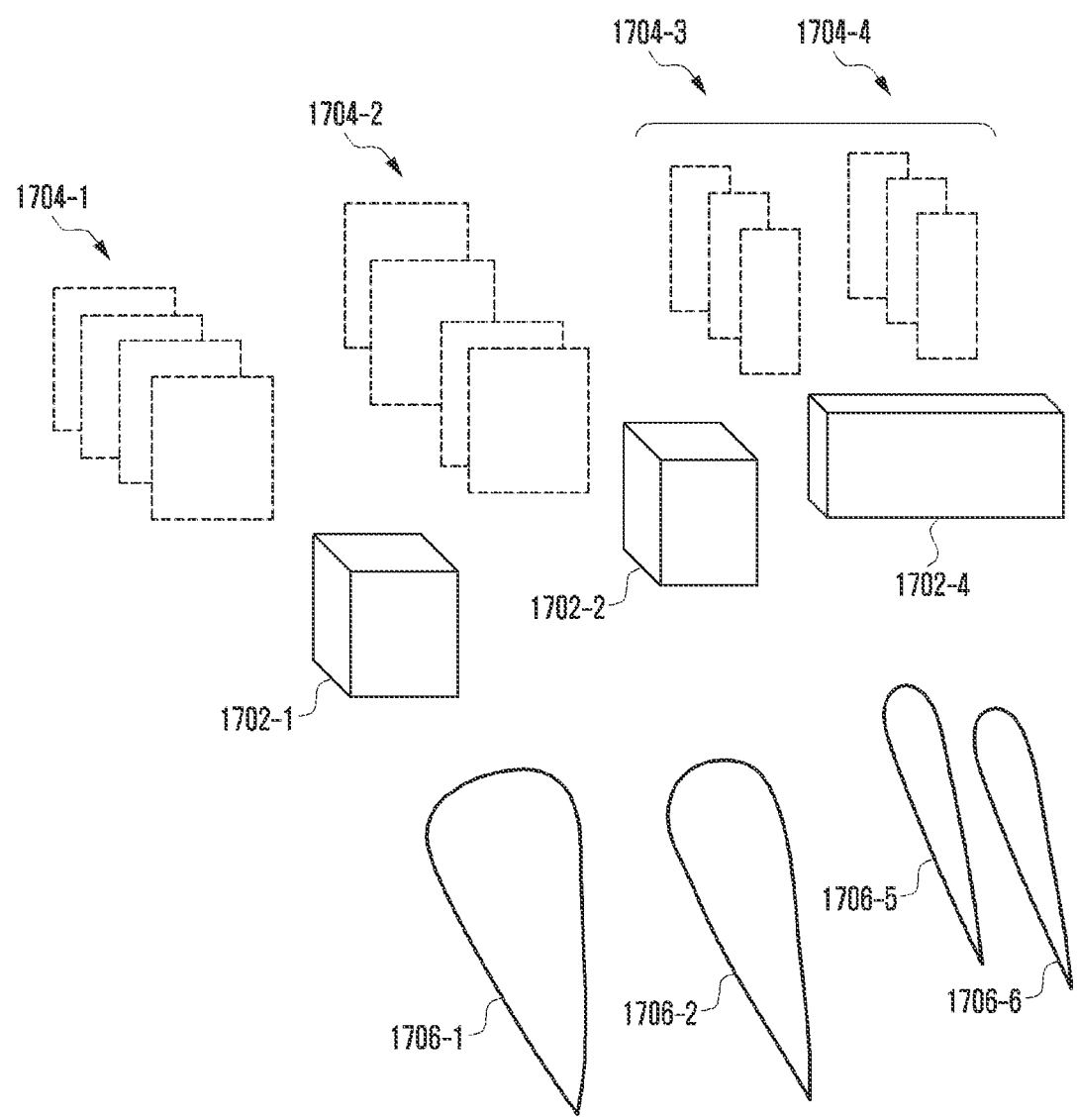

Further, based on the reflected signals, learned data, collective attenuation values of the set 1704-3 of virtual layers and the set 1704-4 of virtual layer, the beam parameters can be changed to form multiple beams. Accordingly, referring to FIG. 17C, beam parameters of the beam 1705-4 can be changes so that beam 1706-5 with low power L1 and beam 1706-6 with lower power L2 are formed based on an obstruction free beam window selected within the hollow 3D shape 1702-4.

In various example embodiments of the present disclosure, the BFU 414 can select between the set of virtual layers and the hollow 3D shapes for beam formation based on the collective attenuation values of the set of virtual layers, reflected signals, and learned data. The BFU 414 can select either the set of virtual layers or the hollow 3D shapes for optimum transmission direction and power transmission.

In various example embodiments of the present disclosure, the LFU 404 forms an additional set of virtual layers comprising of one or more additional virtual layers corresponding to an atmospheric obstruction and the one or more virtual layers 312 corresponding to the at least one obstruction. The LFU 404 form the additional set of virtual layers in a manner as described above. In an example, the additional set of virtual layer is formed by forming one or more virtual layers corresponding to an atmospheric obstruction within a previously formed set of virtual layers. In an example, the additional set of virtual layers is formed by forming one or more virtual layers corresponding to an atmospheric obstruction and forming one or more virtual layers corresponding to non-atmospheric obstructions. The ADU 406 determines a collective attenuation value for the additional set of virtual layers based on an attenuation value of the one or more additional virtual layers and attenuation value of the one or more virtual layers 312 corresponding to the at least one obstruction. The ADU 406 determines the collective attenuation value for the additional set of virtual layers in a manner as described above.

The BFU 414 then forms at least one further based on the collective attenuation value the collective attenuation value of the additional set of virtual layer. To this end, the BFU 414 controls at least one beam parameter of the at least one further beam based on the collective attenuation value of the additional set of virtual layer.

Figure 18A:
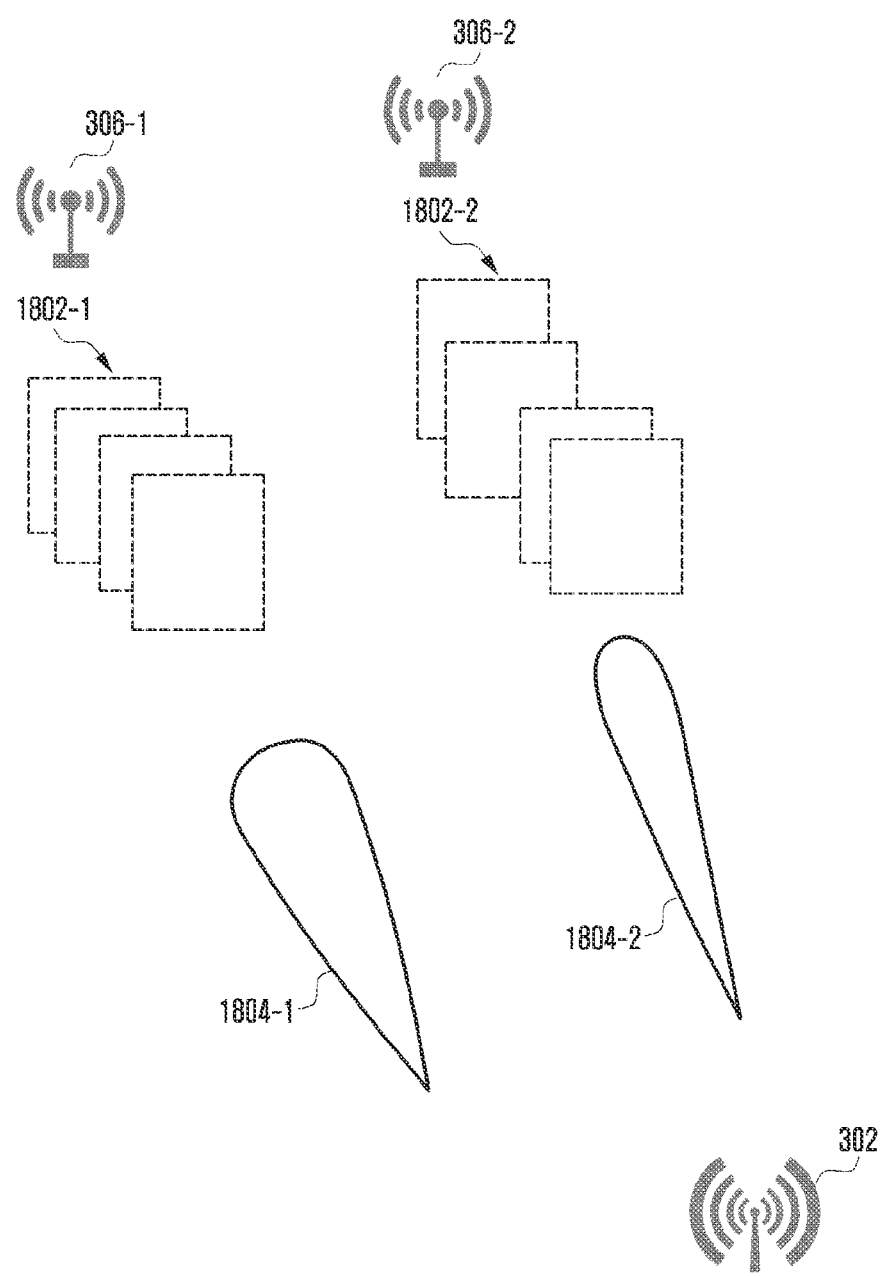

Referring to FIG. 18A, a set 1802-1 of virtual layers is formed between the transmitting antenna 302 and the receiving antenna 306-1 based on identification of non-atmospheric obstructions such as high-rise structures and trees between the transmitting antenna 302 and the receiving antenna 306-1. A beam 1804-1 of medium power is formed based on a collective attenuation value of the set 1802-1 of virtual layers. A set 1802-2 of virtual layers is formed between the transmitting antenna 302 and the receiving antenna 306-2 based on identification of non-atmospheric obstructions such as high-rise structures and trees between the transmitting antenna 302 and the receiving antenna 306-2. A beam 1804-2 low power of is formed based on a collective attenuation value of the set 1802-2 of virtual layers.

Figure 18B:
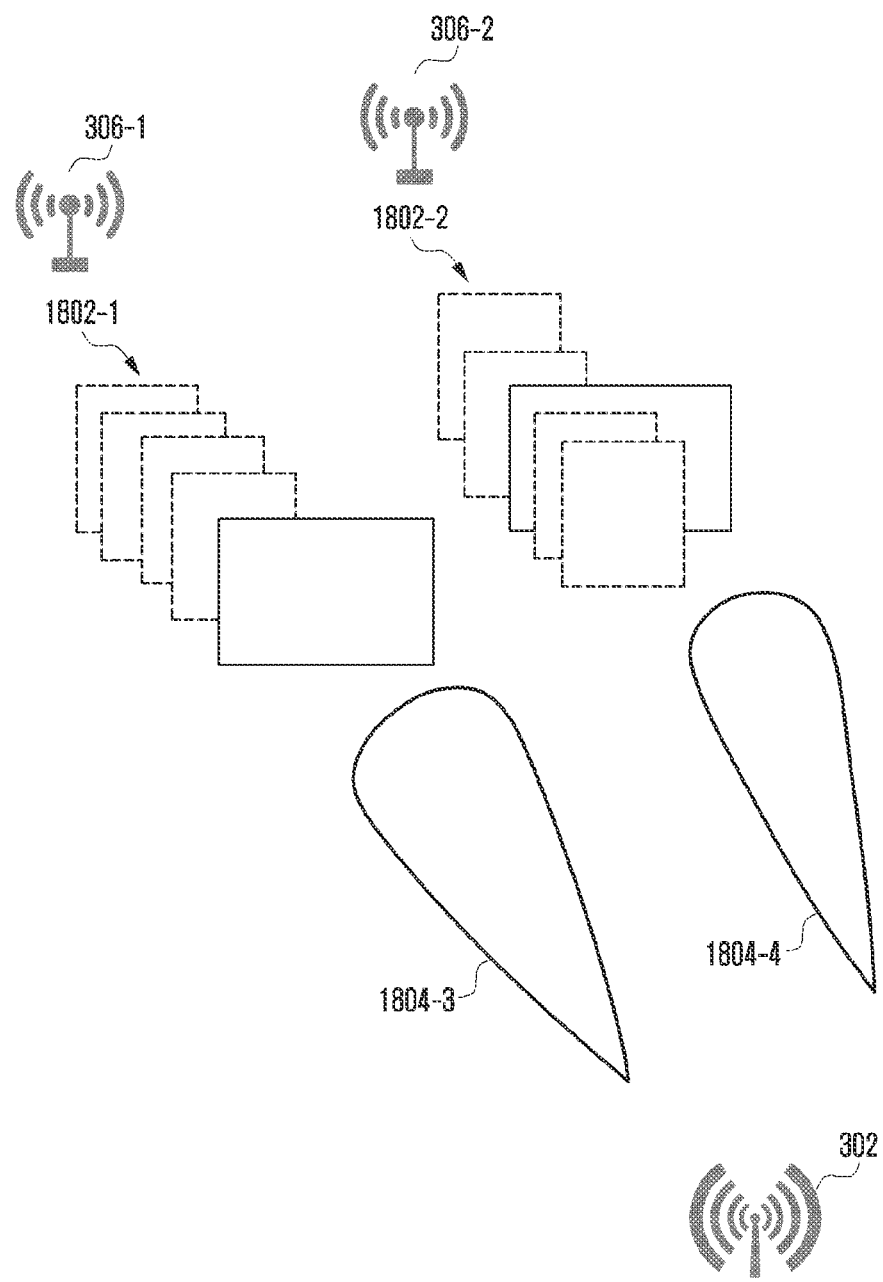

Based on reflected signals and learned data, atmospheric obstructions such as gases, particulate matters, humidity, etc., are identified between the transmitting antenna 302 and the receiving antennas 306-1, 306-2. As such, referring to FIG. 18B, additional virtual layers, represented by solid squares are formed corresponding to the atmospheric obstructions. Accordingly, an additional set 1802-3 of virtual layers is formed between the transmitting antenna 302 and the receiving antenna 306-1 based on the virtual layers corresponding to the atmospheric obstructions and virtual layers corresponding to the non-atmospheric obstruction. A collective attenuation value is then determined for the additional set 1802-3 of virtual layer. A beam 1804-3 of high power is formed based on the collective attenuation value of the additional set 1802-3 of virtual layers.

Similarly, an additional set 1802-4 of virtual layers is formed between the transmitting antenna 302 and the receiving antenna 306-2 based on the virtual layers corresponding to the atmospheric obstructions and virtual layers corresponding to the non-atmospheric obstruction. A collective attenuation value is then determined for the additional set 1802-4 of virtual layer. A beam 1804-4 of medium power is formed based on the collective attenuation value of the additional set 1802-4 of virtual layers As such, the present disclosure can be implemented for various communication systems for transmitting and receiving signals with minimal losses and minimal delay. Examples of communication systems include, but not limited to, Multiple Input Multiple Output (MIMO) communication systems, Multiple Input Single Output (MISO) communication systems, Single Input Multiple Output (SIMO) communication systems, etc.

Similarly, the present disclosure can be implemented within devices/systems/apparatus operating in various wireless/cellular networks for transmitting and receiving data with minimal losses and minimal delay. Examples of network include, but not limited to, indoor wireless networks, outdoor wireless networks, core network interfaces, back end networks, cloud based networks such as device-to-device (D2D) network, Internet of Things (IoT) network, and machine-to-machine (M2M) network, etc.

In an example embodiment, a system is built for monitoring crop field with the help of such as sensors such as light, humidity, temperature, soil moisture, etc., and IoT devices pertaining to automating irrigation system, cattle monitoring system, greenhouse management system, storage management system, logistics management system etc. The IOT devices can be placed at different locations at the crop field. A drone can obtain 3D image of the crop field and form one or more sets of virtual layers for obstructions in the crop. Based on data from sensors, the drone can transmit efficient beam with minimum power losses for controlling the various systems.

In an example embodiment, IoT devices can be placed at different locations and levels of a building. A transmitting device, such as smart phone, can obtain 3D image of the building and form one or more sets of virtual layers based on attenuation values provided by different levels of the building. Based on location of the IoT devices and allocated IoT signal, the transmitting device can transmit beams of sufficient power.

Further, the present disclosure can be implemented in deploying dense mmWave networks. To this end, the present disclosure enables formation of efficient and high direction beam for efficient and dense network for 3D aerial wireless transmission while delivering high quality line of sight connectivity. Such efficient and dense network supports seamless mobility while complementing effective cell power transmission coverage area.

Furthermore, the present network can be implemented for planning candidate sites and RF parameters efficiently based on requirements and coverage simulation results can be generated to efficiently reduce the total cost of experimental network construction. After the network construction, the coverage simulation can be used in selecting the best test routes or test locations at the network site. In addition, the coverage simulation can be used for identifying users with highest data usage and determining ideal installation positions for customer premises equipment (CPE).

Further, the present disclosure can be implemented in radar based wireless gesture sensing techniques. Further, the present disclosure can be implemented in tactile based feedback techniques in various network based systems such as robotic surgeries, e-commerce, virtual reality, etc. Furthermore, the present disclosure can be implemented for target object detection by filtering non-interested areas or filter obstructions.

Figure 19:
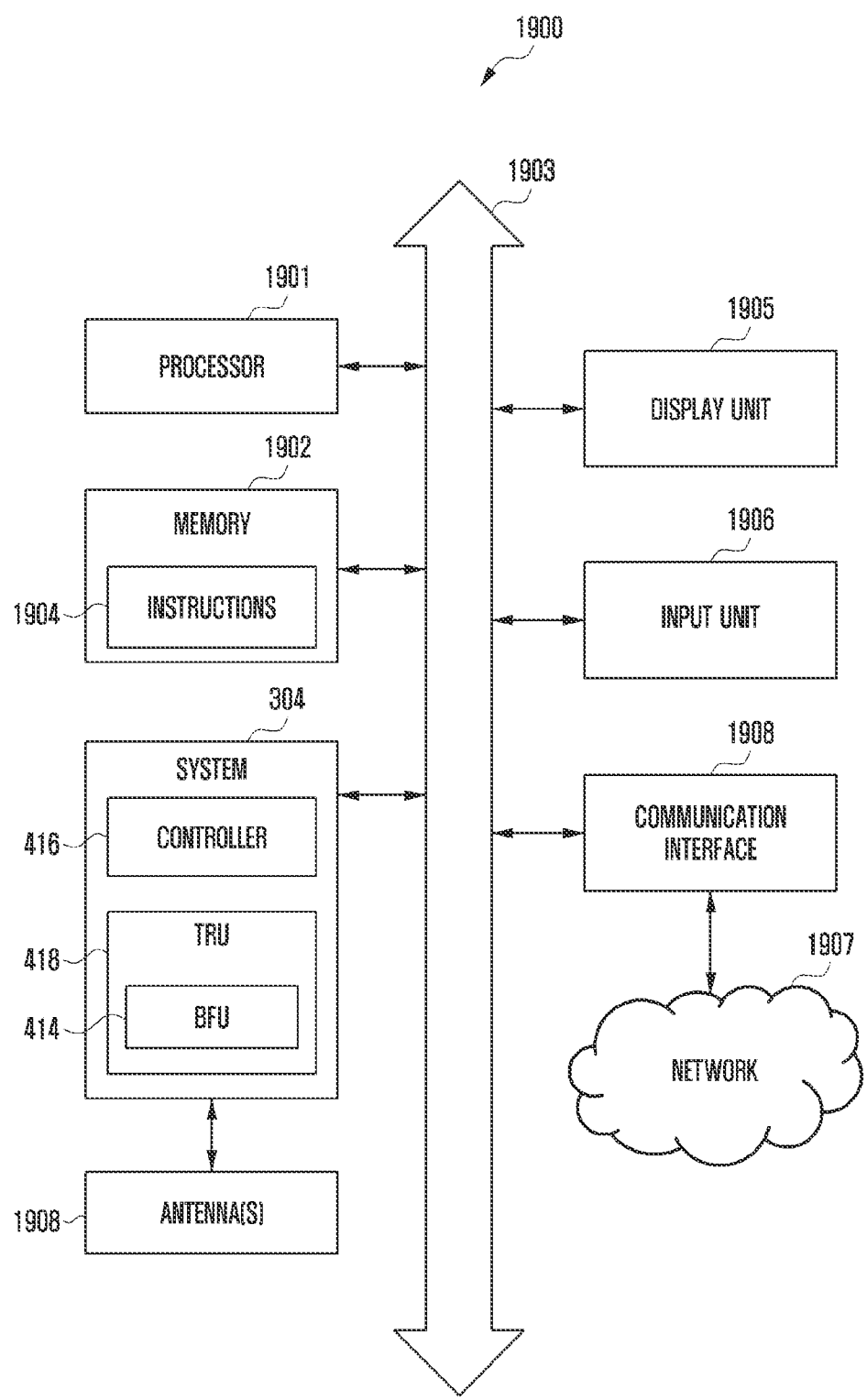
FIG. 19 is a block diagram illustrating an example configuration of user equipment configured for use in wireless communication and comprising the system, according to various embodiments.

FIG. 19 is a block diagram illustrating an example configuration of a user equipment 1900 configured for use in wireless communication, according to various embodiments. The user equipment 1900 can be part of Multiple Input Multiple Output (MIMO) communication systems, Multiple Input Single Output (MISO) communication systems, Single Input Multiple Output (SIMO) communication systems, etc., that can send or receive signals in either of indoor environments and outdoor environments. Thus, in an example implementation, the user equipment 1900 may comprise, for example, as smart phone, a wearable device, a virtual reality (VR) device, a vehicle, an autonomous small size robot, and an Internet of Things (IoT) device.

The user equipment 1900 may include a processor (e.g., including processing circuitry) 1901, e.g., a central processing unit (CPU), a graphics processing unit (GPU), or both. The processor 1901 may be a component in a variety of systems. For example, the processor 1901 may be part of a standard personal computer or a workstation. The processor 1901 may be one or more general processors, digital signal processors, application specific integrated circuits, field programmable gate arrays, servers, networks, digital circuits, analog circuits, combinations thereof, or other now known or later developed devices for analyzing and processing data The processor 1901 may implement a software program, such as code generated manually (e.g., programmed).

The user equipment 1900 may include a memory 1902, such as a memory 1902 that can communicate via a bus 1903. The memory 1902 may be a main memory, a static memory, or a dynamic memory. The memory 1902 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In an example, the memory 1902 includes a cache or random access memory for the processor 1901. In alternative examples, the memory 1902 is separate from the processor 1901, such as a cache memory of a processor, the system memory, or other memory. The memory 1902 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1902 is operable to store instructions 1904 executable by the processor 1901. The functions, acts or tasks illustrated in the figures or described may be performed by the programmed processor 1901 executing the instructions stored in the memory 1902. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The user equipment 1900 may further include a display unit (e.g., including a display) 1905, such as a liquid crystal display (LCD), an organic light emitting diode (OLED), a flat panel display, a solid state display, a cathode ray tube (CRT), a projector, a printer or other now known or later developed display device for outputting determined information. The display unit 1905 may act as an interface for the user to see the functioning of the processor 1901, or other units. The user equipment 1900 may further include other output devices (not shown in the figure).

The user equipment 1900 may further include an input unit (e.g., including input circuitry) 1906 configured to allow a user to interact with any of the components of user equipment 1900. The input device may be a number pad, a keyboard, or a cursor control device, such as a mouse, or a joystick, touch screen display, remote control or any other device operative to interact with the user equipment 1900.

The user equipment 1900 may be connected to a network 1907 to communicate voice, video, audio, images or any other data over the network 1907. Further, the instructions 1904 may be transmitted or received over the network 1907 via a communication port or network 1907 or using the bus 1903. The communication port or network 1907 may be a part of the processor 1901 or may be a separate component. The communication interface (e.g., including communication circuitry and/or a communication port) 1908 may be created in software or may be a physical connection in hardware. The communication interface 1908 may be configured to connect with the network 1907, external media, the display unit 1905, or any other components in user equipment 1900, or combinations thereof. The connection with the network 1907 may be a physical connection, such as a wired Ethernet connection or may be established wirelessly as discussed later. Likewise, the additional connections with other components of the user equipment 1900 may be physical connections or may be established wirelessly. The network 1907 may alternatively be directly connected to the bus 1903.

The network 1907 may include wired networks, wireless networks, Ethernet AVB networks, or combinations thereof. The wireless network may be a cellular telephone network, an 802.11, 802.16, 802.20, 802.1Q or Wi Max network. Further, the network 1907 may be a public network, such as the Internet, a private network, such as an intranet, or combinations thereof, and may utilize a variety of networking protocols now available or later developed including, but not limited to TCP/IP based networking protocols.

The user equipment 1900 may further include the system 304 for forming a beam in accordance with the present disclosure. The system 304 can include the controller 416 to select one or more attenuation cells, as described in various embodiments above. The system 304 further includes the BFU 414 within the TRU 418. The BFU 414 forms at least one beam based on the one or more selected attenuation cells, as described in various embodiments above. The TRU 418 transmits or receives a signal to/from a receiver through the at least one beam formed by the BFU 414 via one or more antennas 1908. In an example implementation, the antenna(s) 1908 transmit or receive the signal over millimeter waves (mmWV). Examples of the antenna(s) 1908 can include, but not limited to, a beam antenna and an array antenna that can form one or more beams in a specific direction. Thus, in various example embodiments, the use equipment 1900 can control transmission power during data uplink transmission and data downlink transmission.

Further, in an example implementation, the system 304 can be a separate component. In an example implementation, the system 304 can be part of a dedicated radio frequency (RF) unit (not shown in the figure) connected to the antenna(s) 1908. In an example implementation, the device 1909 can be a software component implemented in a physical virtual layer of a digital radio frequency interface, as per current communications standards.

Further, the receiver can be part of Multiple Input Multiple Output (MIMO) communication systems, Multiple Input Single Output (MISO) communication systems, Single Input Multiple Output (SIMO) communication systems, etc., that can send or receive signals in either of indoor environments and outdoor environments. For example, the receiver can be a base station, a user-terminal, a vehicle, an IOT device, and an autonomous small size robot.

Although, various example components have been illustrated in the figure, the user equipment 1900 may include further components (hardware/software/combination thereof) necessary for proper functioning/operation of the user equipment 1900 as required.

Figure 20:
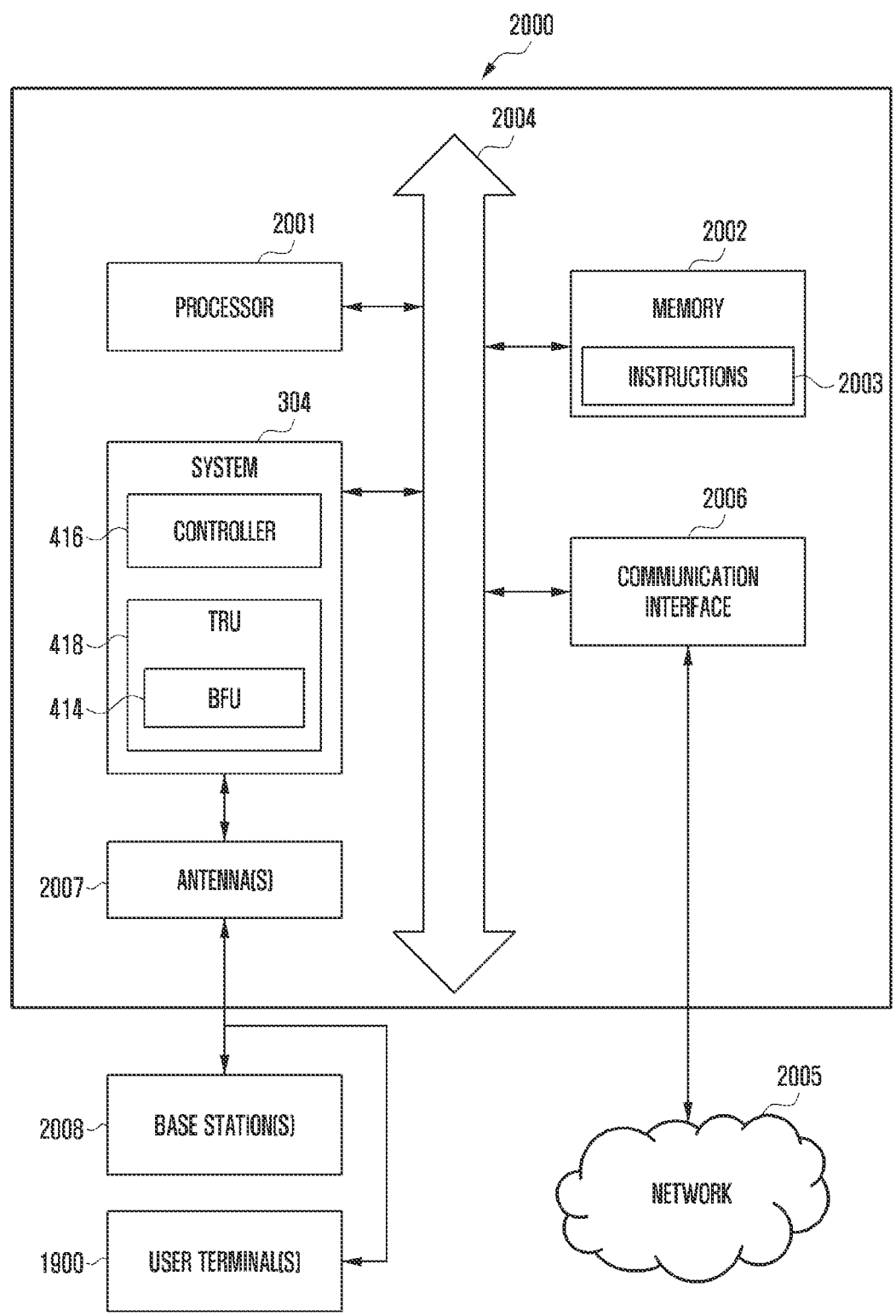
FIG. 20 is a block diagram illustrating an example configuration of a base station configured for use in wireless communication and comprising the system, according to various embodiments.

FIG. 20 is a block diagram illustrating an example configuration of a base station 2000 configured for use in wireless communication, according to various embodiments.

The base station 2000 may include a processor (e.g., including processing circuitry) 2001, e.g., a central processing unit (CPU), a graphics processing unit (GPU), or both. The processor 2001 may be a component in a variety of systems. For example, the processor 2001 may be part of a standard personal computer or a workstation. The processor 2001 may be one or more general processors, digital signal processors, application specific integrated circuits, field programmable gate arrays, servers, networks, digital circuits, analog circuits, combinations thereof, or other now known or later developed devices for analyzing and processing data The processor 2001 may implement a software program, such as code generated manually (e.g., programmed).

The base station 2000 may include a memory 2002, such as a memory 2002 that can communicate via a bus 2003. The memory 2002 may be a main memory, a static memory, or a dynamic memory. The memory 2002 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In an example, the memory 2002 includes a cache or random access memory for the processor 2001. In alternative examples, the memory 2002 is separate from the processor 2001, such as a cache memory of a processor, the system memory, or other memory. The memory 2002 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 2002 is operable to store instructions 2003 executable by the processor 2001. The functions, acts or tasks illustrated in the figures or described may be performed by the programmed processor 2001 executing the instructions stored in the memory 2002. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The base station 2000 may be connected to a network 2005 to communicate voice, video, audio, images or any other data over the network 2005. Further, the instructions 2004 may be transmitted or received over the network 2005 via a communication port or interface (e.g., including communication circuitry) 2006 or using the bus 2003. The communication port or interface 2006 may be a part of the processor 2001 or may be a separate component. The communication interface 2006 may be created in software or may be a physical connection in hardware. The communication interface 2006 may be configured to connect with the network 2005, external media, a display unit (not shown in the figure), or any other components in base station 2000, or combinations thereof. The connection with the network 2005 may be a physical connection, such as a wired Ethernet connection or may be established wirelessly as discussed later. Likewise, the additional connections with other components of the base station 2000 may be physical connections or may be established wirelessly. The network 2005 may alternatively be directly connected to the bus 2003.

The network 2005 may include wired networks, wireless networks, Ethernet AVB networks, or combinations thereof. The wireless network may be a cellular telephone network, an 802.11, 802.16, 802.20, 802.1Q or Wi Max network. Further, the network 2005 may be a public network, such as the Internet, a private network, such as an intranet, or combinations thereof, and may utilize a variety of networking protocols now available or later developed including, but not limited to TCP/IP based networking protocols.

The base station 2000 may further include may further include the system 304 for forming a beam in accordance with the present disclosure. The system 304 can include the controller 416 to select one or more attenuation cells, as described in various embodiments above. The system 304 further includes the BFU 414 within the TRU 418. The BFU 414 forms at least one beam based on the one or more selected attenuation cells, as described in various embodiments above. The TRU 418 transmits or receives a signal to/from a receiver through the at least one beam formed by the BFU 414 via one or more antennas 2008. In an example implementation, the antenna(s) 2008 transmit or receive the signal over millimeter waves (mmWV). Examples of the antenna(s) 2008 can include, but not limited to, a beam antenna and an array antenna that can form one or more beams in a specific direction. The receiver can be base station(s) 2009 and user-equipment(s) 1900 whose architecture was illustrated in FIG. 20. Thus, in various example embodiments, the base station 2000 can control transmission power during data uplink transmission and data downlink transmission.

Figure 21:
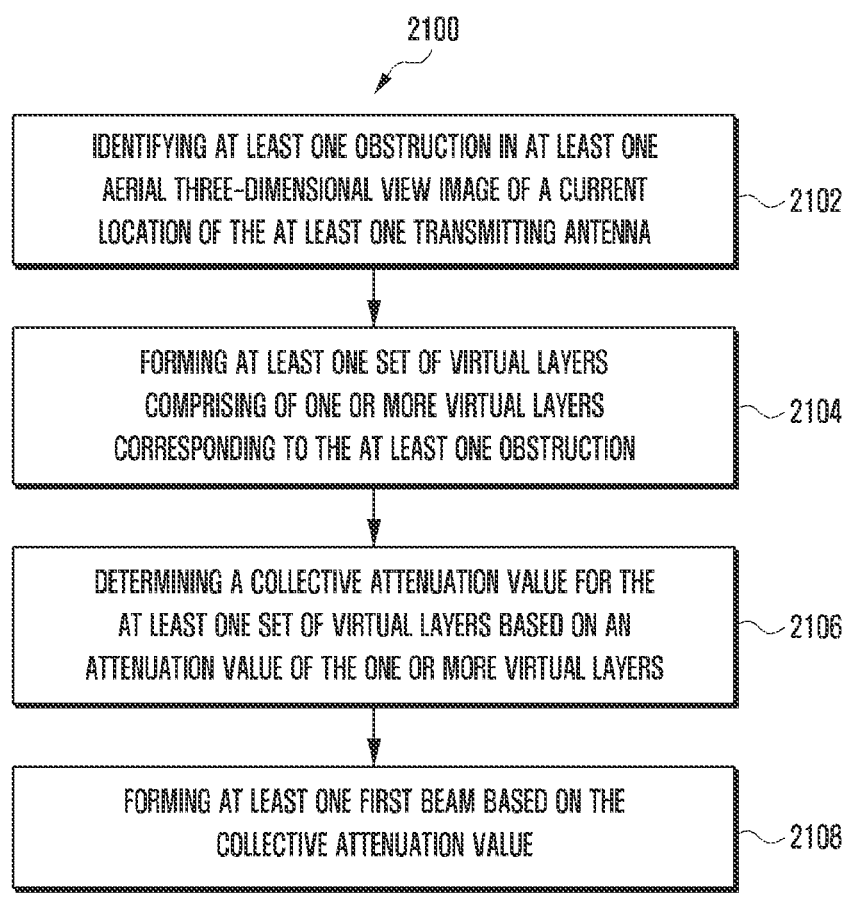
FIGS. 21, 22, 23A, 23B, 24A, 24B, 25, 26 and 27 are flowcharts illustrating example methods for beamforming, according to various embodiments.

FIG. 21 is a flowchart illustrating an example method 2100 of beamforming, according to various embodiments. The method 2100 may be implemented by the system 304 using components thereof, as described above. Further, for the sake of brevity, details of the present disclosure that are explained in details in the description of FIGS. 1-18 may not be repeated in detail in the description of FIG. 21.

At operation 2102, the method includes identifying at least one obstruction in at least one three-dimensional aerial view image of a current location of the at least one transmitting antenna.

At operation 2104, the method includes forming at least one set of virtual layers comprising of one or more virtual layers corresponding to the at least one obstruction.

At operation 2106, the method includes determining a collective attenuation value for the at least one set of virtual layers based on an attenuation value of the one or more virtual layers.

At operation 2108, the method includes forming at least one first beam based on the collective attenuation value.

Figure 22:
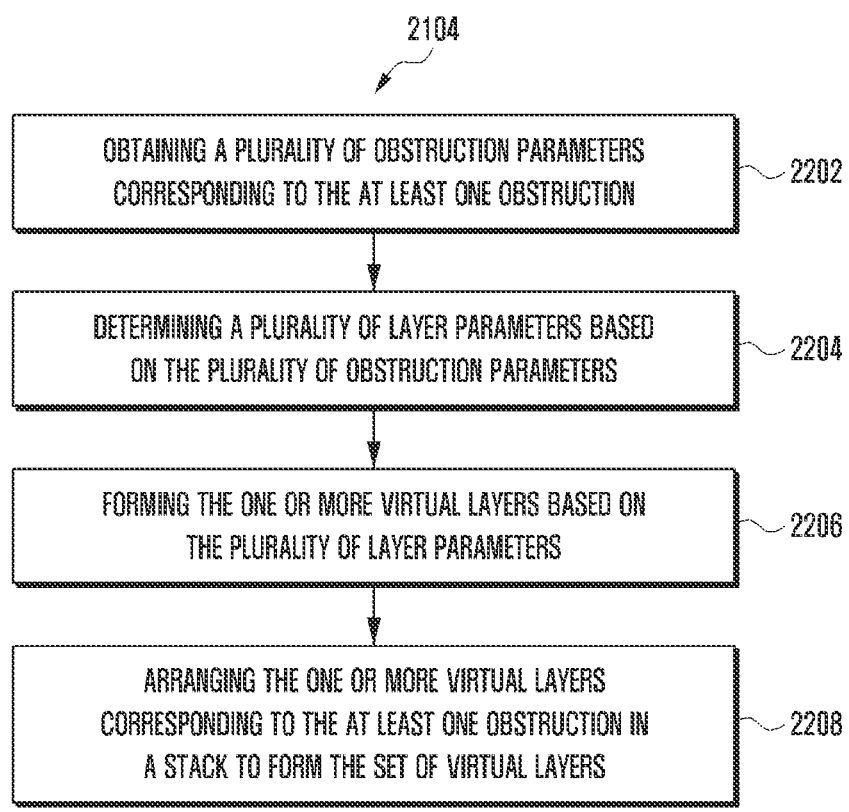

Further, the method may include further operations for forming the set of virtual layers at operation 2104. Referring to FIG. 22, at operation 2202, the method includes obtaining a plurality of obstruction parameters corresponding to the at least one obstruction. At operation 2204, the method includes determining a plurality of virtual layer parameters based on one or more of the plurality of obstruction parameters, characteristics of the at least one transmitting antenna, the characteristics of at least one receiving antenna, and learned data. At operation 2206, the method includes forming the one or more virtual layers based on the plurality of virtual layer parameters. At operation 2208, the method includes arranging the one or more virtual layers corresponding to the at least one obstruction in a stack to form the set of virtual layers.

Figure 23A:
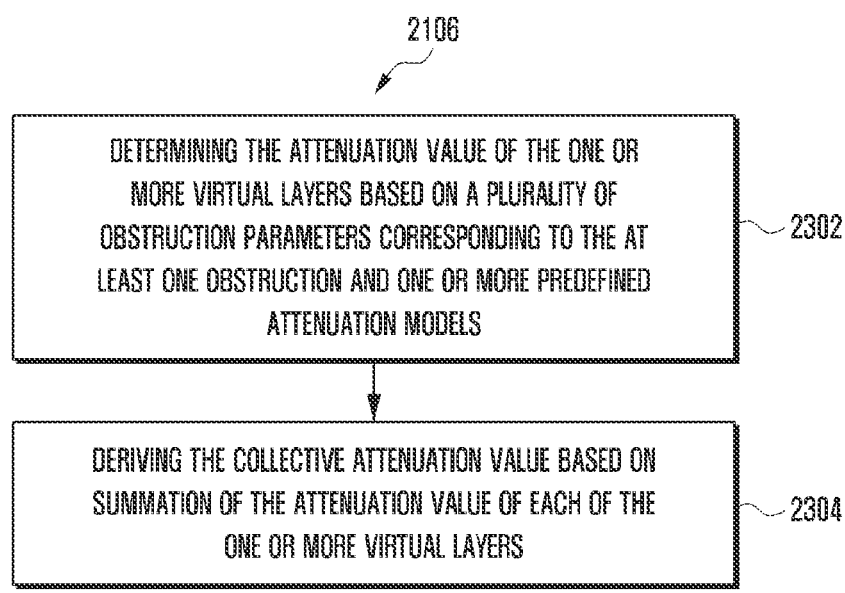

Further, the method may include further operations for determining the collective attenuation value at operation 2106. Referring to FIG. 23A, in various example embodiments, at operation 2302, the method includes determining the attenuation value of the one or more virtual layers based on a plurality of obstruction parameters corresponding to the at least one obstruction and one or more predefined attenuation models. At operation 2304, the method includes deriving the collective attenuation value based on summation of the attenuation value of each of the one or more virtual layers.

Figure 23B:
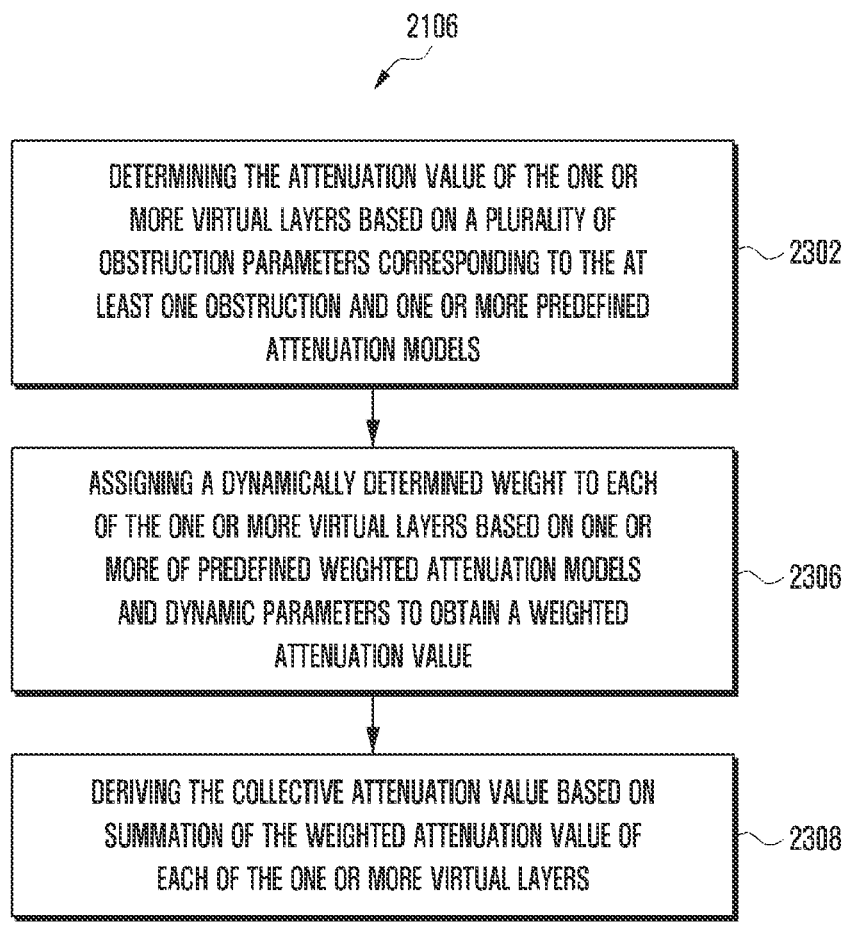

In various example embodiments, the method includes further operations upon determining the attenuation values of the one or more virtual layers at block 2302. Referring to FIG. 23B, at operation 2306, the method includes assigning a dynamically determined weight to each of the one or more virtual layers based on one or more of predefined weighted attenuation models and dynamic parameters to obtain a weighted attenuation value. At operation 2308, the method includes deriving the collective attenuation value based on summation of the weighted attenuation value of each of the one or more virtual layers.

Figure 24A:
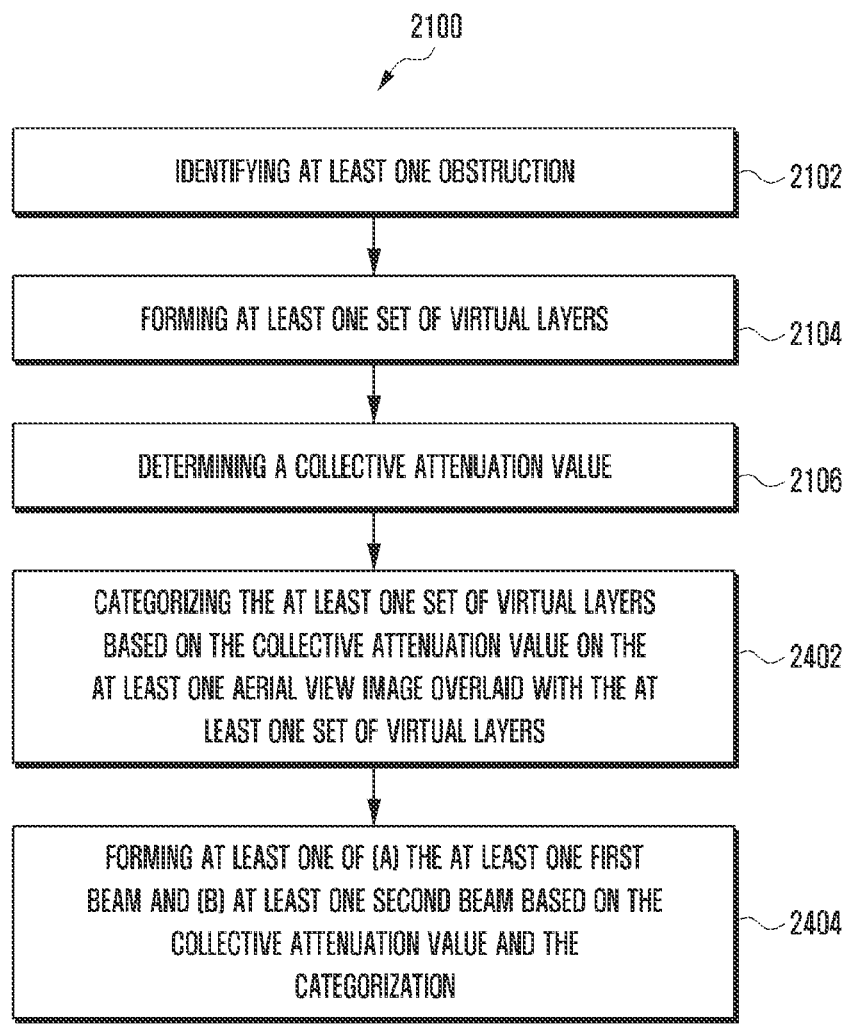

Further, in various example embodiments, the method includes further operations after determining the collective attenuation value at operation 2106. Accordingly, referring to FIG. 24A, at operation 2402, the method includes categorizing the at least one set of virtual layers based on the collective attenuation value. At operation 2404, the method includes forming at least one of (a) the at least one first beam and (b) at least one second beam based on the collective attenuation value and the categorization.

Figure 24B:
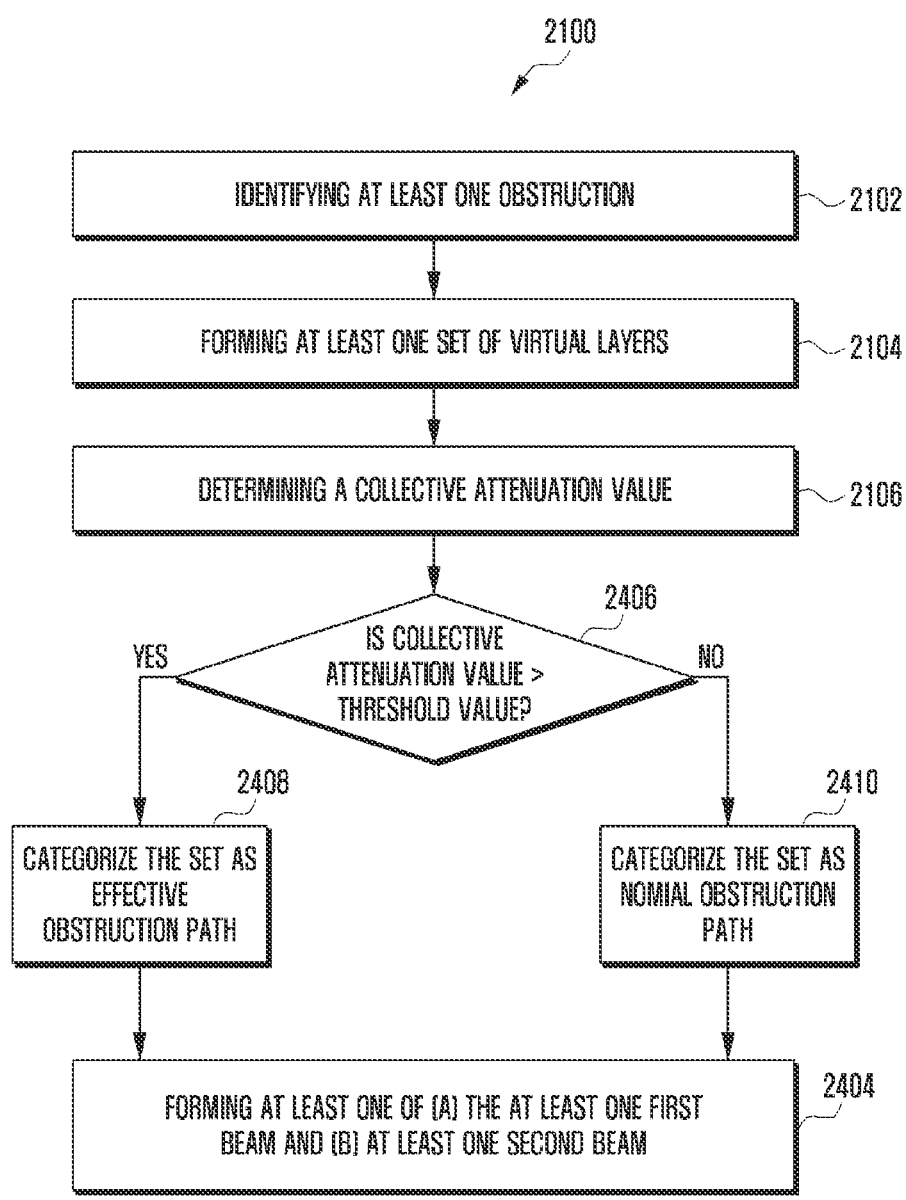

In various example embodiments, the method includes further operations at operation 2402. Referring to FIG. 24B, at operation 2406, the method includes determining if the collective attenuation value is higher than a threshold value. If the collective attenuation value is higher than the threshold value, the process flows to operation 2408. At operation 2408, the at least one set of virtual layers is categorized as effective obstruction path. If the collective attenuation value is lower than the threshold value, the process flows to operation 2410. At operation 2410, the at least one set of virtual layers is categorized as nominal obstruction path.

Figure 25:
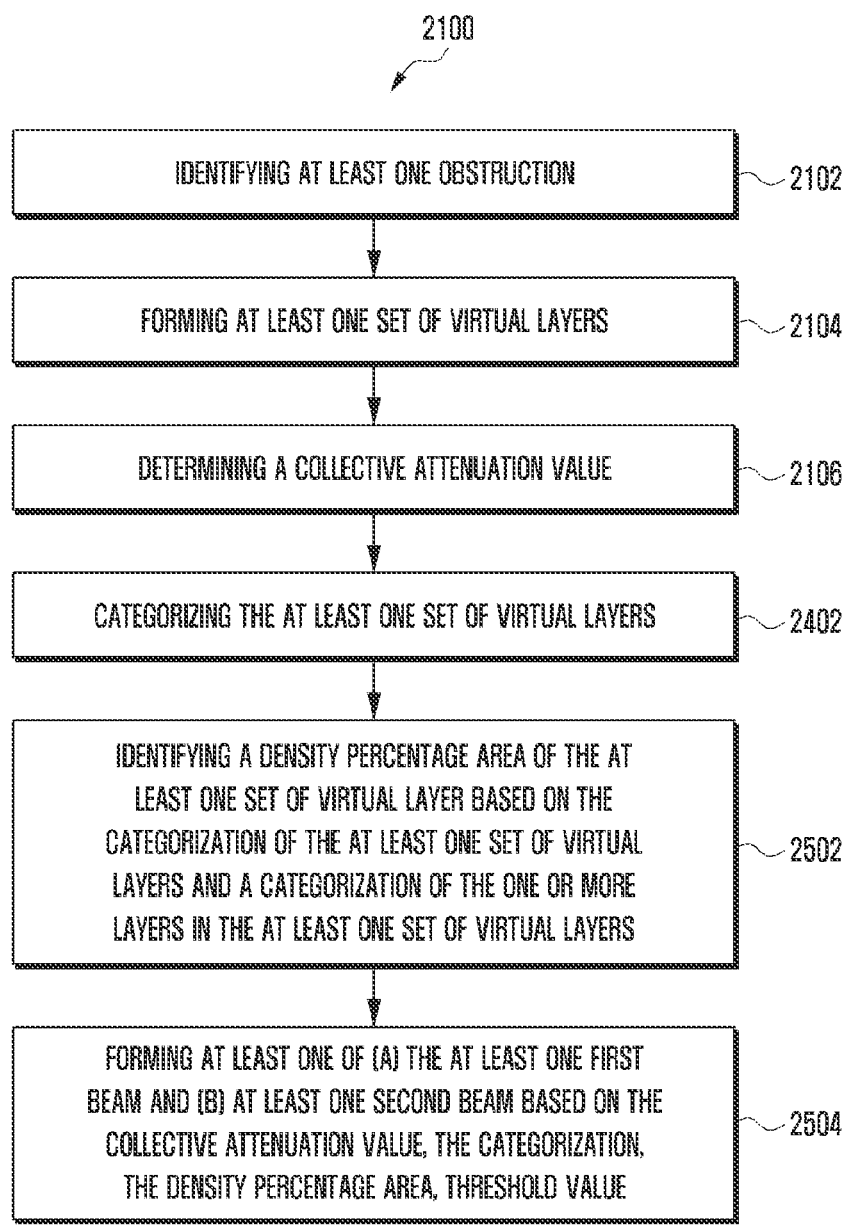

Further, in various example embodiments, the method includes further steps after categorizing at operation 2402. Accordingly, referring to FIG. 25, at operation 2502, the method includes identifying a density percentage area of the at least one set of virtual layer based on the categorization of the at least one set of virtual layers and a categorization of the one or more virtual layers in the at least one set of virtual layers. At operation 2504, the method includes forming at least one of (a) the at least one first beam and (b) at least one second beam based on the collective attenuation value, the categorization, the density percentage area, and threshold value.

Figure 26:
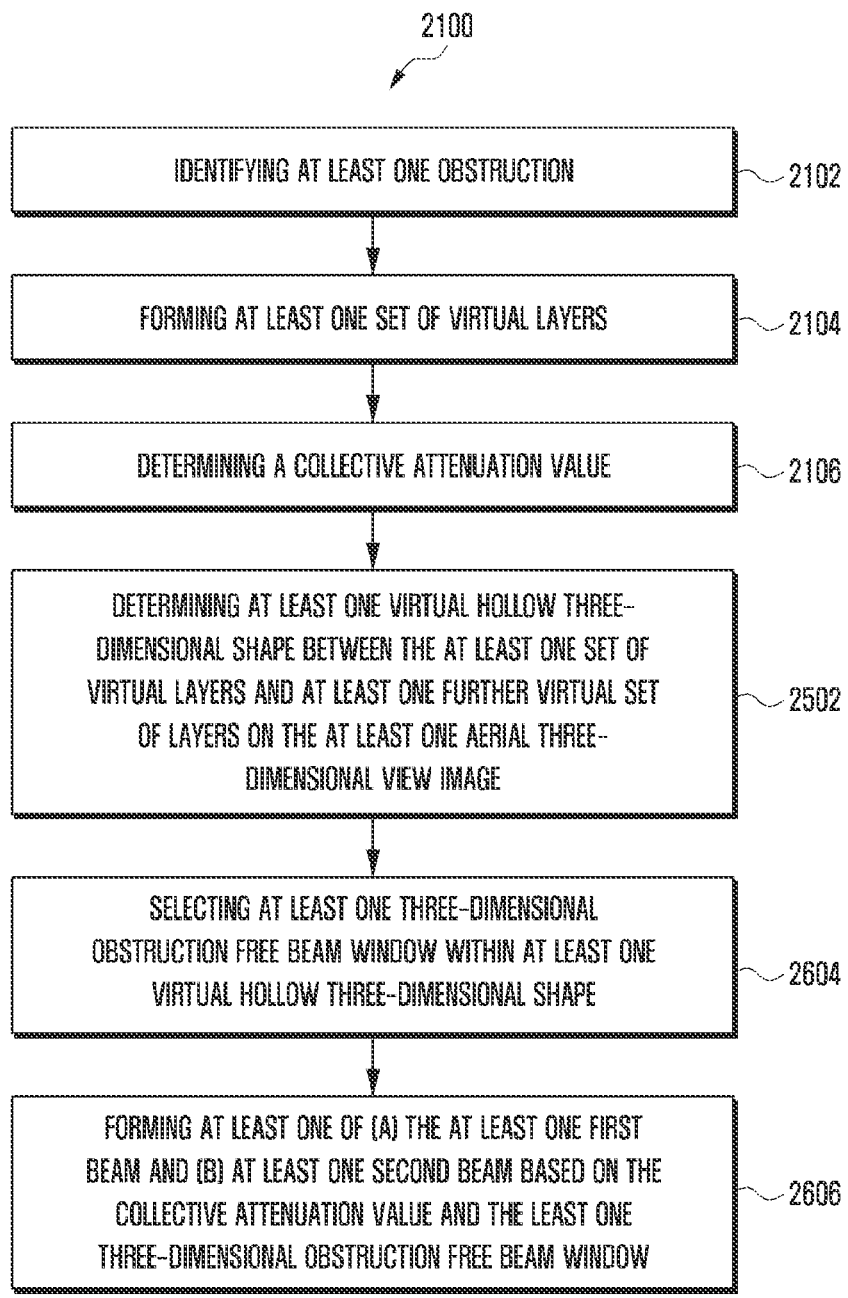

Further, in various example embodiments, the method includes further operations after determining the collective attenuation value at operation 2106. Accordingly, referring to FIG. 26, at operation 2602, the method includes determining at least one virtual hollow three-dimensional shape between the at least one set of virtual layers and at least one further virtual set of virtual layers. At operation 2604, the method includes selecting at least one three-dimensional obstruction free beam window within at least one virtual hollow three-dimensional shape. At block 2606, the method includes forming at least one of (a) the at least one first beam and (b) at least one second beam based on the collective attenuation value and the least one three-dimensional obstruction free beam window.

Figure 27:
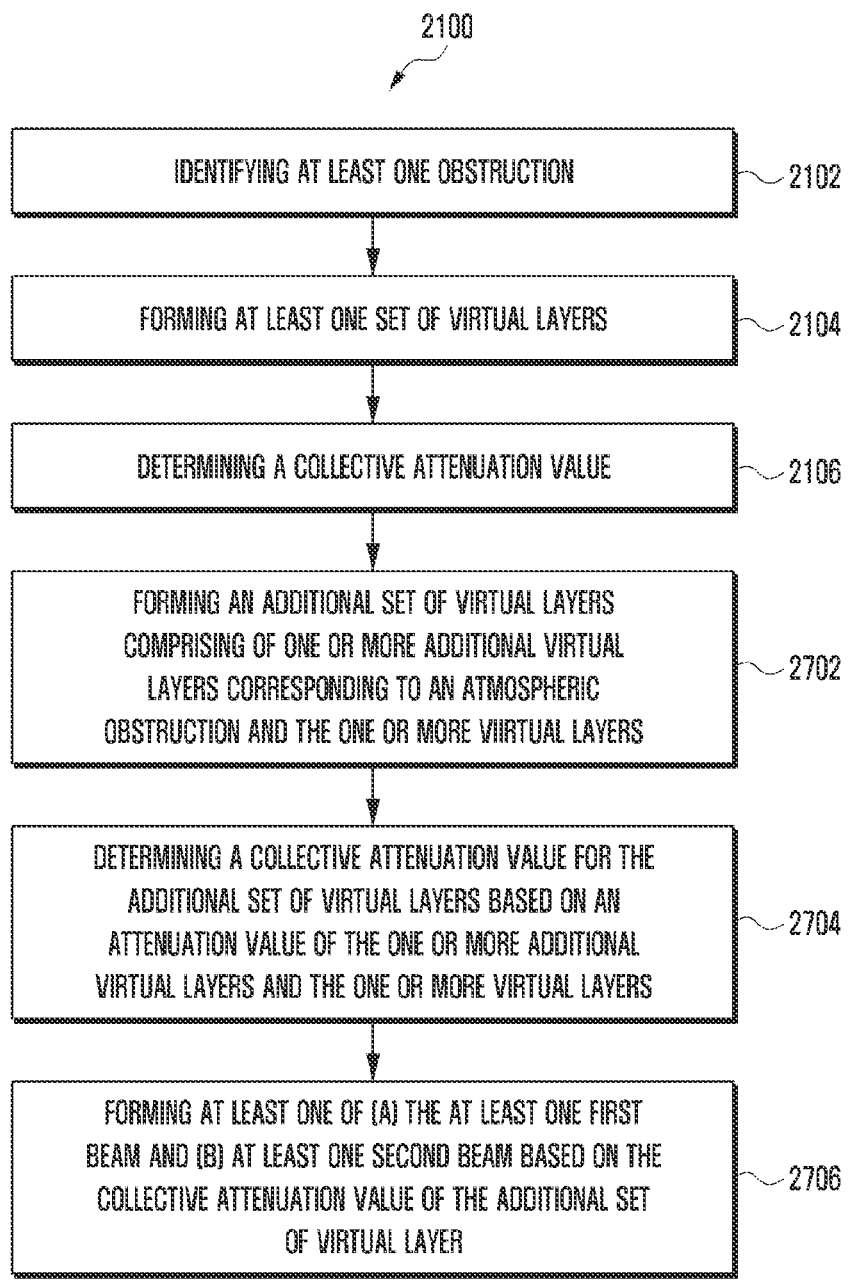

Further, in various example embodiments, the method includes further operations after determining the collective attenuation value at operation 2106. Accordingly, referring to FIG. 27, at operation 2702, the method includes forming an additional set of virtual layers comprising of one or more additional virtual layers corresponding to an atmospheric obstruction and the one or more virtual layers corresponding to the at least one obstruction. At operation 2704, the method includes determining a collective attenuation value for the additional set of virtual layers based on an attenuation value of the one or more additional virtual layers and the one or more virtual layers corresponding to the at least one obstruction. At operation 2706, the method includes forming at least one of (a) the at least one first beam and (b) at least one second beam based on the collective attenuation value virtual layer of the additional set of virtual layer.

While the disclosure has been illustrated and described with reference to various example embodiments, it will be understood that the various example embodiments are intended to be illustrative, not limiting. It will be further understood to those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of beamforming for at least one transmitting antenna, the method comprising:
   identifying at least one obstruction in at least one three-dimensional aerial view image of a current location of the at least one transmitting antenna;
   forming at least one set of virtual layers comprising of one or more virtual layers corresponding to the at least one obstruction;
   determining a collective attenuation value for the at least one set of virtual layers based on an attenuation value of the one or more virtual layers; and
   forming at least one first beam based on the collective attenuation value.

2. The method as claimed in claim 1, wherein the at least one obstruction is identified on a line-of-sight transmission between the at least one transmitting antenna and at least one receiving antenna, or
   wherein the one or more virtual layers indicate one or more of an attenuation value of the at least one obstruction and plurality of obstructions parameters corresponding to the at least one obstruction, or
   wherein forming the at least one beam comprises controlling at least one beam parameter of the at least one beam based on the collective attenuation value.

3. The method as claimed in claim 1, wherein forming the set of virtual layers comprises:
   obtaining a plurality of obstruction parameters corresponding to the at least one obstruction;
   determining a plurality of virtual layer parameters based on one or more of the plurality of obstruction parameters, characteristics of the at least one transmitting antenna, the characteristics of at least one receiving antenna, and learned data;
   forming the one or more virtual layers based on the plurality of virtual layer parameters; and
   arranging the one or more virtual layers corresponding to the at least one obstruction in a stack to form the set of virtual layers, and
   wherein forming the one or more virtual layers comprises at least one of:
   determining a shape of the one or more virtual layers to be one of a two-dimensional shape and a three-dimensional shape based on the plurality of virtual layer parameters;
   determining a shape of the one or more virtual layers is one of an identical shape, a substantially similar shape, and a distinct shape based on the plurality of virtual layer parameters; and
   determining a dimension of the one or more virtual layers is one of an equal value and a distinct value based on the plurality of virtual layer parameters.

4. The method as claimed in claim 1, wherein determining the collective attenuation value for the at least one set of virtual layers comprises:
   determining the attenuation value of the one or more virtual layers based on a plurality of obstruction parameters corresponding to the at least one obstruction and one or more predefined attenuation models; and
   deriving the collective attenuation value based on summation of the attenuation value of each of the one or more virtual layers, and
   wherein determining the collective attenuation value for the at least one set of virtual layers comprises:
   assigning a dynamically determined weight to each of the one or more virtual layers based on one or more of specified weighted attenuation models and dynamic parameters to obtain a weighted attenuation value; and
   deriving the collective attenuation value based on summation of the weighted attenuation value of each of the one or more virtual layers, and
   wherein the dynamically determined weight assigned to each of the one or more virtual layers is one of an equal value and a distinct value, or
   wherein the dynamically determined weight is assigned to each of the one or more virtual layers at one of a same time instant and different time instants, or
   wherein the weight is dynamically determined as learned data obtained by processing attenuation value of the one or more virtual layers, one or more of the plurality of virtual layer parameters, the dynamic parameters, and training data using one or more specified weighted attenuation models.

5. The method as claimed in claim 1, further comprising:
   categorizing the at least one set of virtual layers based on the collective attenuation value; and
   forming at least one of the at least one first beam and at least one second beam based on the collective attenuation value and the categorization, and
   wherein categorizing the set of virtual layers comprises:
   categorizing, on the at least one three-dimensional aerial view image, the at least one set of virtual layers into one of an effective obstruction path and a nominal obstruction path based on a learned data and one or more threshold values, the threshold value being determined from one or more learned models, and wherein the effective obstruction path indicates the at least one set of virtual layer having a collective attenuation value higher than the threshold value and the nominal obstruction path indicates the at least one set of virtual layer having a collective attenuation value lower than the threshold value, or
   wherein the forming at least one of the at least one first beam and the at least one second beam comprises controlling at least one beam parameter of the at least one first beam and the at least one second beam based on the collective attenuation value and the categorization, or
   further comprising:
   identifying a density percentage area of the at least one set of virtual layer based on the categorization of the at least one set of virtual layers and a categorization of the one or more virtual layers in the at least one set of virtual layers; and
   forming at least one of the at least one first beam and the at least one second beam based on the collective attenuation value, the categorization, and the density percentage area, and threshold value, and wherein the forming at least one of the at least one first beam and the at least one second beam comprises controlling at least one beam parameter of the at least one first beam and the at least one second beam based on the collective attenuation value, the categorization, and the density percentage area.

6. The method as claimed in claim 1, comprising dynamically performing, based on at least one of reflected signals obtained by emitting the at least one beam, a density percentage area of the one or more virtual layers, the at least one set of virtual layers, the one or more virtual layers, the collective attenuation value, and learned data, at least one of:

adjusting at least one of a plurality of virtual layer parameters of at least one virtual layer in the at least one set of virtual layers; and merging the at least one set of virtual layers with at least one further set of virtual layers.

7. The method as claimed in claim 1, further comprising:
determining at least one virtual hollow three-dimensional shape between the at least one set of virtual layers and at least one further virtual set of virtual layers;

selecting at least one three-dimensional obstruction free beam window within at least one virtual hollow three-dimensional shape; and forming at least one of the at least one first beam and at least one second beam based on the collective attenuation value and the least one three-dimensional obstruction free beam window, and wherein determining the at least one virtual hollow three-dimensional shape comprises:

detecting an open space distance between the at least one set of virtual layers and the at least one further virtual set of virtual layers; and determining the at least one virtual hollow three-dimensional shape based on the open space distance and dimensions of the at least one set of virtual layers and at least one further virtual set of virtual layers, or comprising dynamically performing, based on at least one of reflected signals obtained by emitting the at least one beam, the at least one set of virtual layers, the at least one further set of virtual layers, the collective attenuation value, and learned data, at least one of:

adjusting one or more parameters of the at least one virtual hollow three-dimensional shape;

adjusting one or more parameters of the at least one three-dimensional obstruction free beam window;

merging the at least one virtual hollow three-dimensional shape with at least one further virtual hollow three-dimensional shape;

merging the at least one three-dimensional obstruction free beam window with at least one further three-dimensional obstruction free beam window;

ranking the at least one virtual hollow three-dimensional shape; and ranking the at least one three-dimensional obstruction free beam window.

8. The method as claimed in claim 1, further comprising:
forming an additional set of virtual layers comprising one or more additional virtual layers corresponding to an atmospheric obstruction and the one or more virtual layers corresponding to the at least one obstruction;

determining a collective attenuation value for the additional set of virtual layers based on an attenuation value of the one or more additional virtual layers and the one or more virtual layers corresponding to the at least one obstruction; and forming at least one of the at least one first beam and at least one second beam based on the collective attenuation value of the additional set of virtual layer.

9. A system configured to implement a beamforming method for at least one transmitting antenna, the system comprising:

an image analyzing unit comprising circuitry configured to identify at least one obstruction in at least one three-dimensional aerial view image of a current location of the at least one transmitting antenna;

a virtual layer-forming unit comprising circuitry configured to form at least one set of virtual layers comprising of one or more virtual layers corresponding to the at least one obstruction;

an attenuation determination unit comprising circuitry configured to determine a collective attenuation value for the at least one set of virtual layers based on an attenuation value of the one or more virtual layers; and a beamforming unit comprising circuitry configured to form at least one first beam based on the collective attenuation value.

10. The system as claimed in claim 9, wherein the at least one obstruction is identified on a line-of-sight transmission between the at least one transmitting antenna and at least one receiving antenna, or wherein the one or more virtual layers indicate one or more of an attenuation value of the at least one obstruction and plurality of obstructions parameters corresponding to the at least one obstruction, or wherein the beamforming unit is configured to control at least one beam parameter of the at least one beam based on the collective attenuation value to form the at least one beam.

11. The system as claimed in claim 9, wherein the virtual layer-forming unit is configured to:

obtain a plurality of obstruction parameters corresponding to the at least one obstruction;

determine a plurality of virtual layer parameters based on one or more of the plurality of obstruction parameters, characteristics of the at least one transmitting antenna, the characteristics of at least one receiving antenna, and learned data;

form the one or more virtual layers based on the plurality of virtual layer parameters; and arrange the one or more virtual layers corresponding to the at least one obstruction in a stack to form the set of virtual layers, and wherein to form the one or more virtual layers the virtual layer-forming unit is configured to perform at least one of:

determine a shape of the one or more virtual layers to be one of a two-dimensional shape and a three-dimensional shape based on the plurality of virtual layer parameters;

determine a shape of the one or more virtual layers is one of an identical shape, a substantially similar shape, and a distinct shape based on the plurality of virtual layer parameters; and determine a dimension of the one or more virtual layers is one of an equal value and a distinct value based on the plurality of virtual layer parameters.

12. The system as claimed in claim 9, wherein the attenuation determination unit is configured to:

determine the attenuation value of the one or more virtual layers based on a plurality of obstruction parameters corresponding to the at least one obstruction and one or more predefined attenuation models; and derive the collective attenuation value based on summation of the weighted attenuation value of each of the one or more virtual layers, and wherein the attenuation determination unit is configured to:

assign a dynamically determined weight to each of the one or more virtual layers based on one or more of specified weighted attenuation models and dynamic parameters to obtain a weighted attenuation value; and derive the collective attenuation value based on summation of the weighted attenuation value of each of the one or more virtual layers, or wherein the dynamically determined weight assigned to each of the one or more virtual layers is one of an equal value and a distinct value, or wherein the dynamically determined weight is assigned to each of the one or more virtual layers at one of a same time instant and different time instants, or wherein the weight is dynamically determined as learned data obtained by processing attenuation value of the one or more virtual layers, one or more of the plurality of virtual layer parameters, the dynamic parameters, and training data using the one or more specified weighted attenuation models.

13. The system as claimed in claim 9, comprising a categorization unit comprising circuitry configured to categorize the at least one set of virtual layers based on the collective attenuation value, and wherein the beamforming unit is configured to form at least one of the at least one first beam and at least one second beam based on the collective attenuation value and the categorization, and wherein the beamforming unit is configured to control at least one beam parameter of the at least one beam based on the collective attenuation value and the categorization to form at least one of the at least one first beam and the at least one second beam, or wherein to categorize the at least one set of virtual layers the categorization unit is configured to:

categorize the at least one set of virtual layers into one of an effective obstruction path and nominal obstruction path based on learned data and one or more threshold values, the threshold value being determined from one or more learned models, and wherein the effective obstruction path indicates the at least one set of virtual layer having a collective attenuation value higher than the threshold value and the nominal obstruction path indicates the at least one set of virtual layer having a collective attenuation value lower than the threshold value, or comprises a density determining unit comprising circuitry configured to identify a density percentage area of the at least one set of virtual layer based on the categorization of the at least one set of virtual layers and a categorization of the one or more virtual layers in the at least one set of virtual layers, and wherein the beamforming unit is configured to form at least one of the at least one first beam and the at least one second beam based on the collective attenuation value, the categorization, the density percentage area, and threshold value, and wherein the beamforming unit is configured to control at least one beam parameter of the at least one first beam and the at least one second beam based on the collective attenuation value, the categorization, the density percentage area, and the threshold value to form at least one of the at least one first beam and the at least one second beam.

14. The system as claimed in claim 9, wherein the virtual layer-forming unit is configured to dynamically perform, based on at least one of reflected signals obtained by emitting the at least one beam, a density percentage area of the one or more virtual layers, the at least one set of virtual layers, the one or more virtual layers, the collective attenuation value, and learned data, at least one of:

adjust at least one of a plurality of virtual layer parameters of at least one virtual layer in the at least one set of virtual layers; and merge the at least one set of virtual layers with at least one further set of virtual layers, or comprises a window-forming unit comprising circuitry configured to:

determine at least one virtual hollow three-dimensional shape between the at least one set of virtual layers and at least one further virtual set of virtual layers; and select at least one three-dimensional obstruction free beam window within at least one virtual hollow three-dimensional shape, and wherein the beamforming unit is configured to form at least one of the at least one first beam and at least one second beam based on the collective attenuation value and the least one three-dimensional obstruction free beam window, or wherein to determine the at least one virtual hollow three-dimensional shape the window-forming unit is configured to:

detect an open space distance between the at least one set of virtual layers and the at least one further virtual set of virtual layers; and determine the at least one virtual hollow three-dimensional shape based on the open space distance and dimensions of the at least one set of virtual layers and at least one further virtual set of virtual layers, or wherein the window-forming unit is configured to dynamically perform, based on at least one of reflected signals obtained by emitting the at least one beam, the at least one set of virtual layers, the at least one further set of virtual layers, the collective attenuation value, and learned data, at least one of:

adjust one or more parameters of the at least one virtual hollow three-dimensional shape;

adjust one or more parameters of the at least one three-dimensional obstruction free beam window;

merge the at least one virtual hollow three-dimensional shape with at least one further virtual hollow three-dimensional shape;

merge the at least one three-dimensional obstruction free beam window with at least one further three-dimensional obstruction free beam window;

rank the at least one virtual hollow three-dimensional shape; and rank the at least one three-dimensional obstruction free beam window.

15. The system as claimed in claim 9, wherein:

the virtual layer-forming unit is configured to form an additional set of virtual layers comprising of one or more additional virtual layers corresponding to an atmospheric obstruction and the one or more virtual layers corresponding to the at least one obstruction;

the attenuation determination unit is configured to determine a collective attenuation value for the additional set of virtual layers based on an attenuation value of the one or more additional virtual layers and the one or more virtual layers corresponding to the at least one obstruction; and the beamforming unit is to configured to form at least one of the at least one first beam and at least one second beam based on the collective attenuation value of the additional set of virtual layer.

* * * * *